United States Patent
Suetsuna et al.

(10) Patent No.: US 10,774,404 B2
(45) Date of Patent: Sep. 15, 2020

(54) PLURALITY OF FLAKY MAGNETIC METAL PARTICLES, PRESSED POWDER MATERIAL, AND ROTATING ELECTRIC MACHINE

(71) Applicant: KABUSHIKI KAISHA TOSHIBA, Minato-ku, Tokyo (JP)

(72) Inventors: Tomohiro Suetsuna, Kawasaki Kanagawa (JP); Hiroaki Kinouchi, Shingawa Tokyo (JP); Takahiro Kawamoto, Kawasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 296 days.

(21) Appl. No.: 15/693,704

(22) Filed: Sep. 1, 2017

(65) Prior Publication Data

US 2018/0258513 A1    Sep. 13, 2018

(30) Foreign Application Priority Data

Mar. 13, 2017  (JP) ................. 2017-047116

(51) Int. Cl.
    *C22C 38/10*      (2006.01)
    *B22F 3/02*       (2006.01)
    (Continued)

(52) U.S. Cl.
    CPC ............ *C22C 38/10* (2013.01); *B22F 3/02* (2013.01); *B22F 3/24* (2013.01); *B22F 9/04* (2013.01);
    (Continued)

(58) Field of Classification Search
    None
    See application file for complete search history.

(56) References Cited

U.S. PATENT DOCUMENTS 4,075,672 A  *  2/1978  Manly ............... G11B 5/70
                                                360/135
4,237,506 A  *  12/1980  Manly ............... G11B 5/02
                                                360/135
(Continued)

FOREIGN PATENT DOCUMENTS

EP      0092091     10/1983
EP      1661647      5/2006
(Continued)

OTHER PUBLICATIONS

Geshev et al. (J. App. Phys., 85(10), May 1999, 7321-7327. (Year: 1999).*
(Continued)

*Primary Examiner* — Kevin M Bernatz
(74) *Attorney, Agent, or Firm* — Amin, Turocy & Watson, LLP

(57) ABSTRACT

Provided is a plurality of flaky magnetic metal particles of the embodiments, each flaky magnetic metal particle having a flat surface provided with either or both of a plurality of concavities and a plurality of convexities arranged in a first direction, each concavity or convexity having a width of 0.1 μm or more, a length of 1 μm or more, and an aspect ratio of 2 or higher; and at least one first element selected from the group consisting of iron (Fe), cobalt (Co), and nickel (Ni), the flaky magnetic metal particles having an average thickness of between 10 nm and 100 μm inclusive and an average aspect ratio of between 5 and 10,000 inclusive.

18 Claims, 30 Drawing Sheets

(51) Int. Cl.

| | |
|---|---|
| *B22F 3/24* | (2006.01) |
| *H01F 1/24* | (2006.01) |
| *H02K 1/02* | (2006.01) |
| *C21D 9/52* | (2006.01) |
| *C21D 8/02* | (2006.01) |
| *C21D 6/00* | (2006.01) |
| *B22F 9/04* | (2006.01) |
| *C22C 38/02* | (2006.01) |
| *H02K 15/00* | (2006.01) |
| *H01F 41/02* | (2006.01) |
| *H01F 1/26* | (2006.01) |

(52) U.S. Cl.
CPC ............ *C21D 6/007* (2013.01); *C21D 6/008* (2013.01); *C21D 8/0205* (2013.01); *C21D 8/0247* (2013.01); *C21D 9/52* (2013.01); *C22C 38/02* (2013.01); *H01F 1/24* (2013.01); *H01F 41/0246* (2013.01); *H02K 1/02* (2013.01); *H02K 15/00* (2013.01); *B22F 2003/248* (2013.01); *B22F 2009/043* (2013.01); *B22F 2009/048* (2013.01); *B22F 2202/05* (2013.01); *B22F 2301/35* (2013.01); *H01F 1/26* (2013.01)

(56) References Cited

U.S. PATENT DOCUMENTS

| | | | | |
|---|---|---|---|---|
| 4,281,043 | A | * | 7/1981 | Deffeyes ............ G06K 19/02 252/62.54 |
| 5,651,841 | A | * | 7/1997 | Moro ................. H01F 1/26 148/309 |
| 10,071,421 | B2 | * | 9/2018 | Suetsuna ............ C22C 38/002 |
| 10,090,088 | B2 | * | 10/2018 | Suetsuna ............ H01F 1/28 |
| 2002/0023697 | A1 | | 2/2002 | Arai et al. |
| 2006/0228589 | A1 | * | 10/2006 | Choi ................. B82Y 25/00 428/836.3 |
| 2007/0131311 | A1 | | 6/2007 | Igarashi et al. |
| 2007/0221297 | A1 | | 9/2007 | Matsukawa et al. |
| 2009/0025830 | A1 | | 1/2009 | Uozumi et al. |
| 2011/0217543 | A1 | * | 9/2011 | Suetsuna ............ B32B 5/16 428/323 |
| 2013/0214198 | A1 | | 8/2013 | Igarashi |
| 2013/0228716 | A1 | | 9/2013 | Suetsuna et al. |
| 2013/0314198 | A1 | | 11/2013 | Yoshizawa et al. |
| 2014/0077485 | A1 | * | 3/2014 | Raksha ............... H01F 41/0253 283/67 |
| 2014/0097377 | A1 | * | 4/2014 | Igarashi ............ H01F 1/15383 252/62.54 |
| 2016/0086717 | A1 | | 3/2016 | Harada et al. |
| 2017/0076845 | A1 | * | 3/2017 | Suetsuna ............ H01F 1/28 |
| 2017/0209924 | A1 | * | 7/2017 | Suetsuna ............ B22F 1/0055 |

FOREIGN PATENT DOCUMENTS

| | | |
|---|---|---|
| JP | 06-035643 | 5/1994 |
| JP | 06-269909 | 9/1994 |
| JP | 07-166201 | 6/1995 |
| JP | 08-037107 | 2/1996 |
| JP | 2002-015906 | 1/2002 |
| JP | 2002-105502 | 4/2002 |
| JP | 2006-219714 | 8/2006 |
| JP | 2013-004657 | 1/2013 |
| JP | 2013-065844 | 4/2013 |
| JP | 2013-172010 | 9/2013 |
| JP | 2014-075511 | 4/2014 |
| JP | 2015-026749 | 2/2015 |
| JP | 2016-063170 | 4/2016 |
| JP | 2017-059816 | 3/2017 |
| JP | 2017-035358 | 8/2017 |
| WO | 2012/102379 | 8/2012 |

OTHER PUBLICATIONS

Undated web article on Magnetic Anisotropy (Year: 2019).*
Halder, et al. "Separation of particle size and lattice strain in integral breadth measurements", Acta. Cryst. (1966) 20, pp. 312-313.

* cited by examiner

DIAGRAM VIEWED FROM ABOVE
(FLAT SURFACE OF FLAKY MAGNETIC METAL PARTICLE)

Fig.13
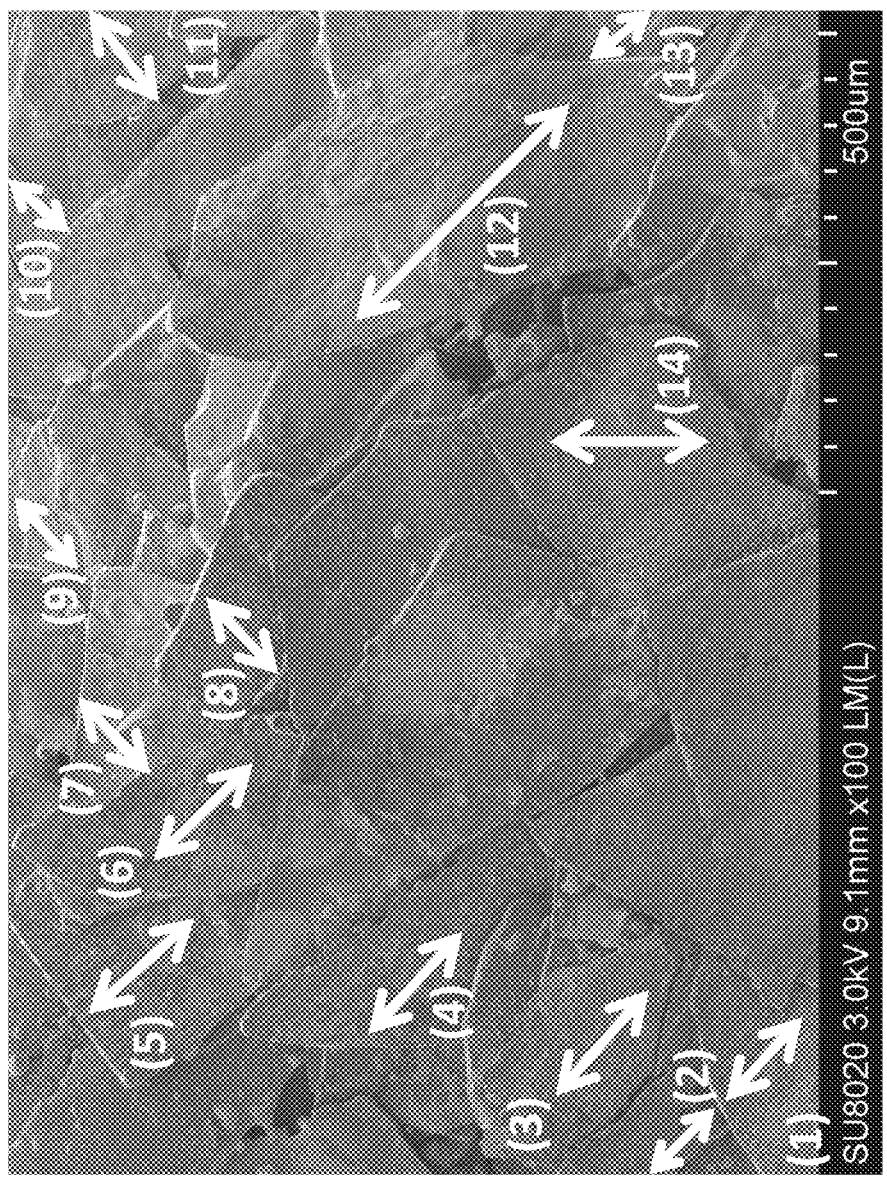
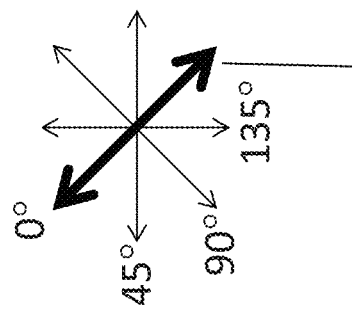
ANGLE DIRECTION FOR DETERMINING APPROXIMATE FIRST DIRECTION
DIRECTION HAVING LARGEST NUMBER OF DIRECTIONS OF ARRANGEMENT OF CONCAVITIES OR CONVEXITIES = SECOND DIRECTION Fig. 17  DIAGRAM VIEWED FROM ABOVE (FLAT SURFACE OF FLAKY MAGNETIC METAL PARTICLE)

Fig.19
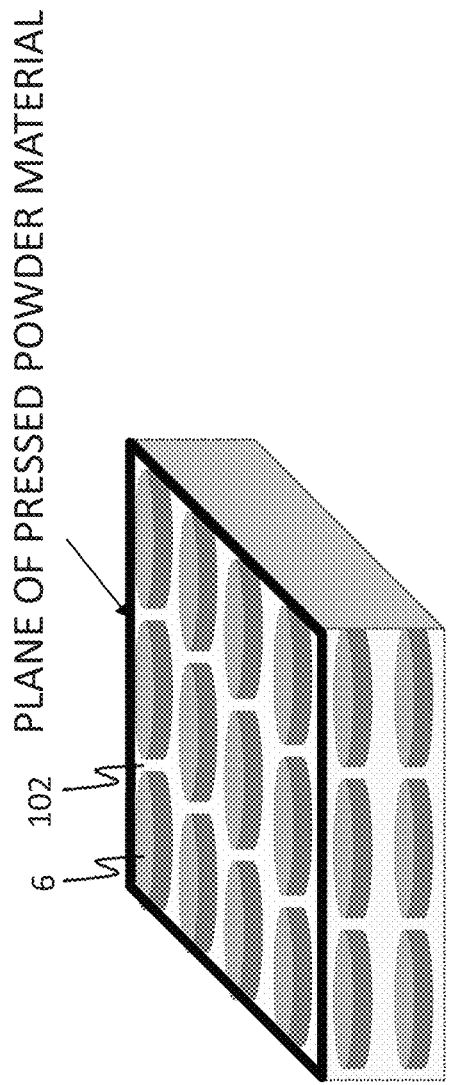
PLANE OF PRESSED POWDER MATERIAL
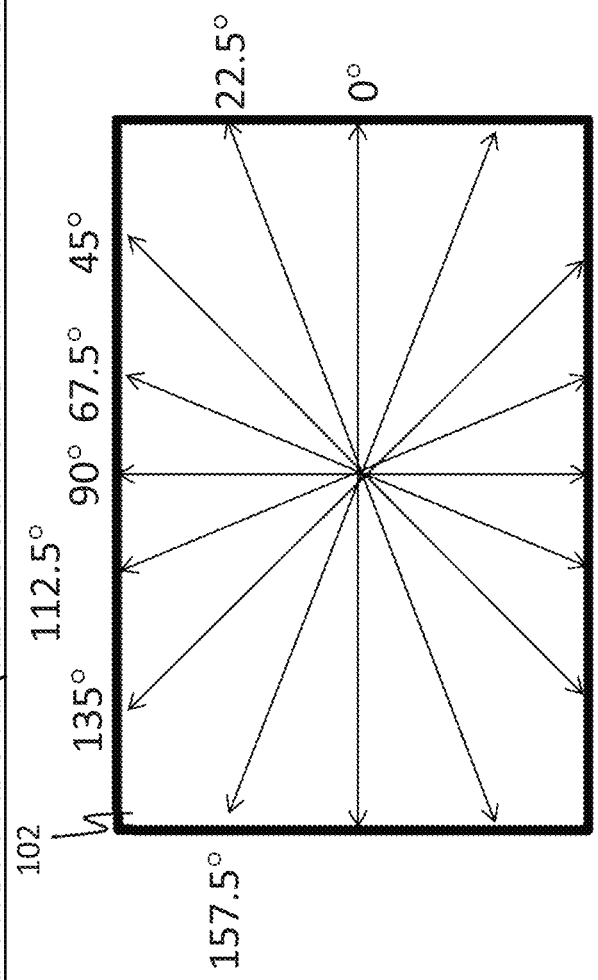
DIAGRAM VIEWED FROM ABOVE (FLAT SURFACE OF FLAKY MAGNETIC METAL PARTICLE)

Fig.22
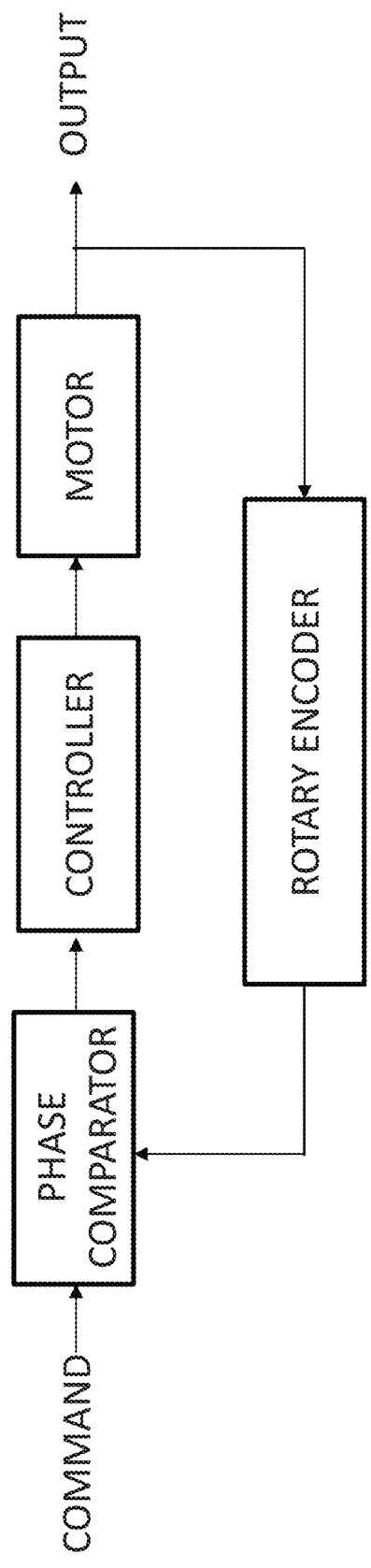
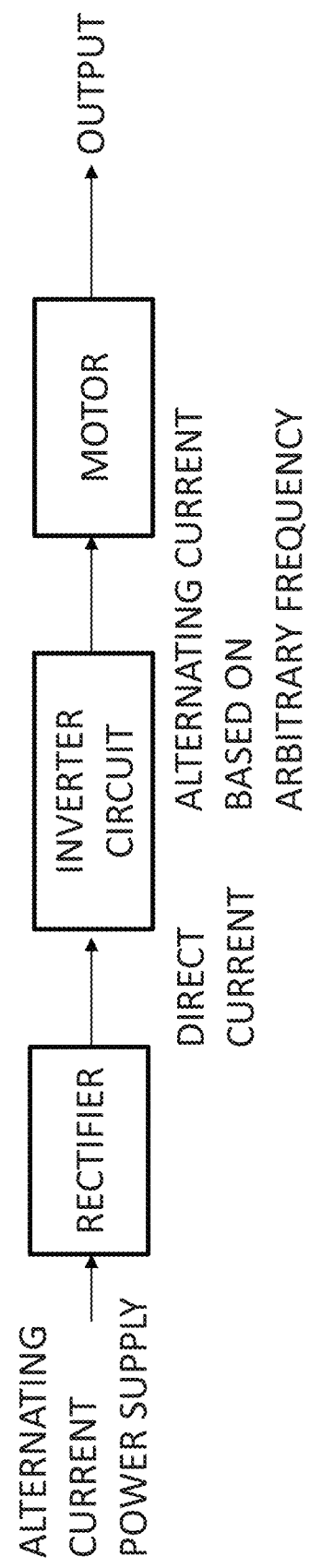

Fig. 24 EXEMPLARY CONCEPTUAL CROSS-SECTIONAL VIEW OF STATOR

EXEMPLARY CONCEPTUAL CROSS-SECTIONAL VIEW OF ROTOR

Fig.30
IN CASE WHERE FLAT SURFACES OF FLAKY MAGNETIC METAL PARTICLES ARE DISPOSED PARALLEL TO xy PLANE
IN CASE OF
DOMAIN WALL DISPLACEMENT
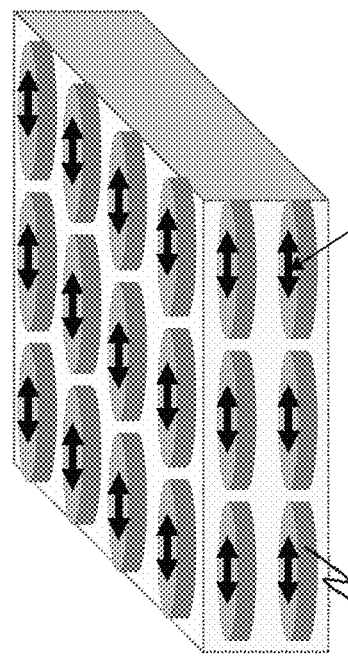
DIRECTION OF MAGNETIC FLUX (//x DIRECTION)
EASY MAGNETIZATION AXIS
IN CASE OF
ROTATION MAGNETIZATION
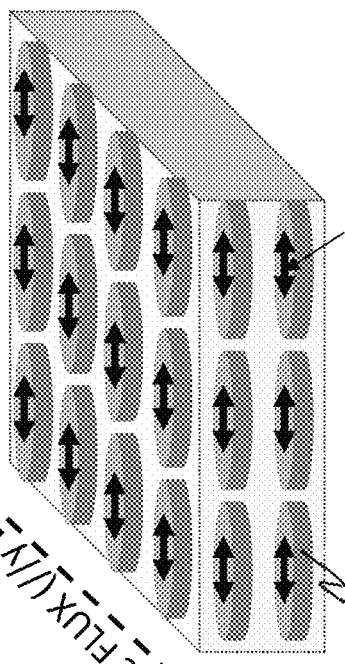
DIRECTION OF MAGNETIC FLUX (//y DIRECTION)
EASY MAGNETIZATION AXIS
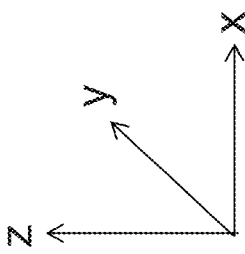

PLURALITY OF FLAKY MAGNETIC METAL PARTICLES, PRESSED POWDER MATERIAL, AND ROTATING ELECTRIC MACHINE

CROSS-REFERENCE TO RELATED APPLICATION

This application is based upon and claims the benefit of priority from Japanese Patent Application No. 2017-047116, filed on Mar. 13, 2017, the entire contents of which are incorporated herein by reference.

FIELD

Embodiments described herein relate generally to a plurality of flaky magnetic metal particles, a pressed powder material, and a rotating electric machine.

BACKGROUND

Currently, soft magnetic materials are applied to various systems and devices, such as rotating electric machines (for example, motors and generators), potential transformers, inductors, transformers, magnetic inks, and antenna devices, and thus, soft magnetic materials are regarded as very important materials. In these component parts, the real part of the magnetic permeability (real part of the relative magnetic permeability), $\mu'$, of a soft magnetic material is utilized. Therefore, in the case of actual use, it is preferable to control $\mu'$ in accordance with the working frequency band. Furthermore, in order to realize a highly efficient system, it is preferable to use a material having a loss that is as low as possible. That is, it is preferable that the imaginary part of the magnetic permeability (imaginary part of the relative magnetic permeability), $\mu''$ (corresponding to a loss), is minimized as far as possible. In regard to the loss, the loss factor, $\tan \delta \ (=\mu''/\mu' \times 100(\%))$, serves as a criterion, and as $\mu''$ becomes smaller relative to $\mu'$, the loss factor $\tan \delta$ becomes smaller, which is preferable. In order to attain such conditions, it is preferable to make the core loss for the conditions of actual operation small, that is to say, it is preferable to make the eddy current loss, hysteresis loss, ferromagnetic resonance loss, and residual loss (other losses) as small as possible. In order to make the eddy current loss small, it is effective to increase the electrical resistance, or decrease the sizes of metal parts, or finely divide the magnetic domain structure. In order to make the hysteresis loss small, it is effective to reduce coercivity or increase the saturation magnetization. In order to make the ferromagnetic resonance loss small, it is effective to make the ferromagnetic resonance frequency higher by increasing the anisotropic magnetic field of the material. Furthermore, in recent years, since there is an increasing demand for handling of high electric power, it is required that losses be small, particularly under the operation conditions in which the effective magnetic field applied to the material is large, such as high current and high voltage. To attain this end, it is preferable that the saturation magnetization of a soft magnetic material is as large as possible so as not to cause magnetic saturation. Furthermore, in recent years, since size reduction of equipment is enabled by frequency increment, increase of the working frequency band that is utilized in systems and device equipment is underway, and there is an urgent need for the development of a magnetic material having high magnetic permeability and low losses at high frequency and having excellent characteristics.

Furthermore, in recent years, due to the heightened awareness of the issues on energy saving and environmental issues, there is a demand to increase the efficiency of systems as high as possible. Particularly, since motor systems are responsible for the greater portion of electric power consumption in the world, efficiency enhancement of motors is very important. Above all, a core and the like that constitute a motor are formed from soft magnetic materials, and it is requested to increase the magnetic permeability or saturation magnetization of soft magnetic materials as high as possible, or to make the losses as low as possible. Furthermore, in regard to the magnetic wedge that is used in some motors, there is a demand for minimizing losses as far as possible. There is the same demand also for systems using transformers. In motors, transformers and the like, the demand for size reduction is also high, along with efficiency enhancement. In order to realize size reduction, it is essential to maximize the magnetic permeability and saturation magnetization of the soft magnetic material as far as possible. Furthermore, in order to also prevent magnetic saturation, it is important to make saturation magnetization as high as possible. Moreover, the need for increasing the operation frequency of systems is also high, and thus, there is a demand to develop a material having low losses in high frequency bands.

Soft magnetic materials having high magnetic permeability and low losses are also used in inductance elements, antenna devices and the like, and among them, in recent years, attention has been paid to the application of soft magnetic materials particularly in power inductance elements that are used in power semiconductor devices. In recent years, the importance of energy saving and environmental protection has been actively advocated, and there have been demands for a reduction of the amount of $CO_2$ emission and reduction of the dependency on fossil fuels. As the result, development of electric cars or hybrid cars that substitute gasoline cars is in active progress. Furthermore, technologies for utilizing natural energy such as solar power generation and wind power generation are regarded as key technologies for an energy saving society, and many developed countries are actively pushing ahead with the development of technologies for utilizing natural energy. Furthermore, the importance of establishment of home energy management systems (HEMS) and building and energy management systems (BEMS), which control the electric power generated by solar power generation, wind power generation or the like by a smart grid and supply the electric power to homes, offices and plants at high efficiency, as environment-friendly power saving system, has been actively advocated. In such a movement of energy saving, power semiconductor devices play a key role. Power semiconductor devices are semiconductor devices that control high electric power or energy with high efficiency, and examples thereof include discrete power semiconductor devices such as an insulated gate bipolar transistor (IGBT), a metal oxide semiconductor field effect transistor (MOSFET), a power bipolar transistor and a power diode; power supply circuits such as a linear regulator and a switching regulator; and a large-scale integration (LSI) logic circuit for power management to control the above-mentioned devices. Power semiconductor devices are widely used in all sorts of equipment including electrical appliances, computers, automobiles and railways, and since expansion of the supply of these applied apparatuses, and an increase of the mounting ratio of power semiconductor devices in these apparatuses can be expected, a rapid growth in the market for power semiconductor devices in the future is anticipated. For example, inverters that are installed in many electrical appliances use power semiconductor devices nearly in all parts, and thereby extensive energy saving is made possible. Currently, silicon (Si) occupies a major part in power semiconductor devices; however, for a further increase in efficiency or further size reduction of equipment, utilizing silicon carbide (SiC) and gallium nitride (GaN) is considered effective. SiC and GaN have larger band gaps and larger breakdown fields than Si, and since the withstand voltage can be made higher, elements can be made thinner. Therefore, the on-resistance of semiconductor devices can be lowered, and it is effective for loss reduction and efficiency enhancement. Furthermore, since SiC or GaN has high carrier mobility, the switching frequency can be made higher, and this is effective for size reduction of elements. Furthermore, since SiC in particular has higher thermal conductivity than Si, the heat dissipation ability is higher, and operation at high temperature is enabled. Thus, cooling systems can be simplified, and this is effective for size reduction. From the viewpoints described above, development of SiC and GaN power semiconductor devices is actively in progress. However, in order to realize the development, development of power inductor elements that are used together with power semiconductor devices, that is, development of soft magnetic materials having high magnetic permeability (high magnetic permeability and low losses), is indispensable. In this case, regarding the characteristics required from magnetic materials, high magnetic permeability in the driving frequency bands, low magnetic loss, and high saturation magnetization that can cope with a large electric current, are needed. In a case in which saturation magnetization is high, it is difficult to cause magnetic saturation even if a high magnetic field is applied, and a decrease in the effective inductance value can be suppressed. As a result, the direct current superimposition characteristics of the device are improved, and the efficiency of the system is increased.

Furthermore, a magnetic material having high magnetic permeability and low losses at high frequency is expected to be applied to high frequency communication equipment devices such as antenna devices. As a method effective for size reduction of antennas and power saving, there is available a method of using an insulated substrate having high magnetic permeability (high magnetic permeability and low losses) as an antenna substrate, and performing transmission and reception of electric waves by dragging the electric waves that should reach an electronic component or a substrate inside a communication apparatus from antennas into the antenna substrate, without allowing the electric waves to reach the electronic component or substrate. As a result, size reduction of antennas and power saving are made possible, and at the same time, the resonance frequency band of the antennas can also be broadened, which is preferable.

In addition, examples of other characteristics such as high thermal stability, high strength, and high toughness are required when magnetic materials are incorporated into the various systems and devices described above. Also, in order for the magnetic materials to be applied to complicated shapes, a pressed powder is preferable to materials having a sheet shape or a ribbon shape. However, generally, in the case of the pressed powder, it is well known that characteristics such as saturation magnetization, magnetic permeability, losses, strength and toughness are not so good. Thus, enhancement of characteristics is preferable.

Next, in regard to conventional soft magnetic materials, the kinds of the soft magnetic materials and their problems will be described.

An example of an existing soft magnetic material for systems of 10 kH or less is a silicon steel sheet (FeSi). A silicon steel sheet is a material that is employed in most of rotating electric machines that have been used for a long time and handle large power, and the core materials of transformers. Highly characterized materials ranging from non-oriented silicon steel sheets to grain-oriented silicon steel sheets can be obtained, and compared to the early stage of discovery, a progress has been made; however, in recent years, it is considered that characteristics improvement has reached a limit. Regarding the characteristics, it is particularly critical to simultaneously satisfy high saturation magnetization, high magnetic permeability, and low losses. Studies on materials that surpass silicon steel sheets are actively conducted globally, mainly based on the compositions of amorphous materials and nanocrystalline materials; however, a material composition that surpasses silicon steel sheets in all aspects has not yet been found. Furthermore, studies also have been conducted on pressed powders that are applicable to complicated shapes; however, pressed powders have a defect that they have poor characteristics compared to sheets or ribbons.

Examples of conventional soft magnetic materials for systems of 10 kHz to 100 kHz include SENDUST (Fe—Si—Al), nanocrystalline FINEMET (Fe—Si—B—Cu—Nb), ribbons or pressed powders of Fe-based or Co-based amorphous glass, and MnZn-based ferrite materials. However, all of these materials do not completely satisfy characteristics such as high magnetic permeability, low losses, high saturation magnetization, high thermal stability, high strength and high toughness, and are insufficient.

Examples of conventional soft magnetic materials of 100 kHz or higher (MHz frequency band or higher) include NiZn-based ferrites and hexagonal ferrites; however, these materials have insufficient magnetic characteristics at high frequency.

From the circumstances described above, development of a magnetic material which has high saturation magnetization, high magnetic permeability, low losses, high thermal stability, and excellent mechanical characteristics, is preferable.

BRIEF DESCRIPTION OF THE DRAWINGS

FIG. 13 is an exemplary scanning electron microscopic photograph of the direction of arrangement of the approximate first direction according to the third embodiment of the invention.

FIG. 19 is a diagram illustrating the directions obtainable when coercivity is measured with the plane surface of the pressed powder material according to the sixth embodiment of the invention, by changing the direction at an interval of 22.5° with respect to the angle of 360° in the plane surface.

FIG. 22 is an exemplary conceptual diagram of a motor system according to a seventh embodiment of the invention.

FIG. 30 is a conceptual diagram illustrating the relation between the direction of magnetic flux and the direction of disposition of a pressed powder material.

DETAILED DESCRIPTION

Figure 1:
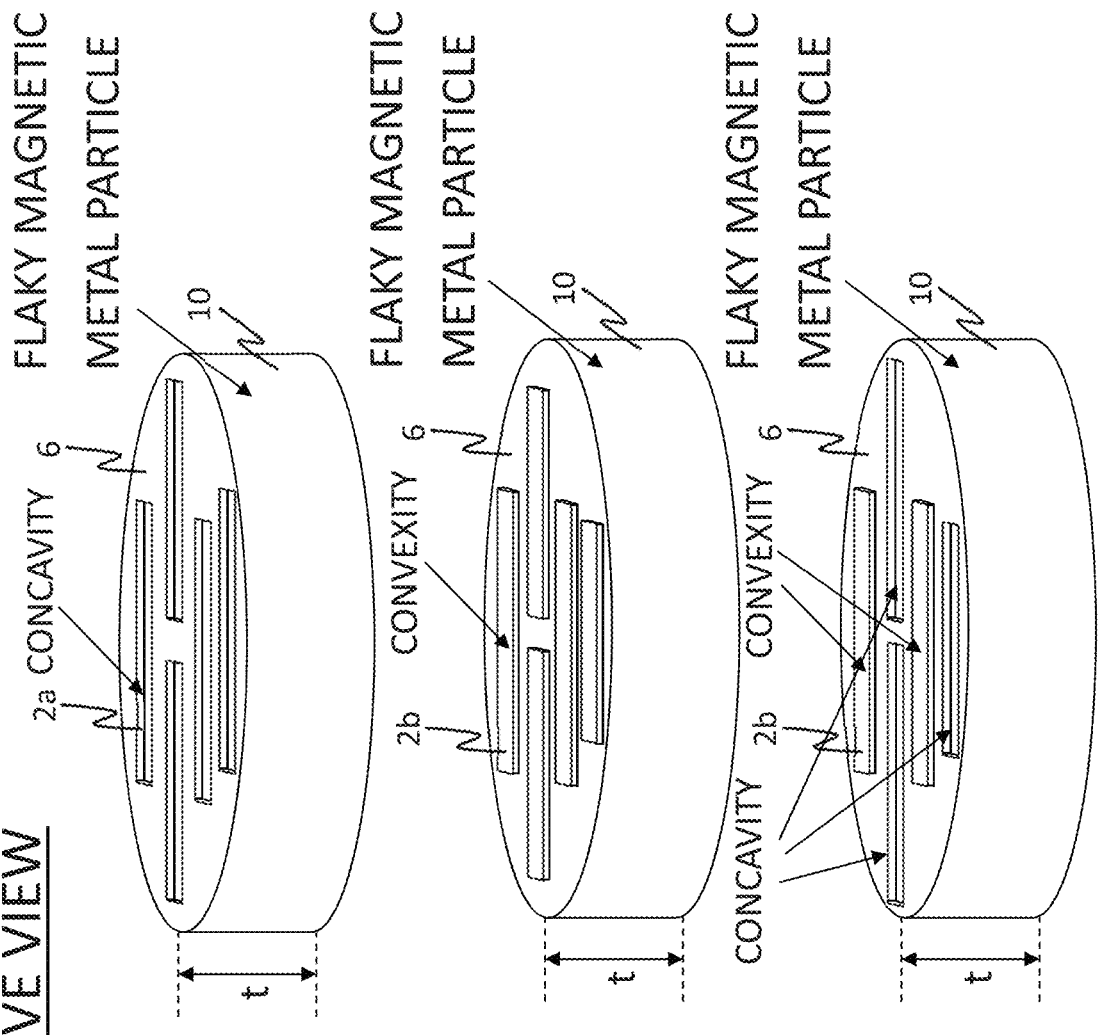
FIG. 1 is a schematic diagram illustrating flaky magnetic metal particles according to a first embodiment of the invention.

In the following description, embodiments of the invention will be explained using the attached drawings. In the diagrams, an identical or similar reference numeral will be assigned to identical or similar sites.

First Embodiment

According to the present embodiment, there is provided a plurality of flaky magnetic metal particles, each of the flaky magnetic metal particles comprising: a flat surface having either or both of a plurality of concavities and a plurality of convexities, the concavities and the convexities being arranged in a first direction and each having a width of 0.1 μm or more, a length of 1 μm or more, and an aspect ratio of 2 or higher; and at least one first element selected from the group consisting of iron (Fe), cobalt (Co), and nickel (Ni), the average thickness of the flaky magnetic metal particles being between 10 nm and 100 μm inclusive, and the average aspect ratio being between 5 and 10,000 inclusive.

In regard to the thickness and the aspect ratio, average values are employed in all cases. Specifically, a value obtained by averaging the values of ten or more particles is employed.

Flaky magnetic metal particles are flaky particles (or flattened particles) having a flaky shape (or a flattened shape).

The average thickness of the flaky magnetic metal particles is between 10 nm and 100 μm inclusive. The average thickness is more preferably between 10 nm and 1 μm inclusive, and even more preferably between 10 nm and 100 nm inclusive. As a result, when a magnetic field is applied in a direction parallel to the flat surface, the eddy current loss becomes sufficiently small, which is preferable. Furthermore, a smaller thickness is preferred because the magnetic moment is confined in a direction parallel to the flat surface, and magnetization is likely to proceed by rotation magnetization, which is preferable. In a case in which magnetization proceeds by rotation magnetization, since magnetization is likely to proceed reversibly, coercivity is decreased, and the hysteresis loss can be reduced thereby, which is preferable.

The average thickness t is determined by observing the flaky magnetic metal particles by transmission electron microscopy (TEM) or scanning electron microscopy (SEM). The average aspect ratio of the flaky magnetic metal particles is between 5 and 10,000 inclusive. It is because magnetic permeability becomes larger as the result. It is also because the ferromagnetic resonance frequency can be increased, and therefore, the ferromagnetic resonance loss can be made small. Furthermore, when the aspect ratio is high, the magnetic moment is confined in a direction parallel to the flat surface, and magnetization is likely to proceed by rotation magnetization, which is preferable. In a case in which magnetization proceeds by rotation magnetization, since magnetization is likely to proceed reversibly, coercivity becomes small, and the hysteresis loss can be reduced thereby, which is preferable.

The average aspect ratio is defined by the formula: $(((a+b)/2)/t)$, using the maximum length a, the minimum length b, and thickness t in the flat surface. The maximum length a and the minimum length b are determined as follows. The flat surface is subjected to TEM observation or SEM observation and the maximum length a and the minimum length b are determined.

Figure 2:
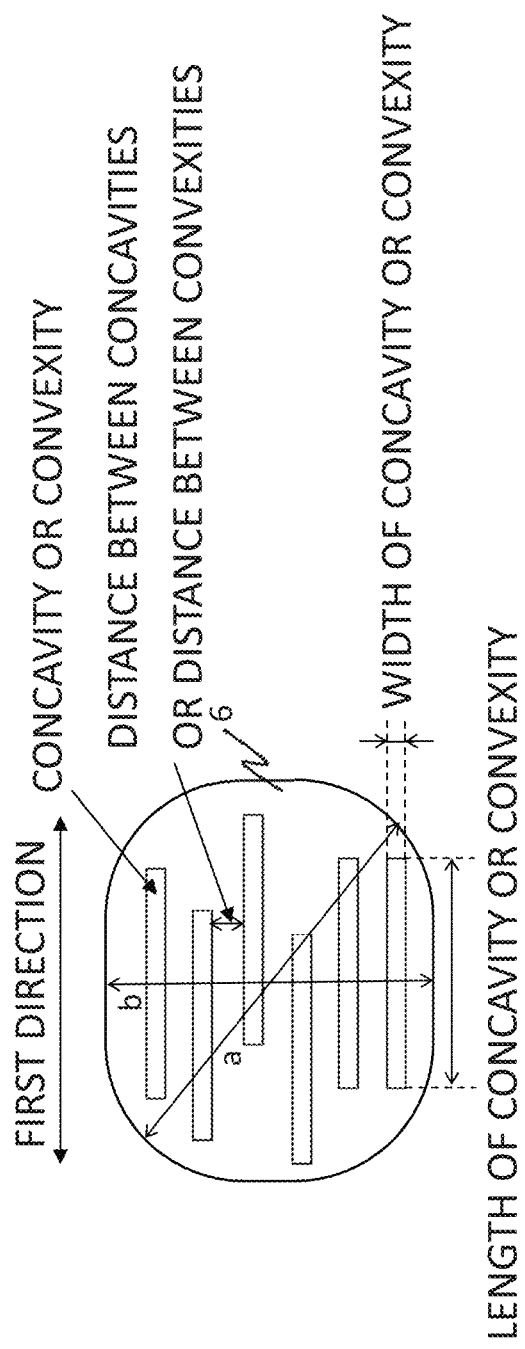
FIG. 2 is a schematic diagram illustrating the flaky magnetic metal particles according to the first embodiment of the invention.

FIG. 1 and FIG. 2 are schematic diagrams illustrating the flaky magnetic metal particles of the present embodiment. FIG. 1 is a schematic perspective view of the flaky magnetic metal particles of the present embodiment. In the upper diagram of FIG. 1, only concavities are provided, and in the middle diagram of FIG. 1, only convexities are provided. However, one flaky magnetic metal particle may have both concavities and convexities, as shown in the lower diagram of FIG. 1. FIG. 2 is a schematic diagram illustrating the case in which a flaky magnetic metal particle of the present embodiment is viewed from above. The width and length of the concavities or convexities, and the distance between concavities or convexities are shown. The aspect ratio of a concavity or a convexity is the ratio of the length of the major axis to the length of the minor axis, and in FIG. 1(b), the aspect ratio is the ratio of (length of a concavity or a convexity)/(width of a concavity or a convexity). In FIG. 1, concavities 2a, convexities 2b, flat surfaces 6, and flaky magnetic metal particles 10 are shown.

A flaky magnetic metal particle has, on the flat surface, either or both of a plurality of concavities and a plurality of convexities that are arranged in a first direction, each of the concavities or the convexities having a width of 0.1 μm or more, a length of 1 μm or more, and an aspect ratio of 2 or higher. The aspect ratio is defined by the ratio of the size in the longitudinal direction to the size in the transverse direction. That is, in a case in which the length side is larger (longer) than the width, the aspect ratio is defined by the ratio of length to width, and in a case in which the width is larger (longer) than the length, the aspect ratio is defined by the ratio of width to length. It is more preferable that the length side is larger (longer) than the width, because the flaky magnetic metal particle is likely to have magnetic uniaxial anisotropy. Furthermore, concavities or convexities are arranged in the first direction on the flat surface. Here, the phrase "(be) arranged in the first direction" implies that concavities or convexities are arranged such that the longer side between the length and the width of the concavities or the convexities is parallel to the first direction. Meanwhile, when concavities or convexities are arranged such that the longer side between the length and the width of the concavities or the convexities is within ±30° in a direction parallel to the first direction, it is said that the concavities or convexities are "arranged in the first direction". As a result, the flaky magnetic metal particles are likely to have magnetic uniaxial anisotropy in the first direction by a shape magnetic anisotropy effect, which is preferable. It is preferable that the flaky magnetic metal particles have magnetic anisotropy in one direction within the flat surface, and this will be explained in detail. First, in a case in which the magnetic domain structure of the flaky magnetic metal particles is a multi-domain structure, the magnetization process proceeds by domain wall displacement; however, in this case, coercivity in the easy axis direction within the flat surface becomes lower than that in the hard axis direction, and losses (hysteresis loss) are decreased. Furthermore, magnetic permeability in the easy axis direction becomes higher than that in the hard axis direction. Furthermore, compared to the case of flaky magnetic metal particles that are isotropic, particularly the coercivity in the easy axis direction becomes lower in the case of flaky magnetic metal particles having magnetic anisotropy, and as a result, losses become smaller, which is preferable. Also, magnetic permeability becomes high, and it is preferable. That is, when the flaky magnetic metal particles have magnetic anisotropy in a direction within the flat surface, magnetic characteristics are enhanced as compared to an isotropic material. Particularly, magnetic characteristics are superior in the easy axis direction within the flat surface than in the hard axis direction, which is preferable. Next, in a case in which the magnetic domain structure of the flaky magnetic metal particles is a single domain structure, the magnetization process proceeds by rotation magnetization; however, in this case, coercivity in the hard axis direction within the flat surface becomes lower than that in the easy axis direction, and losses become small. In a case in which magnetization proceeds completely by rotation magnetization, coercivity becomes zero, and the hysteresis loss becomes zero, which is preferable. Whether magnetization proceeds by domain wall displacement (domain wall displacement type) or by rotation magnetization (rotation magnetization type) can be determined on the basis of whether the magnetic domain structure becomes a multi-domain structure or a single domain structure. At this time, whether the magnetic domain structure becomes a multi-domain structure or a single domain structure is determined on the basis of the size (thickness or aspect ratio) of the flaky magnetic metal particles, composition, the condition of the magnetic interaction between particles, and the like. For example, as the thickness t of the flaky magnetic metal particles is smaller, the magnetic domain structure is more likely to become a single domain structure, and when the thickness is between 10 nm and 1 μm inclusive, and particularly when the thickness is between 10 nm and 100 nm inclusive, the magnetic domain structure is likely to become a single domain structure. Regarding the composition, in a composition having high magnetocrystalline anisotropy, even if the thickness is large, it tends to be easy to maintain a single domain structure. In a composition having low magnetocrystalline anisotropy, if the thickness is not small, it tends to be difficult to maintain a single domain structure. That is, the thickness of the borderline between being a single domain structure or a multi-domain structure varies also depending on the composition. Furthermore, when the flaky magnetic metal particles magnetically interact with neighboring particles, and the magnetic domain structure is stabilized, the magnetic domain structure is likely to become a single domain structure. The determination of whether the magnetization behavior is of the domain wall displacement type or of the rotation magnetization type can be made simply as follows. First, within a plane of the material (a plane that is parallel to the flat surface of a flaky magnetic metal particle), magnetization is analyzed by varying the direction in which a magnetic field is applied, and two directions in which the difference in the magnetization curve becomes the largest (at this time, the two directions are directions tilted by 90° from each other) are found out. Next, a comparison is made between the curves of the two directions, and thereby it can be determined whether the magnetization behavior is of the domain wall displacement type or the rotation magnetization type.

The magnitude of uniaxial magnetic anisotropy in the flat surface is preferably between 0.1 Oe and 10 kOe inclusive, more preferably between 1 Oe and 1 kOe inclusive, and even more preferably between 1 Oe and 100 Oe inclusive. In regard to whether a material has magnetic anisotropy, and to what extent the material has magnetic anisotropy, an evaluation can be conveniently performed by varying the direction and making measurement using, for example, a vibrating sample magnetometer (VSM) or the like. A conventional pressed powder that uses flaky particles is fundamentally different from the present embodiment in that the conventional pressed powder is magnetically isotropic within the flat surface. As a result of having magnetic anisotropy within the flat surface, the magnetic characteristics are significantly enhanced.

As described above, it is preferable that the flaky magnetic metal particles have magnetic anisotropy in one direction within the flat surface; however, more preferably, when the flaky magnetic metal particles have either or both of a plurality of concavities and a plurality of convexities that are arranged in a first direction, each of the concavities and the convexities having a width of 0.1 μm or more, a length of 1 μm or more, and an aspect ratio of 2 or higher, magnetic anisotropy is more easily induced in the first direction, which is more preferable. From this point of view, more preferably, a width of 1 μm or more and a length of 10 μm or more are preferred. The aspect ratio is preferably 5 or higher, and more preferably 10 or higher. By having such concavities or convexities provided on the flaky magnetic metal particles, the adhesiveness between the flaky magnetic metal particles is enhanced at the time of synthesizing a pressed powder material by powder-compacting the flaky magnetic metal particles (the concavities or convexities bring about an anchoring effect of attaching the particles to neighboring particles). As a result, mechanical characteristics such as strength and hardness, and thermal stability are enhanced, and therefore, it is preferable.

Figure 3:
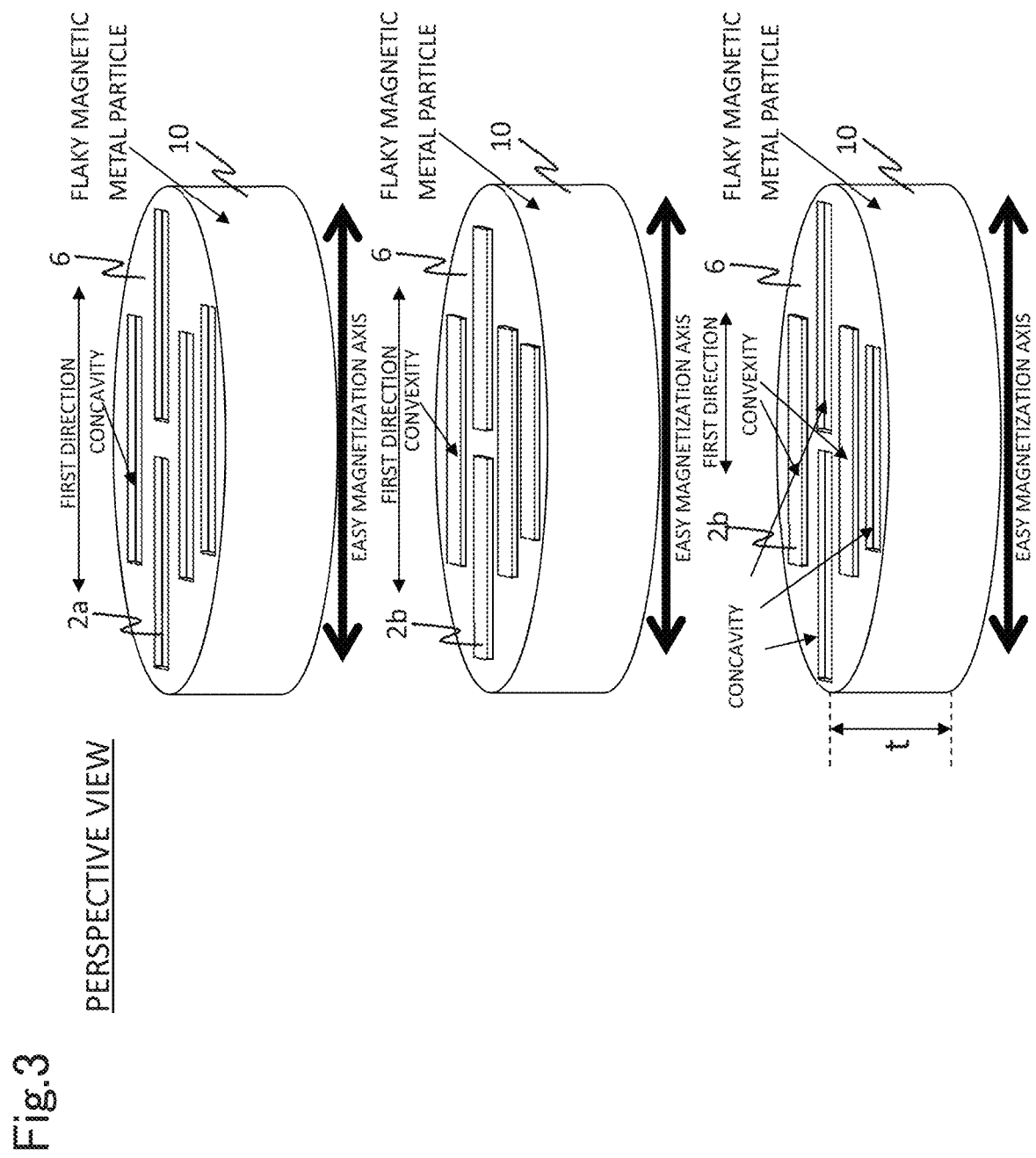
FIG. 3 is a schematic diagram illustrating the desired direction of the easy magnetization axis of the flaky magnetic metal particles according to the first embodiment of the invention.
Figure 4:
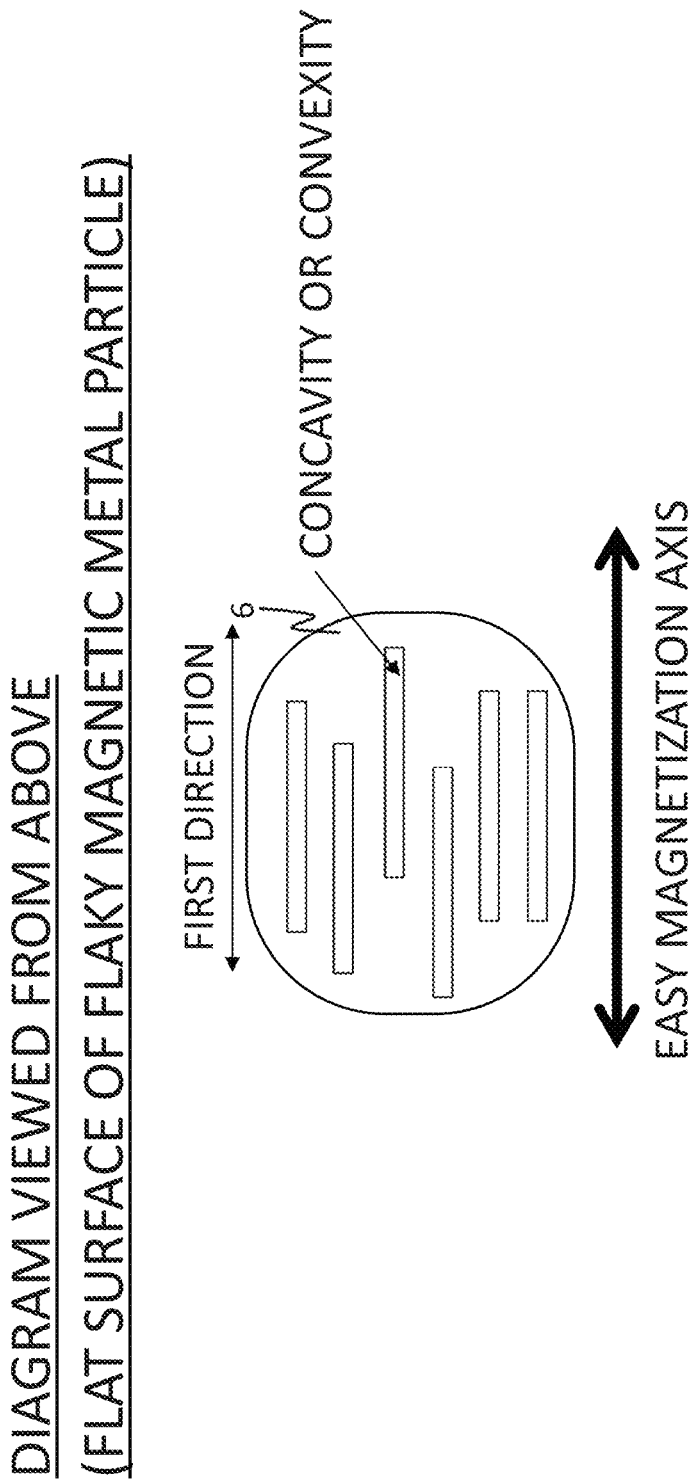
FIG. 4 is a schematic diagram illustrating the desired direction of the easy magnetization axis of the flaky magnetic metal particles according to the first embodiment of the invention.

In regard to the flaky magnetic metal particles, it is preferable that the first directions of either or both of a plurality of concavities and a plurality of convexities are arranged in the direction of the easy magnetization axis. That is, in a case in which there is a large number of directions of arrangement (=first directions) within the flat surface of a flaky magnetic metal particle, it is preferable that the direction of arrangement (=first directions) that accounts for the largest proportion in the large number of directions of arrangement (=first directions), coincides with the direction of the easy axis of the flaky magnetic metal particles. Since the length direction in which the concavities or convexities are arranged, namely, the first direction, is likely to become the easy magnetization axis as a result of the effect of shape magnetic anisotropy, when the flaky magnetic metal particles are aligned with respect to this direction as the easy magnetization axis, magnetic anisotropy may be easily imparted, which is preferable. For the reference, FIG. 3 and FIG. 4 present schematic diagrams illustrating the desired directions of the easy magnetization axis of the flaky magnetic metal particles.

Figure 5:
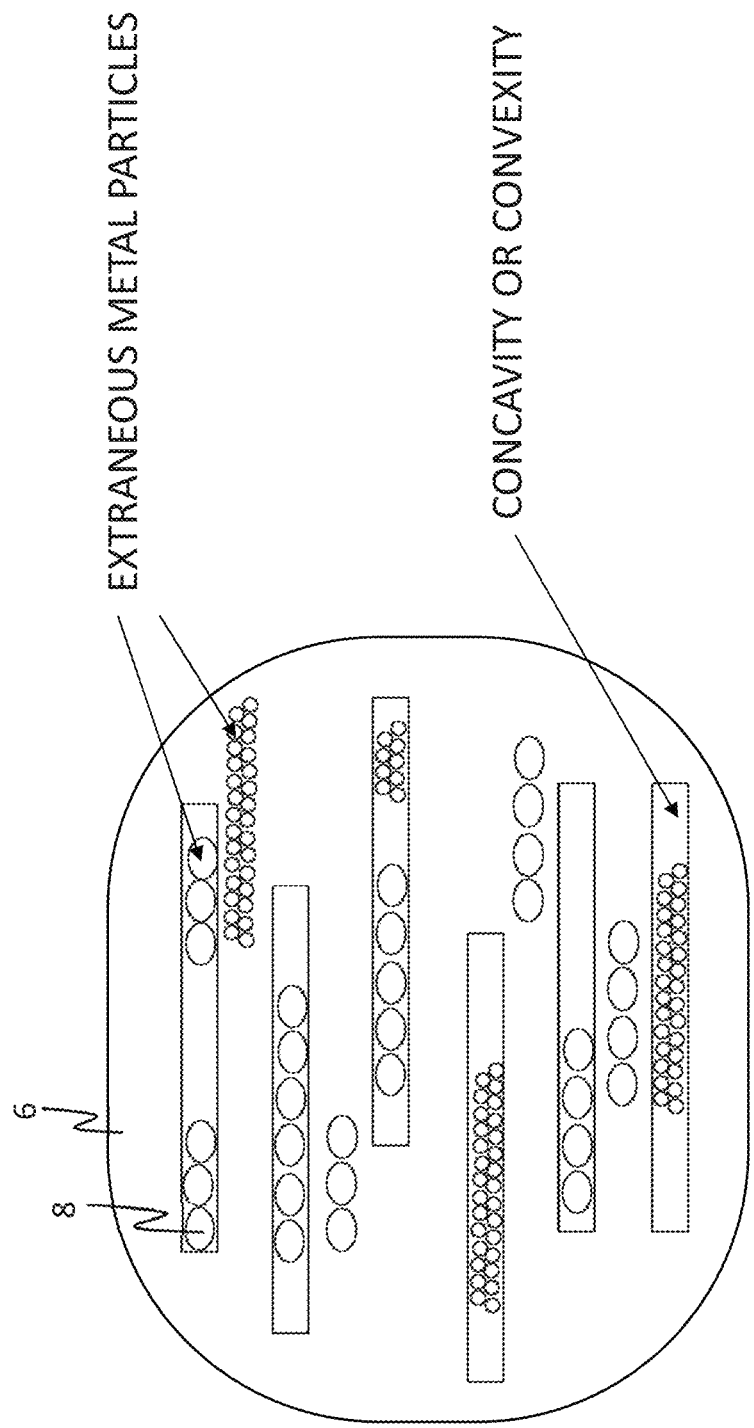
FIG. 5 is a schematic diagram illustrating flaky magnetic metal particles containing extraneous metal particles according to the first embodiment of the invention.
Figure 6:
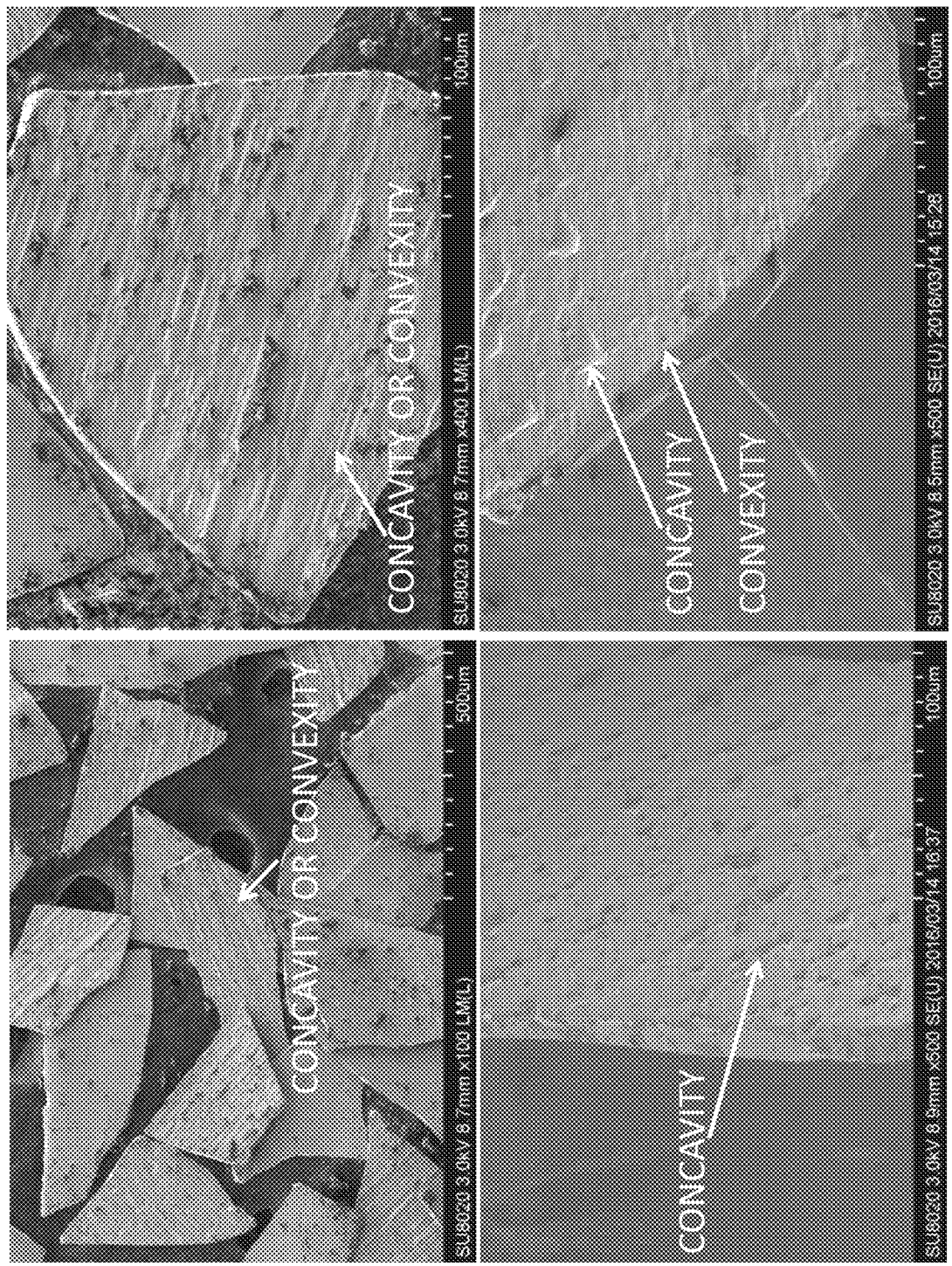
FIG. 6 is a scanning electron microscopic photograph of the flaky magnetic metal particles according to the first embodiment of the invention.
Figure 7:
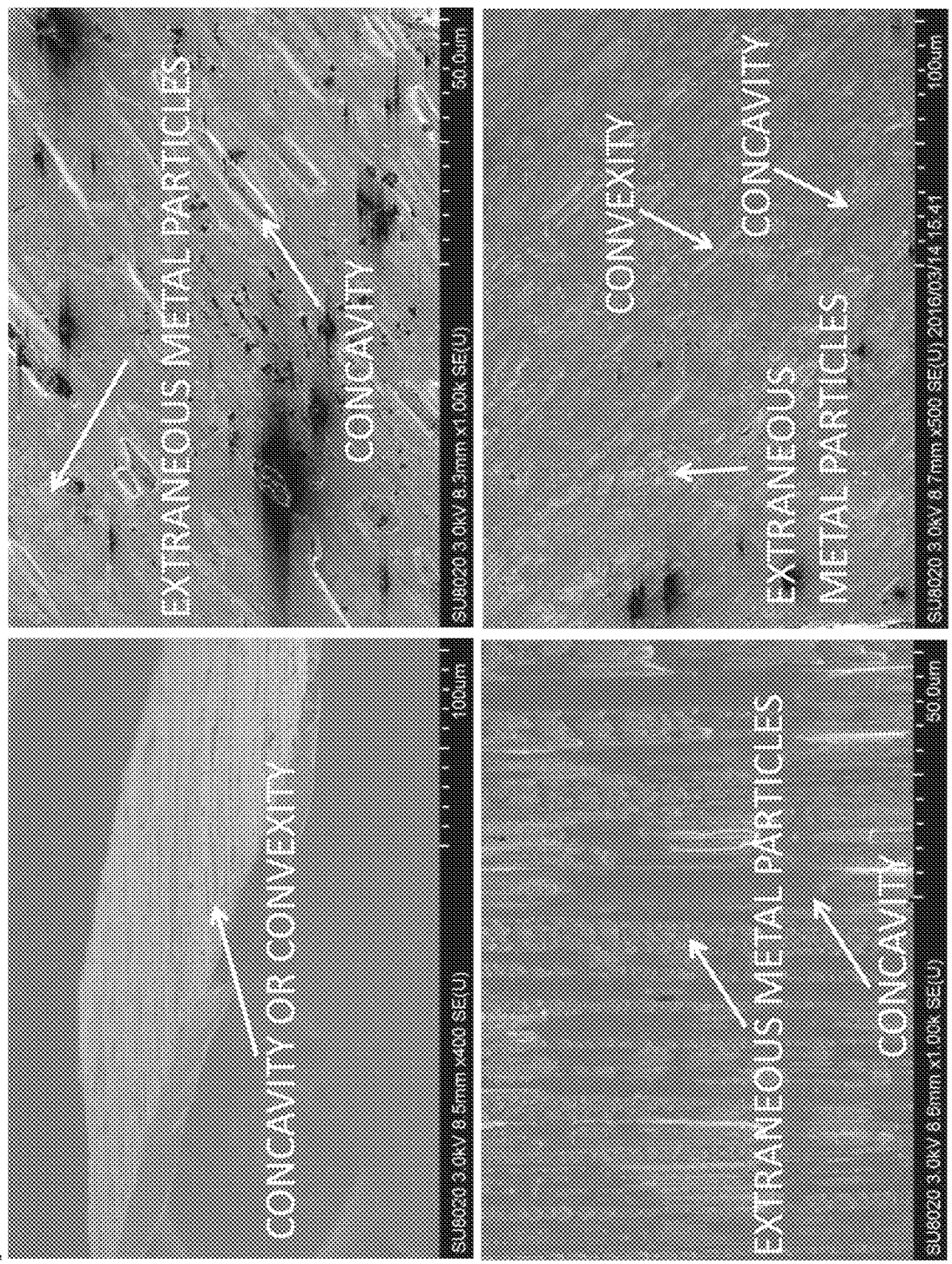
FIG. 7 is a scanning electron microscopic photograph of the flaky magnetic metal particles according to the first embodiment of the invention.

In regard to either or both of the concavities and the convexities, it is desirable that five or more on the average of those are included in one flaky magnetic metal particle. Here, five or more concavities may be included, five or more convexities may be included, or the sum of the number of concavities and the number of convexities may be 5 or larger. More preferably, it is desirable that ten or more of concavities or convexities are included. It is also desirable that the average distance in the width direction between the respective concavities or convexities is between 0.1 μm and 100 μm inclusive. It is also desirable that a plurality of extraneous metal particles containing at least one first element selected from the group consisting of Fe, Co and Ni as described above and having an average size of between 1 nm and 1 μm inclusive, are arranged along the concavities or convexities. Regarding the method of determining the average size of the extraneous metal particles, the average size is calculated by averaging the sizes of a plurality of extraneous metal particles arranged along the concavities or convexities, based on SEM observation or TEM observation. When these conditions are satisfied, magnetic anisotropy is induced in one direction, which is preferable. Furthermore, the adhesiveness between the flaky magnetic metal particles is enhanced when a pressed powder material is synthesized by powder-compacting the flaky magnetic metal particles (the concavities or convexities bring about an anchoring effect of attaching the particles to neighboring particles), and as a result, mechanical characteristics such as strength and hardness, and thermal stability are enhanced, which is preferable. For reference, FIG. 5 presents a schematic diagram of flaky magnetic metal particles including extraneous metal particles. In FIG. 5, extraneous metal particles 8 are shown. Furthermore, FIG. 6 and FIG. 7 show examples of scanning electron microscopic photographs of the flaky magnetic metal particles of the first embodiment.

The flaky magnetic metal particles contain at least one first element selected from the group consisting of Fe (iron), Co (cobalt), and Ni (nickel).

The flaky magnetic metal particles and the extraneous metal particles respectively contain Fe and Co, and the amount of Co is preferably between 10 at % and 60 at % inclusive, and more preferably between 10 at % and 40 at % inclusive, with respect to the total amount of Fe and Co. As a result, an appropriately high magnetic anisotropy is likely to be imparted, and the magnetic characteristics described above are enhanced, which is preferable. Furthermore, a Fe—Co-based material is preferable because high saturation magnetization can be easily realized. Furthermore, as the composition ranges of Fe and Co are within the ranges described above, superior saturation magnetization can be realized, which is preferable. Furthermore, when the compositions of the flaky magnetic metal particles and the extraneous metal particles are equal, thermal stability and mechanical characteristics such as strength and hardness are easily enhanced, which is preferable.

It is preferable that the flaky magnetic metal particles and the extraneous metal particles contain at least one nonmagnetic metal selected from the group consisting of magnesium (Mg), aluminum (Al), silicon (Si), calcium (Ca), zirconium (Zr), titanium (Ti), hafnium (Hf), zinc (Zn), manganese (Mn), barium (Ba), strontium (Sr), chromium (Cr), molybdenum (Mo), silver (Ag), gallium (Ga), scandium (Sc), vanadium (V), yttrium (Y), niobium (Nb), lead (Pb), copper (Cu), indium (In), tin (Sn), and rare earth metal elements. As a result, the thermal stability and oxidation resistance of the flaky magnetic metal particles can be increased. Above all, Al and Si are particularly preferred because these elements can easily form solid solutions with Fe, Co and Ni, which are main components of the flaky magnetic metal particles, and contribute to an enhancement of thermal stability and oxidation resistance.

In order to induce magnetic anisotropy, a method of amorphizing the crystallinity of the flaky magnetic metal particles as far as possible, and thereby inducing magnetic anisotropy in one direction in plane by means of a magnetic field or strain, may be employed. In this case, it is desirable that the flaky magnetic metal particles adopt a composition that can be easily amorphized as far as possible. From this point of view, it is preferable that the magnetic metals included in the flaky magnetic metal particles include at least one additive element selected from boron (B), silicon (Si), aluminum (Al), carbon (C), titanium (Ti), zirconium (Zr), hafnium (Hf), niobium (Nb), tantalum (Ta), molybdenum (Mo), chromium (Cr), copper (Cu), tungsten (W), phosphorus (P), nitrogen (N), gallium (Ga), and yttrium (Y). An additive element having a larger difference between the atomic radius of the additive element and the atomic radius of at least one first element selected from the group consisting of Fe, Co and Ni, is preferred. Furthermore, an additive element such that the enthalpy of mixing of at least one first element selected from the group consisting of Fe, Co and Ni with the additive element increases negatively, is preferred. Also, a multicomponent system that includes the first element and an additive element and is composed of three or more kinds of elements in total, is preferred. Since semimetallic additive elements such as B and Si have slow rates of crystallization and are easily amorphized, it is advantageous if the semimetallic additive elements are mixed into the system. From the viewpoint as described above, B, Si, P, Ti, Zr, Hf, Nb, Y, Cu, and the like are preferable, and above all, it is more preferable that the additive element includes any one of B, Si, Zr, and Y. It is also preferable that the additive elements are included in a total amount of between 0.001 at % and 80 at % inclusive with respect to the total amount of the first element and the additive element. The total amount of the additive element is more preferably between 5 at % and 80 at % inclusive, and even more preferably between 10 at % and 40 at % inclusive. As the total amount of the additive element is larger, amorphization proceeds further, and it becomes easier to impart magnetic anisotropy, which is preferable (that is, preferable from the viewpoints of low losses and high magnetic permeability). However, on the other hand, since the proportion of the magnetic metal phase becomes smaller, it is not preferable from the viewpoint that saturation magnetization is lowered. However, depending on the use application (for example, magnetic wedges of a motor), even a material having relatively low saturation magnetization can be sufficiently used, and there are occasions in which it is rather preferable that the material specializes in low losses and high magnetic permeability. Meanwhile, magnetic wedges of a motor are lid-like objects for the slot part into which a coil is inserted. Usually, non-magnetic wedges are used; however, when magnetic wedges are employed, the sparseness or denseness of the magnetic flux density is moderated, the harmonic loss is reduced, and the motor efficiency is increased. At this time, it is preferable that saturation magnetization of the magnetic wedges is higher; however, even with relatively low saturation magnetization (for example, about 0.5 to 1 T), sufficient effects are manifested. Therefore, it is important to select an appropriate composition and appropriate amounts of additive elements depending on the use application.

It is preferable that the flaky magnetic metal particles have a portion containing Fe and Co and having a body-centered cubic (bcc) crystal structure. As a result, an appropriately high magnetic anisotropy may be easily imparted, and the magnetic characteristics described above are enhanced, which is preferable. Furthermore, even with a "crystal structure of a mixed phase of bcc and face-centered cubic (fcc)" that partially contains a fcc crystal structure, an appropriately high magnetic anisotropy may be easily imparted, and the above-mentioned magnetic characteristics are enhanced. Therefore, it is preferable.

It is preferable that the flat surface is crystallographically oriented. Regarding the direction of orientation, the (110) plane orientation and the (111) plane orientation are preferred, and the (110) plane orientation is more preferred. In a case in which the crystal structure of the flaky magnetic metal particles is a body-centered cubic (bcc) structure, the (110) plane orientation is preferred, and in a case in which the crystal structure of the flaky magnetic metal particles is a face-centered cubic (fcc) structure, the (111) plane orientation is preferred. As a result, an appropriately high magnetic anisotropy may be easily imparted, and the above-described magnetic characteristics are enhanced.

Therefore, it is preferable.

Furthermore, regarding a more preferred direction of orientation, the (110) [111] direction and the (111) [110] direction are preferred, and the (110) [111] direction is more preferred. When the crystal structure of the flaky magnetic metal particles is a body-centered cubic (bcc) structure, orientation in the (110) [111] direction is preferred, and when the crystal structure of the flaky magnetic metal particles is a face-centered cubic (fcc) structure, orientation in the (111) [110] direction is preferred. As a result, an appropriately high magnetic anisotropy may be easily imparted, and the above-described magnetic characteristics are enhanced, which is preferable. According to the present specification, the "(110) [111] direction" refers to a direction in which the slip plane is the (110) plane or a plane crystallographically equivalent thereto, namely, the {110} plane, and the slip direction is the [111] direction or a direction crystallographically equivalent thereto, namely, the <111> direction. The same also applies to the (111) [110] direction. That is, the (111) [110] direction refers to a direction in which the slip plane is the (111) plane or a plane crystallographically equivalent thereto, namely, the {111} plane, and the slip direction is the [110] direction or a direction crystallographically equivalent thereto, namely, the <110> direction.

The lattice strain of the flaky magnetic metal particles 10 is preferably between 0.01% and 10% inclusive, more preferably between 0.01% and 5% inclusive, even more preferably between 0.01% and 1% inclusive, and still more preferably between 0.01% and 0.5% inclusive. As a result, an appropriately high magnetic anisotropy may be easily imparted, and the magnetic characteristics described above are enhanced, which is preferable.

The lattice strain can be calculated by analyzing in detail the line width obtainable by an X-ray diffraction (XRD) method. That is, by drawing a Halder-Wagner plot or a Hall-Williamson plot, the extent of contribution made by expansion of the line width can be separated into the crystal grain size and the lattice strain. The lattice strain can be calculated thereby. A Halder-Wagner plot is preferable from the viewpoint of reliability. In regard to the Halder-Wagner plot, for example, N. C. Halder, C. N. J. Wagner, Acta Cryst., 20 (1966), 312-313 may be referred to. Here, a Halder-Wagner plot is expressed by the following expression:

[Mathematical Formula 1]

$$\frac{\beta^2}{\tan^2\theta} = \frac{K\lambda}{D}\frac{\beta}{\tan\theta\sin\theta} + 16\varepsilon^2,$$

$$\varepsilon = \varepsilon_{max} = \frac{\sqrt{2\pi}}{2}\sqrt{\overline{\varepsilon^2}}$$

($\beta$: width of integration, $K$: constant, $\lambda$: wavelength, $D$: crystal grain size, $\sqrt{\overline{\varepsilon^2}}$ : crystal strain (root mean square))

($\beta$: integrated width, K: constant, $\lambda$: wavelength, D: crystal grain size, $\sqrt{\varepsilon^2}$: lattice strain (root-mean-square))

That is, $\beta^2/\tan^2\theta$ is plotted on the vertical axis, and $\beta/\tan\theta\cdot\sin\theta$ is plotted on the horizontal axis. The crystal grain size D is calculated from the gradient of the approximation straight line of the plot, and the lattice strain E is calculated from the ordinate intercept. When the lattice strain obtained by the Halder-Wagner plot of the expression described above (lattice strain (root-mean-square)) is between 0.01% and 10% inclusive, more preferably between 0.01% and 5% inclusive, even more preferably between 0.01% and 1% inclusive, and still more preferably between 0.01% and 0.5% inclusive, an appropriately high magnetic anisotropy may be easily imparted, and the magnetic characteristics described above are enhanced, which is preferable.

The lattice strain analysis described above is a technique that is effective in a case in which a plurality of peaks can be detected by XRD; however, in a case in which the peak intensities in XRD are weak, and there are few peaks that can be detected (for example, in a case in which only one peak is detected), it is difficult to perform an analysis. In such a case, it is preferable to calculate the lattice strain by the following procedure. First, the composition is determined by high-frequency inductively coupled plasma (ICP) emission spectroscopy, energy dispersive X-ray spectroscopy (EDX), or the like, and the composition ratio of three magnetic metal elements, namely, Fe, Co and Ni, is calculated (in a case in which there are only two magnetic metal elements, the composition ratio of two elements; in a case in which there is only one magnetic metal element, the composition ratio of one element (=100%)). Next, an ideal lattice spacing $d_0$ is calculated from the composition of Fe—Co—Ni (refer to the values published in the literature, or the like. In some cases, an alloy of the composition is produced, and the lattice spacing is calculated by making a measurement). Subsequently, the amount of strain can be determined by determining the difference between the lattice spacing d of the peaks of an analyzed sample and the ideal lattice spacing $d_0$. That is, in this case, the amount of strain is calculated by the expression: $(d-d_0)/d_0\times100(\%)$. Thus, in regard to the analysis of the lattice strain, it is preferable to use the two above-described techniques appropriately depending on the state of peak intensity, and depending on cases, it is preferable to evaluate the amount of strain by using the two techniques in combination.

The lattice spacing in the flat surface varies depending on the direction, and the proportion of the difference between the maximum lattice spacing $d_{max}$ and the minimum lattice spacing $d_{min}$ $(=(d_{max}-d_{min})/d_{min}\times100(\%))$ is preferably between 0.01% and 10% inclusive, more preferably between 0.01% and 5% inclusive, even more preferably between 0.01% and 1% inclusive, and still more preferably between 0.01% and 0.5% inclusive. As a result, an appropriately high magnetic anisotropy may be easily imparted, and the magnetic characteristics described above are enhanced, which is preferable. Furthermore, the lattice spacing can be conveniently determined by an XRD analysis. When this XRD analysis is carried out while the direction is varied within a plane, the differences in the lattice constant depending on the direction can be determined.

In regard to crystallites of the flaky magnetic metal particles, it is preferable that either the crystallites are unidirectionally linked in a row within the flat surface, or the crystallites are rod-shaped and are unidirectionally oriented within the flat surface. As a result, an appropriately high magnetic anisotropy may be easily imparted, and the magnetic characteristics described above are enhanced, which is preferable.

It is desirable that the ratio a/b of the maximum length a within the flat surface with respect to the minimum length b is between 1 and 5 inclusive on the average. As a result, when the particles are powder-compacted, there is less chance that the particles are powder-compacted in a bent state, and the stress applied to the particles is likely to be reduced. That is, strain is reduced, this leads to the reduction of coercivity and hysteresis loss, and also, since stress is reduced, thermal stability and mechanical characteristics such as strength and toughness can be easily enhanced.

It is desirable that the contour of the flat surface is slightly round. In an extreme example, it is desirable to employ a round contour such as a circle or an ellipse, rather than employing a square or rectangular contour. As a result, stress is not easily concentrated around the contour, the magnetic strain of the flaky magnetic metal particles is reduced, the coercivity decreases, and the hysteresis is reduced, which is desirable. Since stress concentration is reduced, thermal stability or mechanical characteristics such as strength and toughness can also be easily enhanced, which is desirable.

Figure 8:
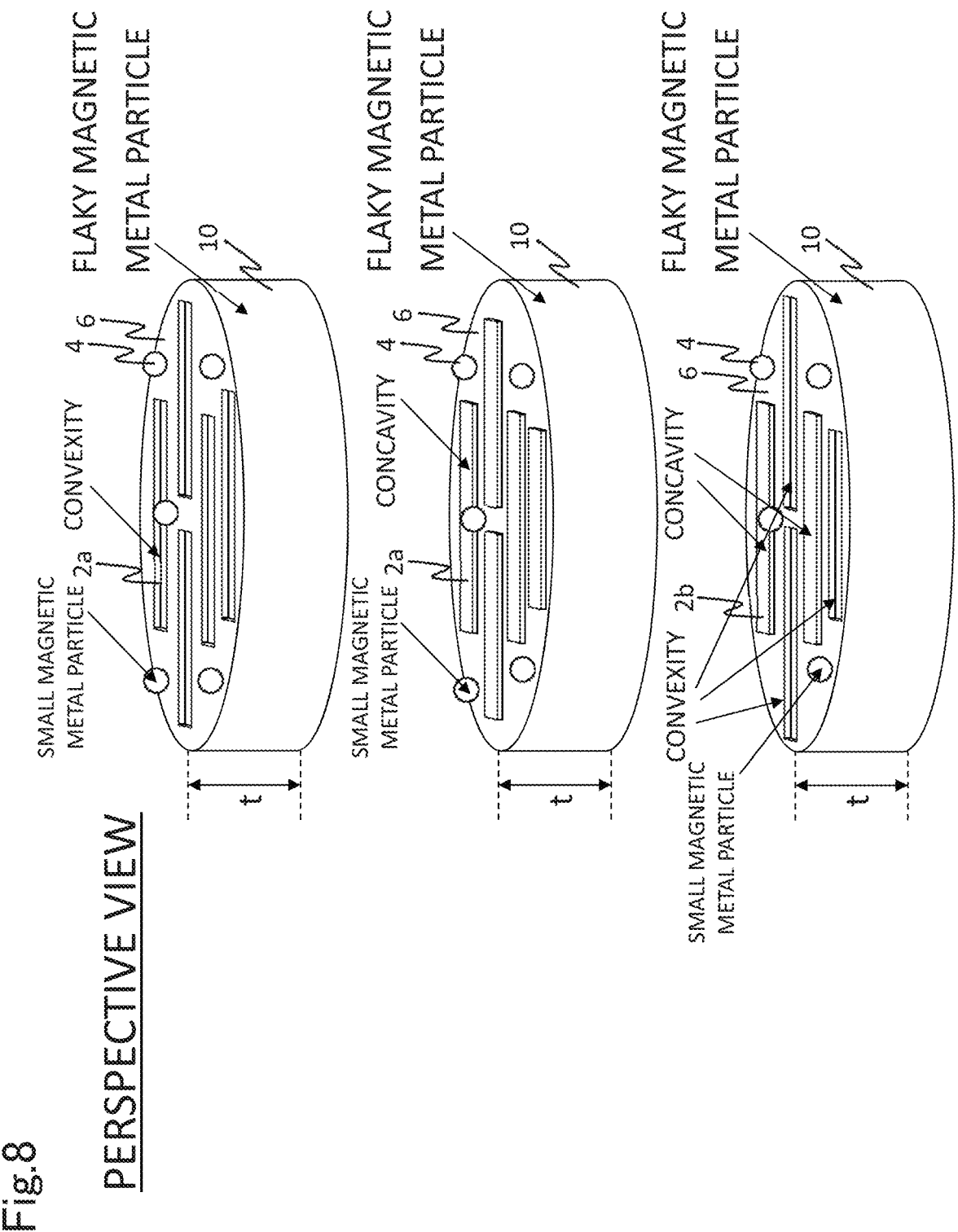
FIG. 8 is a schematic diagram illustrating flaky magnetic metal particles having small magnetic metal particles according to the first embodiment of the invention.

It is desirable that each of the flaky magnetic metal particles further comprises a plurality of small magnetic metal particles, that is, 5 or more particles on the average, on the flat surface. FIG. 8 is a schematic diagram of flaky magnetic metal particles having small magnetic metal particles. Small magnetic metal particles 4 are shown. The small magnetic metal particles contain at least one first element selected from the group consisting of Fe, Co and Ni, and the average particle size is between 10 nm and 1 μm inclusive. More preferably, the small magnetic metal particles have a composition that is equal to that of the flaky magnetic metal particles. As the small magnetic metal particles are provided on the surface of the flat surface, or the small magnetic metal particles are integrated with the flaky magnetic metal particles, the surface of the flaky magnetic metal particles is brought to an artificially slightly damaged state. As a result, when the flaky magnetic metal particles are powder-compacted together with an interposed phase that will be described below, adhesiveness is greatly enhanced. As a result, thermal stability and mechanical characteristics such as strength and toughness can be easily enhanced. In order to manifest such effects at the maximum level, it is desirable that the average particle size of the small magnetic metal particles is adjusted to be between 10 nm and 1 μm inclusive, and 5 or more small magnetic metal particles on the average are integrated with the surface, that is, the flat surface, of the flaky magnetic metal particles. When the small magnetic metal particles are unidirectionally arranged within the flat surface, magnetic anisotropy may be easily imparted within the flat surface, and high magnetic permeability and low losses can be easily realized. Therefore, it is more preferable. The average particle size of the small magnetic metal particles is determined by observing the particles by TEM or SEM.

The variation in the particle size distribution of the flaky magnetic metal particles can be defined by the coefficient of variation (CV value). That is, CV value (%)=[Standard deviation of particle size distribution (μm)/average particle size (μm)]×100. It can be said that as the CV value is smaller, a sharp particle size distribution with less variation in the particle size distribution is obtained. When the CV value defined as described above is between 0.1% and 60% inclusive, low coercivity, low hysteresis loss, high magnetic permeability, and high thermal stability can be realized, which is preferable. Furthermore, since the variation is small, it is also easy to realize high yield. A more preferred range of the CV value is between 0.1% and 40% inclusive.

Next, a method for producing the flaky magnetic metal particles of the present embodiment will be described.

According to the method for producing the flaky magnetic metal particles of the present embodiment, a magnetic metal ribbon containing at least one first element selected from the group consisting of Fe, Co, and Ni is produced, the magnetic metal ribbon is heat-treated at a temperature of between 50° C. and 800° C. inclusive, and the heat-treated magnetic metal ribbon is pulverized. Thus, flaky magnetic metal particles are produced.

Hereinafter, the production method will be explained specifically. In regard to the production method, there are no particular limitations, and the production method will be explained only for illustrative purposes.

A first step is a step of producing a magnetic metal ribbon containing at least one first element selected from the group consisting of Fe, Co, and Ni. The present step is a step of producing a ribbon or a thin film by using a film-forming apparatus such as a roll quenching apparatus or a sputtering apparatus. At this time, in regard to the film-forming method of producing a film using a film-forming apparatus, it is desirable to produce a film that is imparted with uniaxial anisotropy within the film plane, through film formation in a magnetic field, rotational film formation or the like. Furthermore, in the case of using a film-forming apparatus, the thickness can be made small, the structure may be easily refined, and rotation magnetization may easily occur. Therefore, in the case of producing a rotation magnetization type film, it is desirable to use a film-forming method. Since a roll quenching apparatus is adequate for synthesis in large quantities, the apparatus is useful when a bulk material is synthesized. In the case of the roll quenching apparatus, a single roll quenching apparatus is convenient and preferable. Furthermore, when the process is carried out in a state in which the roughness of the roll surface is appropriately controlled, concavities or convexities can be easily transferred and produced in the surface of the ribbon thus synthesized. Therefore, it is very important to control the roughness of the roll surface. Regarding the roughness of the roll surface, it is preferable to polish the roll surface in one direction (in the length direction of the ribbon) with a polishing paper of between #80 and #4000 inclusive. More preferably, it is preferable that the roll surface is polished with a polishing paper of between #80 and #2000 inclusive, even more preferably between #80 and #600 inclusive, and still more preferably near #180. As a result, flaky magnetic metal particles that include concavities or convexities on a flat surface, each of the concavities or convexities having a width of 0.1 μm or more, a length of 1 μm or more, and an aspect ratio of 2 or higher, and have the concavities or convexities arranged unidirectionally on the flat surface, can be synthesized easily, which is preferable.

A second step is a step of heat-treating the magnetic metal ribbon at a temperature between 50° C. and 800° C. inclusive. In the present step, the ribbon may be cut into an appropriate size in order to make it easy to introduce the ribbon into an electric furnace for heat treatment. For example, the ribbon may be cut into an appropriate size using a mixing apparatus or the like. As a result of performing the present step, pulverizability is likely to be enhanced in the pulverization step, which is the subsequent third step, and thus it is desirable. Regarding the atmosphere for the heat treatment, a vacuum atmosphere at a low oxygen concentration, an inert atmosphere, or a reducing atmosphere is desirable. More desirably, a reducing atmosphere of $H_2$ (hydrogen), CO (carbon monoxide), $CH_4$ (methane) or the like is preferred. The reason for this is that even if the magnetic metal ribbon has been oxidized, the oxidized metal can be reduced and restored into simple metal by performing a heat treatment in a reduced atmosphere. As a result, a magnetic metal ribbon that has been oxidized and have lowered saturation magnetization can be reduced, and thereby saturation magnetization can be restored. When crystallization of the magnetic metal ribbon proceeds noticeably due to the heat treatment, characteristics are deteriorated (coercivity increases, and magnetic permeability decreases). Therefore, it is preferable to select the conditions so as to suppress excessive crystallization. Furthermore, more preferably, it is more desirable to perform the heat treatment in a magnetic field. It is more preferable if the magnetic field to be applied is larger; however, it is preferable to apply a magnetic field of 1 kOe or greater, and it is more preferable to apply a magnetic field of 10 kOe or greater. As a result, magnetic anisotropy can be manifested within the plane of the magnetic metal ribbon, and excellent magnetic characteristics can be realized, which is preferable.

A third step is a step of producing flaky magnetic metal particles by pulverizing the heat-treated magnetic metal ribbon. In the present step, the magnetic metal ribbon or thin film may be cut into an appropriate size using a mixing apparatus or the like, before the main pulverization. In the present step, pulverization is performed using, for example, a pulverizing apparatus such as a bead mill or a planetary mill. Regarding the pulverizing apparatus, there is no particular selection for the type. Examples include a planetary mill, a bead mill, a rotating ball mill, a vibrating ball mill, an agitating ball mill (attriter), a jet mill, a centrifuge, and techniques combining milling and centrifugation. On the occasion of pulverization, when pulverization is performed while the material is cooled to a temperature of 0° C. or lower, pulverization can proceed easily, which is preferable. Particularly, it is desirable to cool the material at the liquid nitrogen temperature (77 K), the dry ice temperature (194 K) or the like, and particularly above all, it is more desirable to cool the material to the liquid nitrogen temperature. As a result, the magnetic metal ribbon is likely to induce low temperature brittleness, and pulverization is carried out easily. That is, pulverization can be carried out efficiently without subjecting the magnetic metal ribbon to excessive stress or strain, and therefore, it is preferable. However, pulverization may also be achieved sufficiently without cooling in many cases, and in that case, cooling may not be implemented.

In the third step, the thickness of the flaky magnetic metal particles can be made small by not only simply performing pulverization but also combining pulverization with rolling. In a case in which a predetermined thickness has been obtained by up to the second step, the treatment for rolling may be omitted. Here, rolling may be performed simultaneously with pulverization, or rolling may be performed after pulverization, or pulverization may be performed after rolling. In this case, an apparatus capable of applying a strong gravitational acceleration is preferred, and the process can be performed using, for example, a planetary mill, a bead mill, a rotating ball mill, a vibrating ball mill, an agitating ball mill (attriter), a jet mill, a centrifuge, or a technique combining milling and centrifugation. For example, a high-power planetary mill apparatus is preferable because a gravitational acceleration of several ten G can be applied conveniently. In the case of a high-power planetary mill apparatus, an inclined type planetary mill apparatus is more preferred, in which the direction of rotational gravitational acceleration and the direction of revolutionary gravitational acceleration are not directions on the same straight line, but are directions that form an angle. In a conventional planetary mill apparatus, the direction of rotational gravitational acceleration and the direction of revolutionary gravitational acceleration are on the same straight line; however, in an inclined type planetary mill apparatus, since the vessel performs a rotating movement in an inclined state, the direction of rotational gravitational acceleration and the direction of revolutionary gravitational acceleration are not on the same straight line, but form an angle. As a result, power is efficiently transferred to the sample, and pulverization and rolling is carried with high efficiency, which is preferable. Furthermore, in consideration of mass productivity, a bead mill apparatus that facilitates treatment in large quantities is preferred.

It is desirable to perform a treatment so as to obtain flaky magnetic metal particles 10 having a predetermined thickness and a predetermined aspect ratio, by performing cutting, pulverization and rolling as described above (rolling is carried out as necessary; if not needed, rolling is not performed), and optionally repeating cutting, pulverization and rolling. At this time, when pulverization and rolling are performed so as to obtain a thickness of between 10 nm and 100 μm inclusive, more preferably between 10 nm and 1 μm inclusive, and even more preferably between 10 nm and 100 nm inclusive, particles that can easily undergo rotation magnetization are obtained, which is preferable.

Furthermore, for the flaky magnetic metal particles thus obtained, it is desirable to remove the lattice strain appropriately through a heat treatment. The heat treatment at this time is preferably performed at a temperature of between 50° C. and 800° C. inclusive, as in the case of the second step, and regarding the atmosphere for the heat treatment, a vacuum atmosphere at a low oxygen concentration, an inert atmosphere, or a reducing atmosphere is desirable. More desirably, a reducing atmosphere of $H_2$, CO, $CH_4$ or the like is preferred. Furthermore, more preferably, it is more desirable to perform the heat treatment in a magnetic field. Since the reasons for these and the details are similar to the case of the second step, no further explanation will be given here.

According to the present embodiment described above, flaky magnetic metal particles having low losses can be provided.

Second Embodiment

The flaky magnetic metal particles of the present embodiment are different from the particles of the first embodiment in that at least a portion of the surface of the flaky magnetic metal particles is covered with a coating layer that has a thickness of between 0.1 nm and 1 μm inclusive and contains at least one second element selected from the group consisting of oxygen (O), carbon (C), nitrogen (N), and fluorine (F). Here, any matters overlapping with the contents of the first embodiment will not be described repeatedly.

Figure 9A:
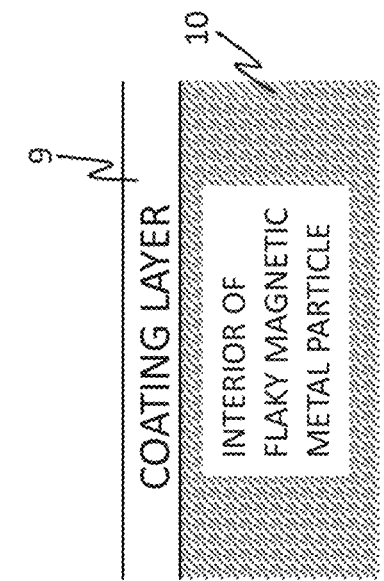
FIGS. 9A and 9B are schematic diagrams of the flaky magnetic metal particles according to a second embodiment of the invention.
Figure 9B:
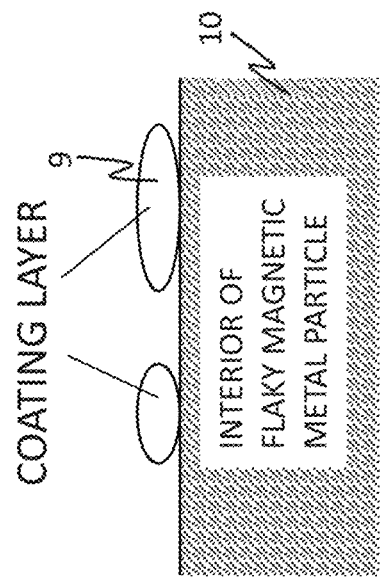

FIGS. 9A and 9B are schematic diagrams of the flaky magnetic metal particles of the present embodiment. The diagrams show a coating layer 9.

It is more preferable that the coating layer contains at least one non-magnetic metal selected from the group consisting of Mg, Al, Si, Ca, Zr, Ti, Hf, Zn, Mn, Ba, Sr, Cr, Mo, Ag, Ga, Sc, V, Y, Nb, Pb, Cu, In, Sn, and rare earth elements, and also contains at least one second element selected from the group consisting of oxygen (O), carbon (C), nitrogen (N) and fluorine (F). The non-magnetic metal is particularly preferably Al or Si, from the viewpoint of thermal stability. In a case in which the flaky magnetic metal particles contain at least one non-magnetic metal selected from the group consisting of Mg, Al, Si, Ca, Zr, Ti, Hf, Zn, Mn, Ba, Sr, Cr, Mo, Ag, Ga, Sc, V, Y, Nb, Pb, Cu, In, Sn, and rare earth elements, it is more preferable that the coating layer contains at least one non-magnetic metal that is the same as the non-magnetic metal as one of the constituent components of the flaky magnetic metal particles. Among oxygen (O), carbon (C), nitrogen (N), and fluorine (F), it is preferable that the coating layer contains oxygen (O), and it is preferable that coating layer contains an oxide or a composite oxide. This is from the viewpoints of the ease of forming the coating layer, oxidation resistance, and thermal stability. As a result, the adhesiveness between the flaky magnetic metal particles and the coating layer can be enhanced, and the thermal stability and oxidation resistance of the pressed powder material that will be described below can be enhanced. The coating layer cannot only enhance the thermal stability and oxidation resistance of the flaky magnetic metal particles, but can also enhance the electrical resistance of the flaky magnetic metal particles. By increasing the electrical resistance, the eddy current loss can be suppressed, and the frequency characteristics of the magnetic permeability can be enhanced. Therefore, it is preferable that the coating layer 14 has high electrical resistance, and for example, it is preferable that the coating layer 14 has a resistance value of 1 mΩ·cm or greater.

Furthermore, the presence of the coating layer is preferable also from the viewpoint of magnetic characteristics. In regard to the flaky magnetic metal particles, since the size of the thickness is small relative to the size of the flat surface, the metal particles may be regarded as a pseudo-thin film. At this time, a product obtained by forming the coating layer on the surface of the flaky magnetic metal particles and integrating the coating layer with the particles, may be considered to have a pseudo-laminated thin film structure, and the magnetic domain structure is stabilized in terms of energy. As a result, coercivity can be reduced (hysteresis loss is reduced thereby), which is preferable. At this time, the magnetic permeability also becomes high, and it is preferable. From such a viewpoint, it is more preferable that the coating layer is non-magnetic (magnetic domain structure is easily stabilized).

From the viewpoints of thermal stability, oxidation resistance, and electrical resistance, it is more preferable if the thickness of the coating layer is larger. However, if the thickness of the coating layer is too large, the saturation magnetization becomes small, and the magnetic permeability also becomes small, which is not preferable. Furthermore, even from the viewpoint of magnetic characteristics, if the thickness is too large, the "effect by which the magnetic domain structure is stabilized, and a decrease in coercivity, a decrease in losses, and an increase in magnetic permeability are brought about" is reduced. In consideration of the above-described matters, a preferred thickness of the coating layer is between 0.1 nm and 1 μm inclusive, and more preferably between 0.1 nm and 100 m inclusive.

According to the present embodiment, flaky magnetic metal particles having low losses can be provided.

Third Embodiment

A pressed powder material of the present embodiment includes a plurality of flaky magnetic metal particles as described in the first embodiment or the second embodiment, and an interposed phase existing between the flaky magnetic metal particles and containing at least one second element. Here, any matters overlapping with the contents of the first or second embodiment will not be described repeatedly.

Figure 10:
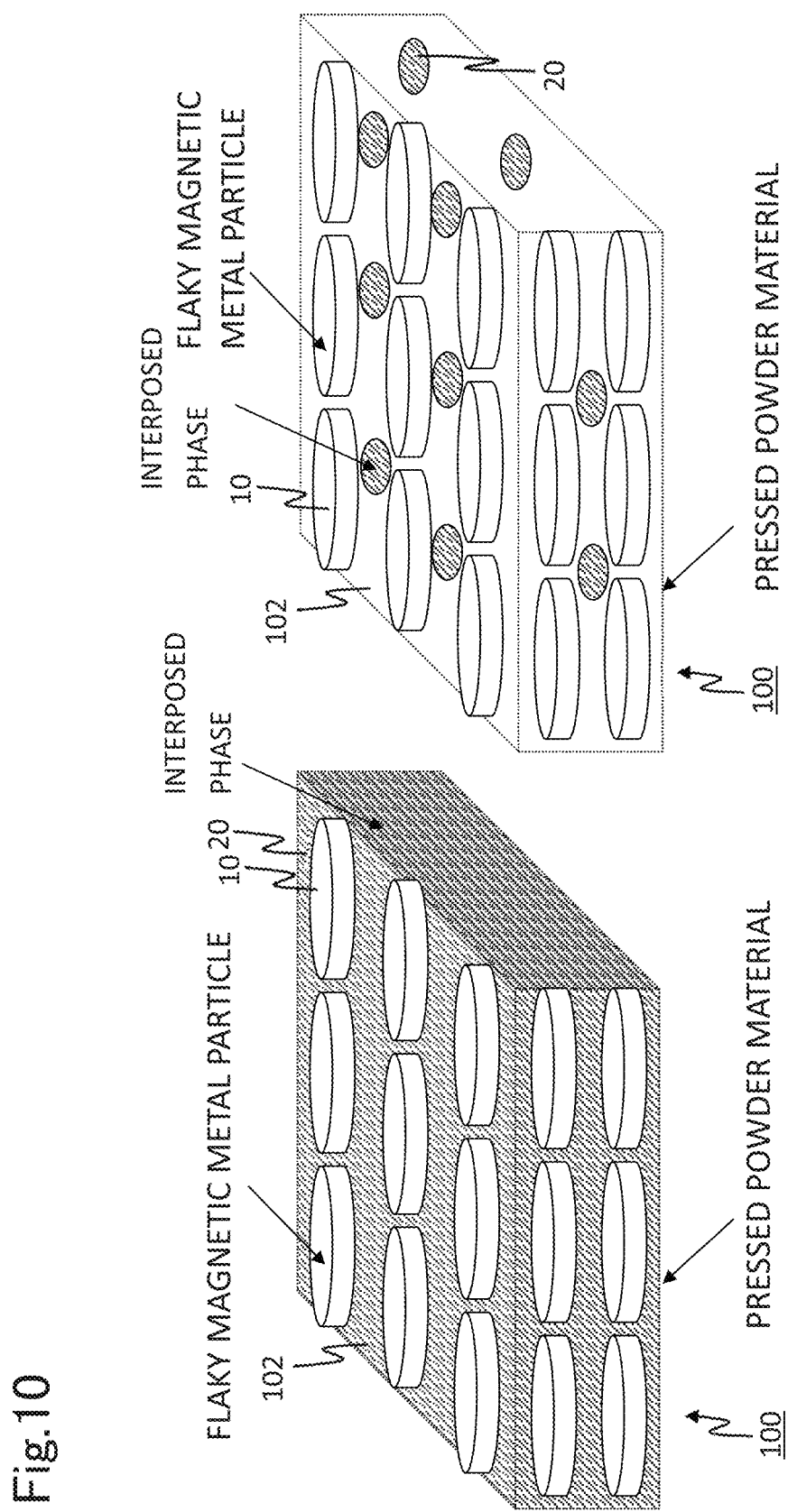
FIG. 10 is a schematic diagram illustrating a pressed powder material according to a third embodiment of the invention.

FIG. 10 is a schematic diagram of the pressed powder material of the present embodiment. FIG. 10 shows an interposed phase 20, a pressed powder material 100, and a plane 102 of the pressed powder material.

The interposed phase contains at least one second element selected from the group consisting of oxygen (O), carbon (C), nitrogen (N), and fluorine (F). This is because the electrical resistance can be increased thereby. It is preferable that the electrical resistivity of the interposed phase is higher than the electrical resistivity of the flaky magnetic metal particles. This is because the eddy current loss of the flaky magnetic metal particles can be reduced thereby. Since the interposed phase exists while surrounding the flaky magnetic metal particles, the oxidation resistance and thermal stability of the flaky magnetic metal particles can be enhanced, and it is preferable. Above all, it is more preferable that the interposed phase contains oxygen, from the viewpoints of high oxidation resistance and high thermal stability. Since the interposed phase also has a role of mechanically adhering the flaky magnetic metal particles, it is also preferable from the viewpoint of high strength.

Figure 11:
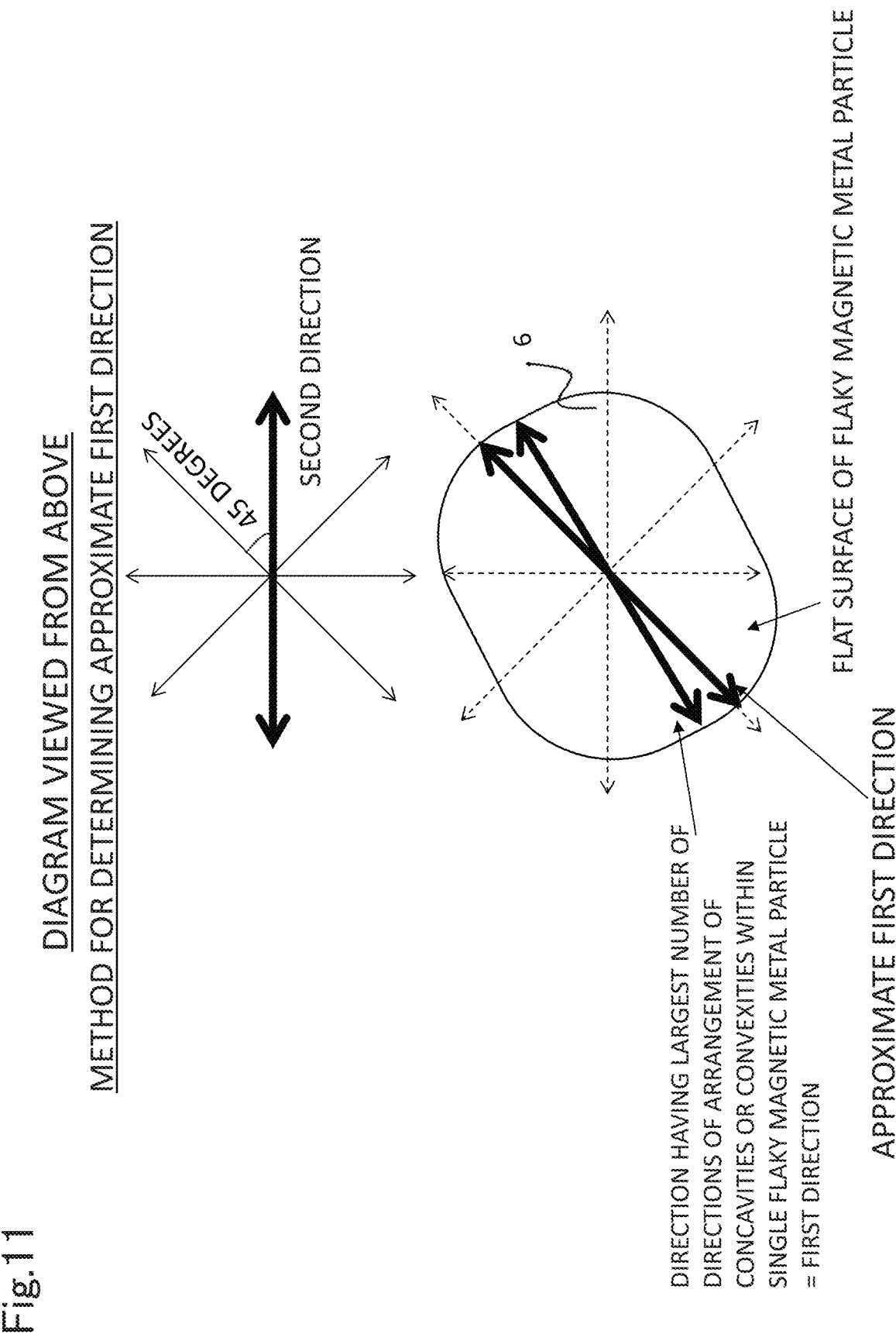
FIG. 11 is a schematic diagram illustrating a method of determining an approximate first direction according to the third embodiment of the invention.
Figure 12:
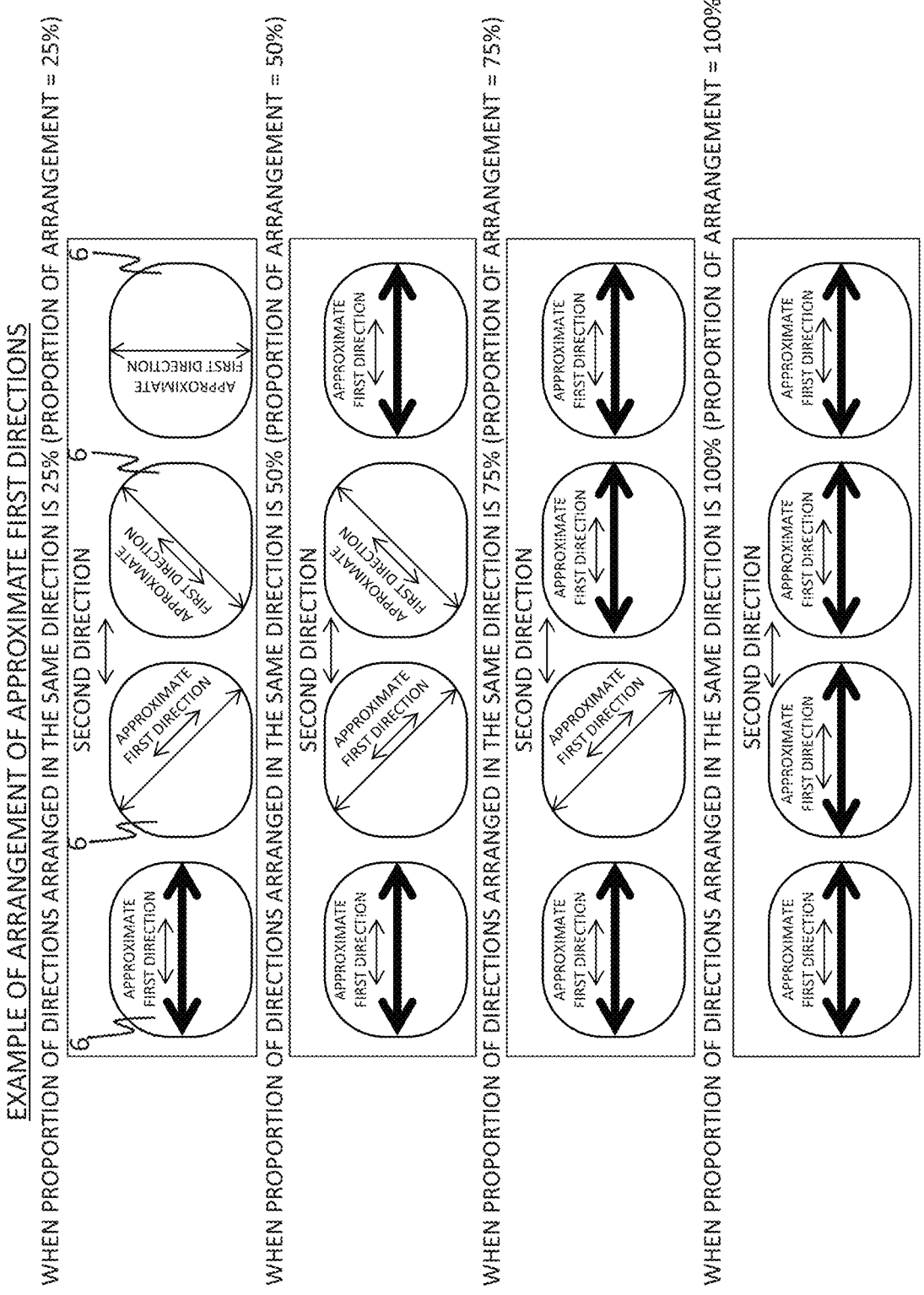
FIG. 12 is a schematic diagram illustrating an example of the direction of arrangement (example of the proportion of arrangement) of the approximate first direction according to the third embodiment of the invention.

In regard to the pressed powder material, it is preferable that the "proportion of arrangement" at which an approximate first direction is arranged in a second direction is 30% or higher. The "proportion of arrangement" is more desirably 50% or higher, and even more desirably 75% or higher. As a result, the magnetic anisotropy becomes appropriately high, and the magnetic characteristics are enhanced as described above, which is preferable. FIG. 11 and FIG. 12 are schematic diagrams illustrating a method of determining the approximate first direction according to the present embodiment, and an example of the direction of arrangement of the approximate first direction (example of the proportion of arrangement). FIG. 11 shows a method of determining the approximate first direction. First, for all of the flaky magnetic metal particles to be evaluated in advance, the direction that coincides with the direction of arrangement of the concavities or convexities carried by various flaky magnetic metal particles, which accounts for the largest proportion, is defined as a first direction. The direction in which the largest number of the first directions of various flaky magnetic metal particles will be arranged in the pressed powder material as a whole is defined as a second direction. In FIG. 11, the case in which the direction of the bold black arrow line serves as the second direction, is shown as an example. Next, directions obtained by partitioning the angle of 360° into angles at an interval of 45° with respect to the second direction are determined. Next, the first directions of the various flaky magnetic metal particles are classified according to the direction of angle in which the first directions are arranged most closely, and that direction is defined as the "approximate first direction". That is, the first directions are classified into four classes such as the direction of 0°, the direction of 45°, the direction of 90°, and the direction of 135°. FIG. 11 illustrates examples of the second direction, the first direction, and the approximate first direction. FIG. 12 is a schematic diagram illustrating an example of the direction of arrangement of the approximate first direction (example of the proportion of arrangement). Examples of proportions in which the approximate first direction is arranged in the same direction as the second direction (this is defined as the "proportion of arrangement") is 25%, 50%, 75%, and 100%, are shown. When this "proportion of arrangement" is evaluated, four successive neighboring flaky magnetic metal particles are selected, and the four particles are evaluated. This is carried out repeatedly for at least three or more times (the more the better; for example, 5 or more times is desirable, and 10 or more times is more desirable), and thereby, the average value is employed as the proportion of arrangement. Meanwhile, flaky magnetic metal particles in which the directions of the concavities or the convexities cannot be determined are excluded from the evaluation, and an evaluation of the flaky magnetic metal particles immediately adjacent thereto is performed. For example, in many of flaky magnetic metal particles obtained by pulverizing a ribbon synthesized with a single roll quenching apparatus, concavities or convexities attach only on one of the flat surfaces, and the other flat surface does not have any concavities or convexities attached thereto. When such flaky magnetic metal particles are observed by SEM, the situation in which the flat surface without any concavities or convexities attached thereto is shown on the image of observation may also occur at a probability of about 50% (even in this case, there may be concavities or convexities actually attached to the flat surface on the rear side; however, these flaky magnetic metal particles are excluded from the evaluation).

FIG. 13 shows an example of a scanning electron microscopic photograph of the direction of arrangement in the approximate first direction. First, in order to determine a second direction, the direction that coincides with the direction of arrangement (first direction) of concavities or convexities which accounts for the largest proportion is decided, and that direction is set as the second direction. In FIG. 13, it is understood from the results of observation of the scanning electron microscopic photograph, that the direction represented by a bold black arrow line in the schematic diagram on the left-hand side becomes the second direction. Next, directions each inclined by 45° from that direction are determined (four directions, namely, the direction of 0°, the direction of 45°, the direction of 90°, and the direction 135°). Next, the first directions in the various flaky magnetic metal particles (for each flaky magnetic metal particle, the first direction is the direction of the concavities or convexities which accounts for the largest proportion) are classified based on the direction that is closest to the direction of a set angle, and the first direction is determined as an "approximate first direction". For example, in FIG. 13, the approximate first direction of the flaky magnetic metal particles of (1) to (6), (12) and (13) is the direction of 0°, the approximate first direction of the flaky magnetic metal particles of (7) to (11) is the direction of 90°, and the approximate first direction of the flaky magnetic metal particle of (14) is the direction of 135°. In FIG. 13, the directions of the approximate first direction of (1) to (14) are recorded on the scanning electron microscopic photograph as white arrows. Next, four consecutive neighboring flaky magnetic metal particles are selected, and the four particles are evaluated. For example, since the four particles of (1) to (4) are all in the direction of 0°, which is the same as the second direction, the proportion at which the particles are arranged in the same direction is 100%. For the next four of (5) to (8), since the two particles of (5) and (6) are in the direction of 0°, which is the same as the second direction, the proportion in which the particles are arranged in the same direction is 50%. For the next four of (9) to (12), since only the particle of (12) is in the direction of 0°, which is the same as the second direction, the proportion at which the particles are arranged in the same direction is 25% (although the three particles of (9) to (11) are arranged in the same direction, since this direction is a direction different from the second direction, this direction is not counted as the same direction). Therefore, the proportions in which the particles are arranged in the same direction (=proportion of arrangement) in connection with the three sets of (1) to (4), (5) to (8), and (9) to (12), are 100%, 50%, and 25%, and the average value is about 58%.

Figure 14:
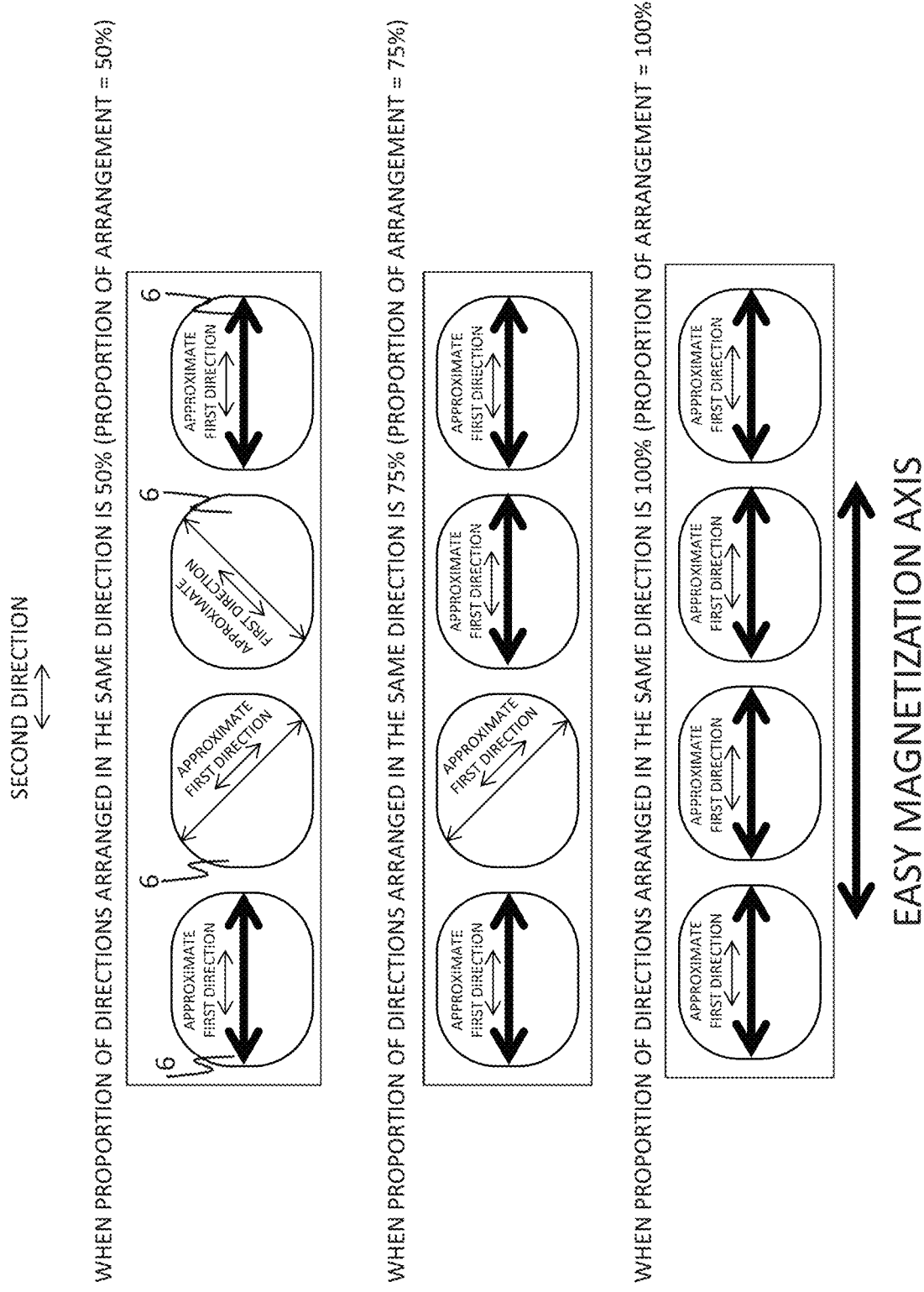
FIG. 14 is a schematic diagram illustrating the desired directions of the approximate first direction and the easy magnetization axis according to the third embodiment of the invention.

Furthermore, it is preferable that that the largest number of the approximate first directions are arranged in the direction of the easy magnetization axis of the pressed powder material. That is, it is preferable that the easy magnetization axis of the pressed powder material is parallel to the second direction. FIG. 14 shows a schematic diagram illustrating the desired directions of the approximate first direction and the easy magnetization axis. Since the length direction in which the concavities or convexities are arranged is likely to become the easy magnetization axis due to the effect of shape magnetic anisotropy, it is preferable to align the directions by taking this direction as the easy magnetization axis, since magnetic anisotropy is easily imparted.

Figure 15:
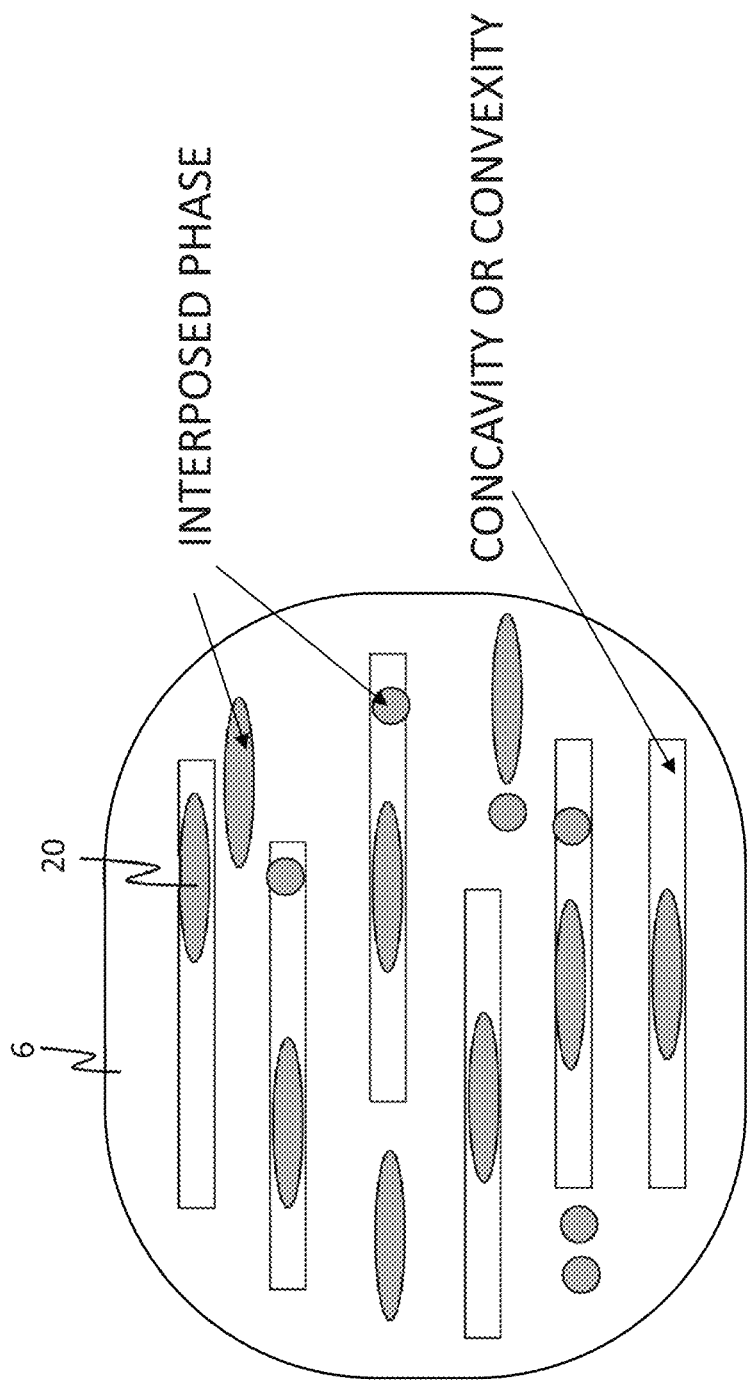
FIG. 15 is a schematic diagram illustrating the disposition of an interposed phase according to the third embodiment of the invention.
Figure 16:
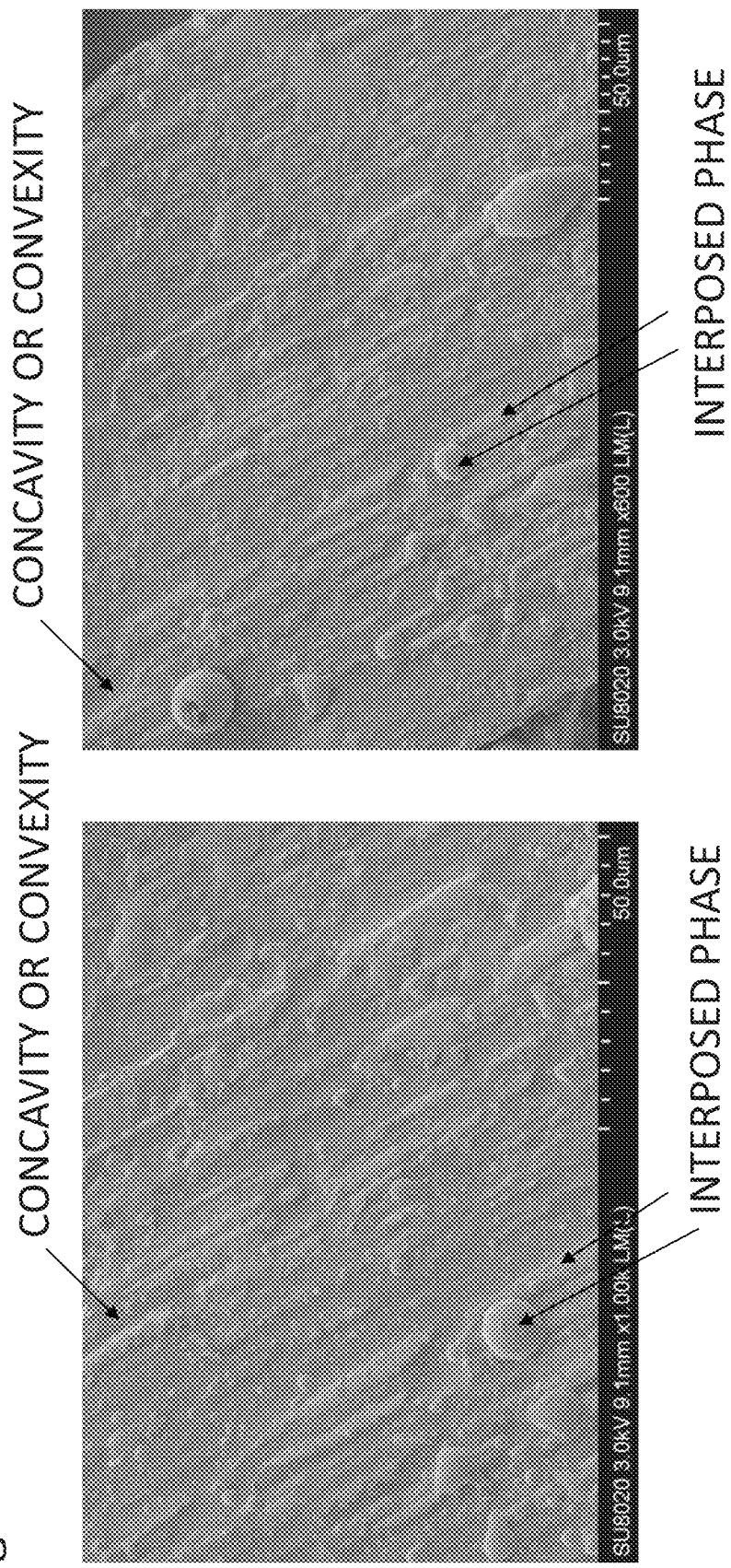
FIG. 16 is a scanning electron microscopic photograph of flaky magnetic metal particles containing an interposed phase according to the third embodiment of the invention.

FIG. 15 shows a schematic diagram illustrating the disposition of the interposed phase. It is preferable that a portion of the interposed phase is attached along the first direction. In other words, it is preferable that a portion of the interposed phase is attached along the direction of the concavities or convexities on the flat surfaces of the flaky magnetic metal particles. As a result, magnetic anisotropy can be easily induced unidirectionally, which is preferable. Such attachment of the interposed phase is preferable because the adhesiveness between the flaky magnetic metal particles is enhanced, and consequently, mechanical characteristics such as strength and hardness and thermal stability are enhanced. It is also preferable that the interposed phase includes a particulate phase. As a result, the adhesiveness between the flaky magnetic metal particles is maintained in an adequate state as appropriate, strain is reduced (since there is a particulate interposed phase between the flaky magnetic metal particles, the stress applied to the flaky magnetic metal particles is relieved), and coercivity can be easily reduced (hysteresis loss is reduced, and magnetic permeability is increased), which is preferable. FIG. 16 shows an example of the scanning electron microscopic photograph of flaky magnetic metal particles including an interposed phase. It is understood that an interposed phase is attached along the direction of the concavities or convexities on the flat surfaces of the flaky magnetic metal particles.

It is preferable that the interposed phase is included in an amount of between 0.01 wt % and 80 wt % inclusive, more preferably between 0.1 wt % and 60 wt % inclusive, and even more preferably between 0.1 wt % and 40 wt % inclusive, with respect to the total amount of the pressed powder material. If the proportion of the interposed phase is too large, the proportion of the flaky magnetic metal particles that have the role of exhibiting magnetic properties becomes small, and as a result, saturation magnetization or magnetic permeability of the pressed powder material is lowered, which is not preferable. In contrast, if the proportion of the interposed phase is too small, joining between the flaky magnetic metal particles and the interposed phase is weakened, and it is not preferable from the viewpoints of thermal stability and mechanical characteristics such as strength and toughness. The proportion of the interposed phase that is optimal from the viewpoints of magnetic characteristics such as saturation magnetization and magnetic permeability, thermal stability, and mechanical characteristics, is between 0.01 wt % and 80 wt % inclusive, more preferably between 0.1 wt % and 60 wt % inclusive, and even more preferably between 0.1 wt % and 40 wt % inclusive, with respect to the total amount of the pressed powder material.

Furthermore, it is preferable that the proportion of lattice mismatch between the interposed phase and the flaky magnetic metal particles is between 0.1% and 50% inclusive. As a result, an appropriately high magnetic anisotropy can be easily imparted, and the above-mentioned magnetic characteristics are enhanced, which is preferable. In order to set the lattice mismatch to the range described above, the lattice mismatch can be realized by selecting the combination of the composition of the interposed phase and the composition of the flaky magnetic metal particles 10 as appropriate. For example, Ni of the fcc structure has a lattice constant of 3.52 Å, and MgO of the NaCl type structure has a lattice constant of 4.21 Å. Thus, the lattice mismatch of the two is (4.21−3.52)/3.52×100=20%. That is, the lattice mismatch can be set to 20% by employing Ni of the fcc structure as the main composition of the flaky magnetic metal particles and employing MgO for the interposed phase 20. As such, the lattice mismatch can be set to the range described above by appropriately selecting the combination of the main composition of the flaky magnetic metal particles and the main composition of the interposed phase.

The interposed phase may satisfy at least one of the following three conditions: being a eutectic oxide, containing a resin, and containing at least one magnetic metal selected from the group consisting of Fe, Co, and Ni. This will be explained below.

First, the first "case in which the interposed phase is a eutectic oxide" will be explained. In this case, the interposed phase contains a eutectic oxide containing at least two tertiary elements selected from the group consisting of B (boron), Si (silicon), Cr (chromium), Mo (molybdenum), Nb (niobium), Li (lithium), Ba (barium), Zn (zinc), La (lanthanum), P (phosphorus), Al (aluminum), Ge (germanium), W (tungsten), Na (sodium), Ti (titanium), As (arsenic), V (vanadium), Ca (calcium), Bi (bismuth), Pb (lead), Te (tellurium), and Sn (tin). Particularly, it is preferable that the interposed phase contains an eutectic system containing at least two elements from among B, Bi, Si, Zn, and Pb. As a result, the adhesiveness between the flaky magnetic metal particles and the interposed phase becomes strong (interaction strength increases), and thermal stability and mechanical characteristics such as strength and toughness may be easily enhanced.

Furthermore, the eutectic oxide preferably has a softening point of between 200° C. and 600° C. inclusive, and more preferably between 400° C. and 500° C. inclusive. Even more preferably, the eutectic oxide is preferably a eutectic oxide containing at least two elements from among B, Bi, Si, Zn and Pb, and having a softening point of between 400° C. and 500° C. inclusive. As a result, the interaction between the flaky magnetic metal particles and the eutectic oxide becomes strong, and the thermal stability and mechanical characteristics such as strength and toughness may be easily enhanced. When the flaky magnetic metal particles are integrated with the eutectic oxide, the two components are integrated while performing a heat treatment at a temperature near the softening point of the eutectic oxide, and preferably a temperature slightly higher than the softening point. Then, the adhesiveness between the flaky magnetic metal particles and the eutectic oxide increases, and mechanical characteristics can be enhanced. Generally, as the temperature of the heat treatment is higher to a certain extent, the adhesiveness between the flaky magnetic metal particles and the eutectic oxide increases, and the mechanical characteristics are enhanced. However, if the temperature of the heat treatment is too high, the coefficient of thermal expansion may become large, and consequently, the adhesiveness between the flaky magnetic metal particles and the eutectic oxide may be decreased on the contrary (if the difference between the coefficient of thermal expansion of the flaky magnetic metal particles and the coefficient of thermal expansion of the eutectic oxide becomes large, the adhesiveness may be further decreased). Furthermore, in a case in which the crystallinity of the flaky magnetic metal particles is non-crystalline or amorphous, if the temperature of the heat treatment is high, crystallization proceeds, and coercivity increases. Therefore, it is not preferable. For this reason, in order to achieve a balance between the mechanical characteristics and the coercivity characteristics, it is preferable to adjust the softening point of the eutectic oxide to be between 200° C. and 600° C. inclusive, and more preferably between 400° C. and 500° C. inclusive, and to integrate the flaky magnetic metal particles and the eutectic oxide while performing a heat treatment at a temperature near the softening point of the eutectic oxide, and preferably at a temperature slightly higher than the softening point. Furthermore, regarding the temperature at which the integrated material is actually used in a device or a system, it is preferable to use the integrated material at a temperature lower than the softening point.

Furthermore, it is preferable that the eutectic oxide has a glass transition temperature. Furthermore, it is desirable that the eutectic oxide has a coefficient of thermal expansion of between $0.5 \times 10^{-6}$/° C. and $40 \times 10^{-6}$/° C. inclusive. As a result, the interaction between the flaky magnetic metal particles 10 and the eutectic oxide becomes strong, and the thermal stability or the mechanical characteristics such as strength and toughness may be easily enhanced.

Furthermore, it is more preferable that the eutectic oxide includes at least one or more eutectic particles that are in a particulate form (preferably a spherical form) having a particle size of between 10 nm and 10 μm inclusive. These eutectic particles contain a material that is the same as the eutectic oxide but is not in a particulate form. In a pressed powder material, pores may also exist partially, and thus, it can be easily observed that a portion of the eutectic oxide exists in a particulate form, and preferably in a spherical form. Even in a case in which there are no pores, the interface of the particulate form or spherical form can be easily discriminated. The particle size of the eutectic particles is more preferably between 10 nm and 1 μm inclusive, and even more preferably between 10 nm and 100 nm inclusive. AS a result, when stress is appropriately relieved during the heat treatment while the adhesiveness between the flaky magnetic metal particles is retained, the strain applied to the flaky magnetic metal particles can be reduced, and coercivity can be reduced. As a result, the hysteresis loss is also reduced, and the magnetic permeability is increased. Meanwhile, the particle size of the eutectic particles can be measured by making an observation by TEM or SEM. In the scanning electron microscopic photograph of FIG. 16, it is understood that there is a plurality of spherical eutectic particles formed from the interposed phase.

Furthermore, it is preferable that the interposed phase has a softening point that is higher than the softening point of the eutectic oxide, more preferably has a softening point that is higher than 600° C., and that the interposed phase further contains intermediate intercalated particles containing at least one element selected from the group consisting of oxygen (O), carbon (C), nitrogen (N), and fluorine (F). When the intermediate intercalated particles exist between the flaky magnetic metal particles, on the occasion in which the pressed powder material is exposed to high temperature, the flaky magnetic metal particles being thermally fused with one another and undergoing deterioration of characteristics can be prevented. That is, it is desirable that the intermediate intercalated particles exist mainly for the purpose of thermal stability. Furthermore, when the softening point of the intermediate intercalated particles is higher than the softening point of the eutectic oxide, and more preferably, the softening point is 600° C. or higher, thermal stability can be further increased.

It is preferable that the intermediate intercalated particles contain at least one non-magnetic metal selected from the group consisting of Mg, Al, Si, Ca, Zr, Ti, Hf, Zn, Mn, Ba, Sr, Cr, Mo, Ag, Ga, Sc, V, Y, Nb, Pb, Cu, In, Sn, and rare earth elements, and contain at least one element selected from the group consisting of O (oxygen), C (carbon), N (nitrogen) and F (fluorine). More preferably, from the viewpoints of high oxidation resistance and high thermal stability, an oxide or composite oxide containing oxygen is more preferred. Particularly, oxides such as aluminum oxide ($Al_2O_3$), silicon dioxide ($SiO_2$), titanium oxide ($TiO_2$), and zirconium oxide ($Zr_2O_3$); and composite oxides such as Al—Si—O are preferred from the viewpoint of high oxidation resistance and high thermal stability.

Regarding the method for producing a pressed powder material containing intermediate intercalated particles, for example, a method of mixing the flaky magnetic metal particles and the intermediate intercalated particles (aluminum oxide ($Al_2O_3$) particles, silicon dioxide ($SiO_2$) particles, titanium oxide ($TiO_2$) particles, zirconium oxide ($ZrO_2$) particles, and the like) using a ball mill or the like to obtain a dispersed state, and then integrating the flaky magnetic metal particles and the intermediate intercalated particles by press molding or the like, may be used. The method of dispersing the particles is not particularly limited as long as it is a method capable of appropriately dispersing particles.

Next, the second "case in which the interposed phase contains a resin" will be explained. In this case, the resin is not particularly limited, and a polyester-based resin, a polyethylene-based resin, a polystyrene-based resin, a polyvinyl chloride-based resin, a polyvinyl butyral resin, a polyvinyl alcohol resin, a polybutadiene-based resin, a TEFLON (registered trademark)-based resin, a polyurethane resin, a cellulose-based resin, an ABS resin, a nitrile-butadiene-based rubber, a styrene-butadiene-based rubber, a silicone resin, other synthetic rubbers, natural rubber, an epoxy resin, a phenolic resin, an allyl resin, a polybenzimidazole resin, an amide-based resin, a polyimide-based resin, a polyamideimide resin, or copolymers of those resins are used. Particularly, in order to realize high thermal stability, it is preferable that the interposed phase includes a silicone resin or a polyimide resin, both of which have high heat resistance. As a result, the interaction between the flaky magnetic metal particles and the interposed phase becomes strong, and thermal stability and mechanical characteristics such as strength and toughness may be easily enhanced.

Next, the third "case in which the interposed phase contains at least one magnetic metal selected from the group consisting of Fe, Co and Ni and has magnetic properties" will be explained. In this case, it is preferable because, as the interposed phase has magnetic properties, the flaky magnetic metal particles can readily interact magnetically with neighboring particles, and the magnetic permeability is increased.

Furthermore, since the magnetic domain structure is stabilized, the frequency characteristics of the magnetic permeability are also enhanced, which is preferable. Meanwhile, the term "magnetic properties" as used herein means ferromagnetism, ferrimagnetism, feeble magnetism, antiferromagnetism, or the like. Particularly, in the case of ferromagnetism and ferrimagnetism, the magnetic interaction is stronger, and it is preferable. In regard to the fact that the interposed phase has magnetic properties, an evaluation can be performed using a vibrating sample magnetometer (VSM) or the like. In regard to the fact that the interposed phase contains at least one magnetic metal selected from the group consisting of Fe, Co and Ni and has magnetic properties, an investigation can be performed conveniently by using EDX or the like.

Thus, three conditions of the interposed phase have been explained, and it is preferable that at least one of these three conditions is satisfied; however, it is still acceptable that two or more, or all of the three conditions are satisfied. The "case in which the interposed phase is a eutectic oxide" (first case) has slightly inferior mechanical characteristics such as strength as compared to the case in which the interposed phase is a resin (second case); however, the first case is superior from the viewpoint that strain may be easily relieved, and lowering of coercivity may easily occur, which is preferable (as a result, low hysteresis loss and high magnetic permeability may be easily realized, which is preferable). Furthermore, eutectic oxides have higher heat resistance compared to resins in many cases, and eutectic oxides also have excellent thermal stability, which is preferable. In contrast, the "case in which the interposed phase contains a resin" (second case) has a defect that since the adhesiveness between the flaky magnetic metal particles and the resin is high, stress is likely to be applied (strain is likely to enter), and as a result, coercivity tends to increase. Particularly, since a resin is highly excellent in view of mechanical characteristics such as strength, a resin is preferable. The "case in which the interposed phase contains at least one magnetic metal selected from the group consisting of Fe, Co and Ni and has magnetic properties" (third case) is preferable because the flaky magnetic metal particles may easily interact magnetically with neighboring particles, and particularly because the interposed phase becomes excellent in view of high magnetic permeability and low coercivity (therefore, low hysteresis loss). An interposed phase that achieves a good balance can be produced by using the three conditions as appropriate, or by combining some of the three conditions, based on the above-described advantages and disadvantages.

In regard to the pressed powder material, it is preferable that the flat surfaces of a plurality of the flaky magnetic metal particles described above are oriented in a layered form so as to be parallel to each other. As a result, the eddy current loss of the pressed powder material can be reduced, and thus, it is preferable. Furthermore, since the diamagnetic field can be made small, the magnetic permeability of the pressed powder material can be made high, which is preferable. Also, since the ferromagnetic resonance frequency can be made high, the ferromagnetic resonance loss can be made small, which is preferable. Such a laminated structure is preferable because the magnetic domain structure is stabilized, and low magnetic loss can be realized. Here, if the angle formed by a plane parallel to the flat surface of a flaky magnetic metal particle and a plane of the pressed powder material is closer to 0°, it is defined that the flaky magnetic metal particles are oriented. Specifically, the aforementioned angle is determined for a large number of flaky magnetic metal particles 10, such as 10 or more particles, and it is desirable that the average value is preferably between 0° and 45° inclusive, more preferably between 0° and 30° inclusive, and even more preferably between 0° and 10° inclusive.

The pressed powder material may have a laminated type structure composed of a magnetic layer containing the flaky magnetic metal particles, and an intermediate layer containing any of O, C, and N. In regard to the magnetic layer, it is preferable that the flaky magnetic metal particles are oriented (oriented such that the flat surfaces are parallel to one another). Furthermore, it is preferable that the magnetic permeability of the intermediate layer is made smaller than the magnetic permeability of the magnetic layer. Through these countermeasures, a pseudo thin film laminated structure can be realized, and the magnetic permeability in the layer direction can be made high, which is preferable. In regard to such a structure, since the ferromagnetic resonance frequency can be made high, the ferromagnetic resonance loss can be made small, which is preferable. Furthermore, such a laminated structure is preferable because the magnetic domain structure is stabilized, and low magnetic loss can be realized. In order to further enhance these effects, it is more preferable to make the magnetic permeability of the intermediate layer to be smaller than the magnetic permeability of the interposed phase (interposed phase within the magnetic layer). As a result, the magnetic permeability in the layer direction can be made higher in a pseudo thin film laminated structure, and therefore, it is preferable. Also, since the ferromagnetic resonance frequency can be made even higher, the ferromagnetic resonance loss can be made small, which is preferable.

Thus, according to the present embodiment, flaky magnetic metal particles having low losses can be provided.

Fourth Embodiment

A plurality of flaky magnetic metal particles of the present embodiment is a plurality of flaky magnetic metal particles, each particle having a flat surface and a magnetic metal phase containing at least one first element selected from the group consisting of Fe, Co and Ni, the particles having an average thickness of between 10 nm and 100 μm inclusive and an average aspect ratio of between 5 and 10,000 inclusive, and having a difference in coercivity on the basis of direction within the flat surface. Here, any matters overlapping with the contents of the first to third embodiments will not be described repeatedly.

For both the thickness and the aspect ratio, average values are employed. Specifically, an average value of 10 or more values is employed.

Figure 17:
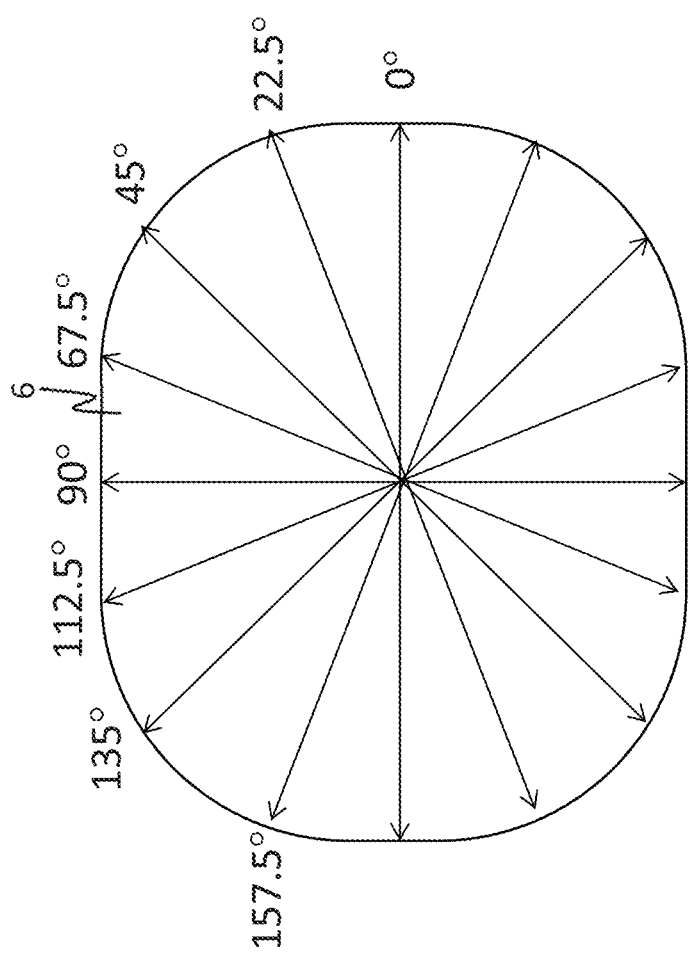
FIG. 17 is a diagram illustrating the directions obtainable when coercivity is measured for flaky magnetic metal particles according to the fourth embodiment of the invention, by changing the direction at an interval of 22.5° with respect to the angle of 360° within a flat surface.

When it is said to "have a difference in coercivity", it is implied that when a magnetic field is applied in the directions of 360° within the flat surface and coercivity is measured, there are a direction in which coercivity has the maximum value and a direction in which coercivity has the minimum value. For example, when coercivity is measured while the direction is changed at an interval of 22.5° for the angle of 360° within the flat surface, there may be a difference in coercivity. FIG. 17 illustrates, as an example, the directions obtainable when coercivity is measured while the direction is changed at an interval of 22.5° for the angle of 360° within the flat surface of a flaky magnetic metal particle. When a flaky magnetic metal particle has a difference in coercivity within the flat surface, the minimum coercivity value becomes small compared to an isotropic case in which there is almost no difference in coercivity, and thus it is preferable. A material having magnetic anisotropy within a flat surface has differences in the coercivity depending on directions within the flat surface, and the minimum coercivity value becomes small compared to a magnetically isotropic material. As a result, the hysteresis loss is reduced, and the magnetic permeability is enhanced, which is preferable.

Coercivity can be evaluated conveniently by using a vibrating sample magnetometer (VSM) or the like. In a case in which coercivity is low, even a coercivity of 0.1 Oe or less can be measured using a low magnetic field unit. Measurement is made by changing the direction within the flat surface with respect to the direction of the magnetic field to be measured.

In the flat surface, it is more preferable if the proportion of the difference in coercivity on the basis of direction is larger, and the proportion is preferably 1% or greater. More preferably, the proportion of the difference in coercivity is 10% or greater; even more preferably, the proportion of the difference in coercivity is 50% or greater; and still more preferably, the proportion of the difference in coercivity is 100% or greater. The proportion of the difference in coercivity as used herein is defined by the formula: (Hc (max)−Hc (min))/Hc (min)×100(%), by using the maximum coercivity Hc (max) and the minimum coercivity Hc (min) within a flat surface.

The crystal grain size of the magnetic metal phase is preferably 10 nm or less, more preferably 5 nm or less, and even more preferably 2 nm or less. The crystal grain size can be conveniently determined by XRD analysis. That is, the crystal grain size can be determined by XRD, based on Scherrer's Formula from the diffraction angle and the half-value width in relation to the maximum peak among the peaks attributed to the magnetic metal phase. Scherrer's formula is expressed by the formula: $D=0.9\lambda/(\beta \cos \theta)$, wherein D represents the crystal grain size, $\lambda$ represents the X-ray wavelength for measurement, $\beta$ represents the half-value width, and $\theta$ represents Bragg's angle of diffraction. The crystal grain size can also be determined by observing a large number of magnetic metal phases by TEM (transmission electron microscopy), and averaging the particle sizes. In a case in which the crystal grain size is small, it is preferable to determine the crystal grain size by an XRD analysis, and in a case in which the crystal grain size is large, it is preferable to determine the crystal grain size by TEM observation. However, it is preferable to select the measurement method depending on the circumstances, or to comprehensively determine the crystal grain size by using both of the methods in combination. The crystal grain size of the magnetic metal phase that can be determined by XRD analysis or TEM observation is preferably 10 nm or less, more preferably 5 nm or less, and even more preferably 2 nm or less. As a result, for example, magnetic anisotropy may be easily imparted by applying a heat treatment in a magnetic field, and the difference in coercivity within the flat surface becomes large, which is preferable. Furthermore, when it is said that the crystal grain size is small, it is implied that the material is closer to the amorphous state. Therefore, electrical resistance becomes higher compared to a highly crystalline material, and consequently, the eddy current loss may be easily decreased, which is preferable. Also, the material has excellent corrosion resistance and oxidation resistance compared to a highly crystalline material, and thus it is preferable.

It is preferable that the magnetic metal phase contains at least one additive element selected from the group consisting of B, Si, Al, C, Ti, Zr, Hf, Nb, Ta, Mo, Cr, Cu, W, P, N, Ga, and Y. As a result, amorphization proceeds, magnetic anisotropy may be easily imparted, and the difference in coercivity within the flat surface becomes large, which is preferable. An additive element which has a large difference between the atomic radius of the additive element and the atomic radius of at least one first element selected from the group consisting of Fe, Co, and Ni, is preferable. Furthermore, an additive element such that the enthalpy of mixing of at least one first element selected from the group consisting of Fe, Co and Ni with the additive element increases negatively, is preferred. Also, a multicomponent system that includes the first element and an additive element and is composed of three or more kinds of elements in total, is preferred. Since semimetallic additive elements such as B and SI have slow rates of crystallization and are easily amorphized, it is advantageous when the semimetallic additive elements are mixed into the system. From the viewpoint such as described above, B, Si, P, Ti, Zr, Hf, Nb, Y, Cu, and the like are preferable, and above all, it is more preferable that the additive element includes any one of B, Si, Zr, and Y. It is preferable that the total amount of the additive element is altogether between 0.001 at % and 80 at % inclusive with respect to the total amount of the first element and the additive element. The total amount is more preferably between 5 at % and 80 at % inclusive, and even more preferably between 10 at % and 40 at % inclusive. As the total amount of the additive element is larger, amorphization proceeds, and it becomes easier to impart magnetic anisotropy, which is preferable (that is, preferable from the viewpoints of low losses and high magnetic permeability). However, on the other hand, since the proportion of the magnetic metal phase becomes smaller, it is not preferable from the viewpoint that saturation magnetization is reduced. However, depending on the use application (for example, magnetic wedges of a motor), the material can be sufficiently used even in a case in which saturation magnetization is relatively low, and there are occasions in which it is rather preferable that the material specializes in low losses and high magnetic permeability. Meanwhile, magnetic wedges of a motor are lid-like objects for the slot part into which a coil is inserted. Usually, non-magnetic wedges are used; however, when magnetic wedges are employed, the sparseness or denseness of the magnetic flux density is moderated, the harmonic loss is reduced, and the motor efficiency is increased. At this time, it is preferable that saturation magnetization of the magnetic wedges is higher; however, even with relatively low saturation magnetization (for example, about 0.5 to 1 T), sufficient effects are manifested. Therefore, it is important to select an appropriate composition and appropriate amounts of additive elements depending on the use application.

In regard to the flaky magnetic metal particles, the first element includes Fe and Co, and the amount of Co is preferably between 10 at % and 60 at % inclusive, and more preferably between 10 at % and 40 at % inclusive, with respect to the total amount of Fe and Co. AS a result, an appropriately high magnetic anisotropy may be easily imparted, and the magnetic characteristics described above are enhanced, which is preferable. Furthermore, an Fe—Co-based material is preferable because high saturation magnetization may be easily realized. When the composition range of Fe and Co is within the range described above, higher saturation magnetization can be realized, and thus it is preferable.

It is preferable that the flaky magnetic metal particles contain at least one non-magnetic metal selected from the group consisting of Mg, Al, Si, Ca, Zr, Ti, Hf, Zn, Mn, Ba, Sr, Cr, Mo, Ag, Ga, Sc, V, Y, Nb, Pb, Cu, In, Sn, and rare earth elements. As a result, thermal stability and oxidation resistance of the flaky magnetic metal particles can be enhanced. Among them, Al and Si are particularly preferable because these elements may easily form solid solutions with Fe, Co and Ni, which are main components of the flaky magnetic metal particles, and contribute to the enhancement of thermal stability or oxidation resistance.

It is preferable that the flaky magnetic metal particles have a portion containing Fe and Co and having a body-centered cubic (bcc) crystal structure. As a result, an appropriately high magnetic anisotropy may be easily imparted, and the magnetic characteristics as described above can be enhanced, which is preferable. Furthermore, "a crystal structure of a mixed phase of bcc and face-centered cubic (fcc)", which partially has a fcc crystal structure, is also preferable because an appropriately high magnetic anisotropy may be easily imparted, and the magnetic characteristics described above are enhanced.

It is preferable that the flat surface is crystallographically oriented. The direction of orientation is preferably the (110) plane orientation or the (111) plane orientation, and more preferably the (110) plane orientation. When the crystal structure of the flaky magnetic metal particles is the body-centered cubic (bcc) structure, the (110) plane orientation is preferred, and when the crystal structure of the flaky magnetic metal particles is the face-centered cubic (fcc) structure, the (111) plane orientation is preferred. As a result, an appropriately high magnetic anisotropy may be easily imparted, and the magnetic characteristics described above are enhanced. Therefore, it is preferable.

As a more preferable direction of orientation, the (110) [111] direction and the (111) [110] direction are preferred, and the (110) [111] direction is more preferred. When the crystal structure of the flaky magnetic metal particles is the body-centered cubic (bcc) structure, orientation in the (110) [111] direction is preferred, and when the crystal structure of the flaky magnetic metal particles is the face-centered cubic (fcc) structure, orientation in the (111) [110] direction is preferred. As a result, an appropriately high magnetic anisotropy may be easily imparted, and the magnetic characteristics described above are enhanced, which is preferable. According to the present specification, the "(110) [111] direction" refers to a direction in which the slip plane is the (110) plane or a plane crystallographically equivalent thereto, namely, the {110} plane, and the slip direction is the [111] direction or a direction crystallographically equivalent thereto, namely, the <111> direction. The same also applies to the (111) [110] direction. That is, the (111) [110] direction refers to a direction in which the slip plane is the (111) plane or a plane crystallographically equivalent thereto, namely, the {111} plane, and the slip direction is the [110] direction or a direction crystallographically equivalent thereto, namely, the <110> direction.

The lattice strain of the flaky magnetic metal particles is preferably between 0.01% and 10% inclusive, more preferably between 0.01% and 5% inclusive, even more preferably between 0.01% and 1% inclusive, and still more preferably between 0.01% and 0.5% inclusive. As a result, an appropriately high magnetic anisotropy may be easily imparted, and the magnetic characteristics described above are enhanced, which is preferable.

The lattice spacing in the flat surface varies depending on the direction, and the proportion of the difference between the maximum lattice spacing $d_{max}$ and the minimum lattice spacing $d_{min}$ (=($d_{max}$ $d_{min}$)/$d_{min}$×100(%)) is preferably between 0.01% and 10% inclusive, more preferably between 0.01% and 5% inclusive, even more preferably between 0.01% and 1% inclusive, and still more preferably between 0.01% and 0.5% inclusive. As a result, an appropriately high magnetic anisotropy may be easily imparted, and the magnetic characteristics described above are enhanced, which is preferable. Furthermore, the lattice spacing can be conveniently determined by an XRD analysis. When this XRD analysis is carried out while the direction is varied within a plane, the differences in the lattice constant depending on the direction can be determined.

In regard to crystallites of the flaky magnetic metal particles, it is preferable that either the crystallites are unidirectionally linked in a row within the flat surface, or the crystallites are rod-shaped and are unidirectionally oriented within the flat surface. As a result, an appropriately high magnetic anisotropy may be easily imparted, and the magnetic characteristics described above are enhanced, which is preferable.

It is preferable that a flat surface of a flaky magnetic metal particle has either or both of a plurality of concavities and a plurality of convexities, the concavities and the convexities being arranged in a first direction and each having a width of 0.1 μm or more, a length of 1 μm or more, and an aspect ratio of 2 or higher. As a result, magnetic anisotropy may be easily induced in the first direction, and the difference in coercivity on the basis of direction in the flat surface becomes large, which is preferable. From this point of view, more preferably, it is preferable that each concavity or convexity has a width of 1 μm or more and a length of 10 μm or more. The aspect ratio is preferably 5 or higher, and more preferably 10 or higher. By having such concavities or convexities provided on the flaky magnetic metal particles, the adhesiveness between the flaky magnetic metal particles is enhanced at the time of synthesizing a pressed powder material by powder-compacting the flaky magnetic metal particles (the concavities or convexities bring about an anchoring effect of attaching the particles to neighboring particles). As a result, mechanical characteristics such as strength and hardness, and thermal stability are enhanced, and therefore, it is preferable.

In regard to the flaky magnetic metal particles, it is preferable that the first directions of either or both of a largest number of concavities and a largest number of convexities are arranged in the direction of the easy magnetization axis. That is, in a case in which there is a large number of directions of arrangement (=first directions) within the flat surface of a flaky magnetic metal particle, it is preferable that the direction of arrangement (=first directions) that accounts for the largest proportion in the large number of directions of arrangement (=first directions), coincides with the direction of the easy axis of the flaky magnetic metal particles. Since the length direction in which the concavities or convexities are arranged, namely, the first direction, is likely to become the easy magnetization axis due to the effect of shape magnetic anisotropy, when the flaky magnetic metal particles are aligned with respect to this direction as the easy magnetization axis, magnetic anisotropy may be easily imparted, which is preferable.

In regard to either or both of the concavities and the convexities, it is desirable that five or more on the average of those are included in one flaky magnetic metal particle. Here, five or more concavities may be included, five or more convexities may be included, or the sum of the number of concavities and the number of convexities may be 5 or larger. More preferably, it is desirable that ten or more of concavities or convexities are included. It is also desirable that the average distance in the width direction between the respective concavities or convexities is between 0.1 μm and 100 μm inclusive. It is also desirable that a plurality of extraneous metal particles containing at least one first element selected from the group consisting of Fe, Co and Ni as described above and having an average size of between 1 nm and 1 μm inclusive, are arranged along the concavities or convexities. Regarding the method of determining the average size of the extraneous metal particles, the average size is calculated by averaging the sizes of a plurality of extraneous metal particles arranged along the concavities or convexities, based on SEM observation or TEM observation. When these conditions are satisfied, magnetic anisotropy is easily induced in one direction, which is preferable. Furthermore, the adhesiveness between the flaky magnetic metal particles is enhanced when a pressed powder material is synthesized by powder-compacting the flaky magnetic metal particles (the concavities or convexities bring about an anchoring effect of attaching the particles to neighboring particles), and as a result, mechanical characteristics such as strength and hardness, and thermal stability are enhanced, which is preferable.

It is desirable that the ratio a/b of the maximum length a within the flat surface with respect to the minimum length b is between 1 and 5 inclusive, on the average. As a result, when the particles are powder-compacted, there is less chance that the particles are powder-compacted in a bent state, and the stress applied to the particles is likely to be reduced. That is, strain is reduced, this leads to the reduction of coercivity and hysteresis loss, and also, since stress is reduced, thermal stability and mechanical characteristics such as strength and toughness can be easily enhanced.

It is desirable that the contour of the flat surface is slightly round. In an extreme example, it is desirable to employ a round contour such as a circle or an ellipse, rather than employing a square or rectangular contour. As a result, stress is not easily concentrated around the contour, the magnetic strain of the flaky magnetic metal particles is reduced, the coercivity decreases, and the hysteresis is reduced, which is desirable. Since stress concentration is reduced, thermal stability or mechanical characteristics such as strength and toughness can also be easily enhanced, which is desirable.

It is desirable that each of the flaky magnetic metal particles further comprises a plurality of small magnetic metal particles, that is, 5 or more particles on the average, on the flat surface. The small magnetic metal particles contain at least one first element selected from the group consisting of Fe, Co and Ni, and the average particle size is between 10 nm and 1 μm inclusive. More preferably, the small magnetic metal particles have a composition that is equal to that of the flaky magnetic metal particles. As the small magnetic metal particles are provided on the surface of the flat surface, or the small magnetic metal particles are integrated with the flaky magnetic metal particles, the surface of the flaky magnetic metal particles is brought to an artificially slightly damaged state. As a result, when the flaky magnetic metal particles are powder-compacted together with an interposed phase that will be described below, adhesiveness is greatly enhanced. As a result, thermal stability and mechanical characteristics such as strength and toughness can be easily enhanced. In order to manifest such effects at the maximum level, it is desirable that the average particle size of the small magnetic metal particles is adjusted to be between 10 nm and 1 μm inclusive, and 5 or more small magnetic metal particles on the average are integrated with the surface, that is, the flat surface, of the flaky magnetic metal particles. When the small magnetic metal particles are unidirectionally arranged within the flat surface, magnetic anisotropy may be easily imparted within the flat surface, and high magnetic permeability and low losses can be easily realized. Therefore, it is more preferable. The average particle size of the small magnetic metal particles is determined by observing the particles by TEM or SEM.

The variation in the particle size distribution of the flaky magnetic metal particles can be defined by the coefficient of variation (CV value). That is, CV value (%)=[Standard deviation of particle size distribution (μm)/average particle size (μm)]×100. It can be said that as the CV value is smaller, a sharp particle size distribution with less variation in the particle size distribution is obtained. When the CV value defined as described above is between 0.1% and 60% inclusive, low coercivity, low hysteresis loss, high magnetic permeability, and high thermal stability can be realized, which is preferable. Furthermore, since the variation is small, it is also easy to realize high yield. A more preferred range of the CV value is between 0.1% and 40% inclusive.

The average thickness of the flaky magnetic metal particles is preferably between 10 nm and 100 μm inclusive, and more preferably between 1 μm and 100 μm inclusive. Furthermore, the average aspect ratio is preferably between 5 and 10,000 inclusive, and more preferably between 10 and 1,000 inclusive. If the flaky magnetic metal particles have a small thickness and a large aspect ratio, it is preferable from the viewpoint that the eddy current loss may be easily reduced; however, on the other hand, the coercivity tends to become slightly higher. Therefore, from the viewpoint of reducing coercivity, it is preferable that the flaky magnetic metal particles have an appropriate thickness and an appropriate aspect ratio. When the flaky magnetic metal particles have a thickness and an aspect ratio in the ranges described above, the flaky magnetic metal particles provide a material having a good balance between the eddy current loss and the coercivity.

One effective method for providing the difference in coercivity on the basis of direction within the flat surface of a flaky magnetic metal particle, is a method of performing a heat treatment in a magnetic field. It is desirable to perform a heat treatment while a magnetic field is applied unidirectionally within the flat surface. Before performing the heat treatment in a magnetic field, it is desirable to find the direction of the easy axis within the flat surface (find the direction in which coercivity is lowest), and to perform the heat treatment while applying a magnetic field in that direction. It is more preferable when the magnetic field to be applied is larger; however, it is preferable to apply a magnetic field of 1 kOe or greater, and it is more preferable to apply a magnetic field of 10 kOe or greater. As a result, magnetic anisotropy can be manifested in the flat surfaces of the flaky magnetic metal particles, a difference in coercivity on the basis of direction can be provided, and excellent magnetic characteristics can be realized. Therefore, it is preferable. The heat treatment is preferably carried out at a temperature of between 50° C. and 800° C. inclusive. Regarding the atmosphere for the heat treatment, a vacuum atmosphere at a low oxygen concentration, an inert atmosphere, or a reducing atmosphere is desirable. More desirably, a reducing atmosphere of $H_2$ (hydrogen), CO (carbon monoxide), $CH_4$ (methane), or the like is preferred. The reason for this is that even if the flaky magnetic metal particles have been oxidized, the oxidized metal can be reduced and restored into simple metal by subjecting the metal particles to a heat treatment in a reducing atmosphere. As a result, flaky magnetic metal particles that have been oxidized and have lowered saturation magnetization can be reduced, and thereby saturation magnetization can be restored. When crystallization of the flaky magnetic metal particles proceeds noticeably due to the heat treatment, characteristics are deteriorated (coercivity increases, and magnetic permeability decreases). Therefore, it is preferable to select the conditions so as to suppress excessive crystallization.

Furthermore, when flaky magnetic metal particles are synthesized, in a case in which the flaky magnetic metal particles are obtained by synthesizing a ribbon by a roll quenching method or the like and pulverizing this ribbon, either or both of a plurality of concavities and a plurality of convexities may be easily arranged in the first direction at the time of ribbon synthesis (concavities or convexities can be easily attached in the direction of rotation of the roll). As a result, the flaky magnetic metal particles may easily have a difference in coercivity on the basis of direction within the flat surface, which is preferable. That is, the direction in which either or both of a plurality of concavities and a plurality of convexities are arranged in the first direction with the flat surface, is likely to become the direction of the easy magnetization axis, and the flat surface may be effectively provided with a difference in coercivity on the basis of direction which is preferable.

According to the present embodiment, flaky magnetic metal particles having low losses can be provided.

Fifth Embodiment

The flaky magnetic metal particles of the present embodiment are different from the fourth embodiment in that at least a portion of the surface of the flaky magnetic metal particles is covered with a coating layer having a thickness of between 0.1 nm and 1 µm inclusive and containing at least one second element selected from the group consisting of oxygen (O), carbon (C), nitrogen (N) and fluorine (F).

In regard to the flaky magnetic metal particles, it is desirable that the requirements described in the first and fourth embodiments are satisfied. Here, since there are overlapping contents, no further description will be repeated. In regard to the coating layer, it is desirable that the requirements described in the second embodiment are satisfied. Here, since there are overlapping contents, no further description will be repeated.

Thus, according to the present embodiment, flaky magnetic metal particles having excellent characteristics such as high magnetic permeability, low losses, excellent mechanical characteristics, and high thermal stability, can be provided.

Sixth Embodiment

The pressed powder material of the present embodiment is a pressed powder material comprising a plurality of flaky magnetic metal particles, each flat magnetic metal particle having a flat surface and a magnetic metal phase containing at least one first element selected from the group consisting of Fe, Co and Ni, the flaky magnetic metal particles having an average thickness of between 10 nm and 100 µm inclusive and an average aspect ratio of between 5 and 10,000 inclusive; and an interposed phase existing between the flaky magnetic metal particles and containing at least one second element selected from the group consisting of oxygen (O), carbon (C), nitrogen (N) and fluorine (F), in which the flat surfaces of the flaky magnetic metal particles are oriented parallel to a plane of the pressed powder material, and the pressed powder material has a difference in coercivity on the basis of direction within the plane of the pressed powder material.

Figure 18:
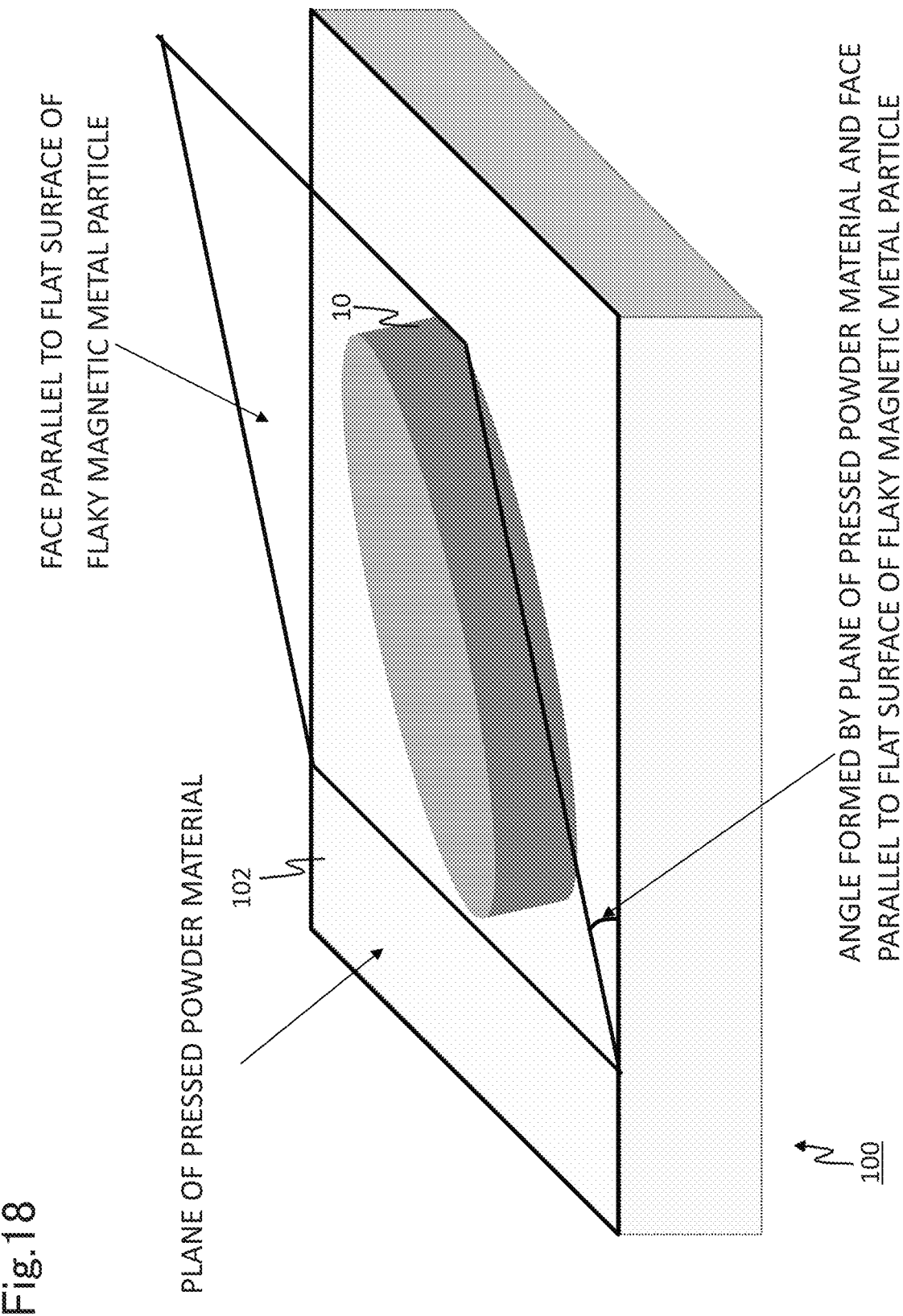
FIG. 18 is a diagram illustrating the angle formed by a face parallel to the flat surface of a flaky magnetic metal particle and a plane surface of a pressed powder material according to a sixth embodiment of the invention.

As the angle formed by a face parallel to the flat surface of a flaky magnetic metal particle and a plane of a pressed powder material is closer to 0°, it is defined that the flaky magnetic metal particles are oriented. FIG. 18 illustrates the angle formed by a face parallel to the flat surface of a flaky magnetic metal particle and a plane of a pressed powder material. It is desirable that the aforementioned angle is determined for a large number of flaky magnetic metal particles, such as ten or more particles, and the average value of the angles is preferably between 0° and 45° inclusive, more preferably between 0° and 30° inclusive, and even more preferably between 0° and 10° inclusive. That is, in regard to the pressed powder material, it is preferable that the flat surfaces of the flaky magnetic metal particles are oriented in a layered form such that the flat surfaces are parallel to one another. As a result, the eddy current loss of the pressed powder material can be reduced, which is preferable. Furthermore, since the diamagnetic field can be made small, the magnetic permeability of the pressed powder material can be made higher, which is preferable. Also, since the ferromagnetic resonance frequency can be made higher, the ferromagnetic resonance loss can be reduced, which is preferable. In addition, such a laminated structure is preferable because the magnetic domain structure is stabilized, and low magnetic losses can be realized.

In a case in which coercivity is measured by varying the direction within the above-mentioned plane of a pressed powder material (within the plane parallel to the flat surface of a flaky magnetic metal particle), coercivity is measured by, for example, varying the direction at an interval of 22.5° for the angle of 360° within the plane. FIG. 19 illustrates, as an example, the directions obtained in a plane of the pressed powder material when coercivity is measured by varying the direction at an interval of 22.5° for the angle of 360° within the plane.

By having a difference in coercivity within the above-mentioned plane of a pressed powder material, the minimum coercivity value becomes small compared to an isotropic case where there is almost no difference in coercivity, and thus it is preferable. A material having magnetic anisotropy within the plane has differences in coercivity depending on the direction within the plane, and the minimum coercivity value becomes small compared to a magnetically isotropic material. As a result, the hysteresis loss is reduced, and the magnetic permeability is increased, which is preferable.

In the plane of a pressed powder material (in the plane parallel to the flat surface of a flaky magnetic metal particle), it is more preferable if the proportion of the difference in coercivity on the basis of direction is larger, and the proportion is preferably 1% or greater. More preferably, the proportion of the difference in coercivity is 10% or greater; even more preferably, the proportion of the difference in coercivity is 50% or greater; and still more preferably, the proportion of the coercivity difference is 100% or greater. The proportion of the difference in coercivity as used herein is defined by the formula: $(Hc(max)-Hc(min))/Hc(min) \times 100(\%)$, by using the maximum coercivity $Hc(max)$ and the minimum coercivity $Hc(min)$ within a flat surface.

Coercivity can be evaluated conveniently by using a vibrating sample magnetometer (VSM) or the like. In a case in which coercivity is low, even a coercivity of 0.1 Oe or less can be measured using a low magnetic field unit. Measurement is made by varying the direction within the above-mentioned plane of a pressed powder material (within the plane parallel to the flat surface of a flaky magnetic metal particle) with respect to the direction of the magnetic field to be measured.

Figure 20:
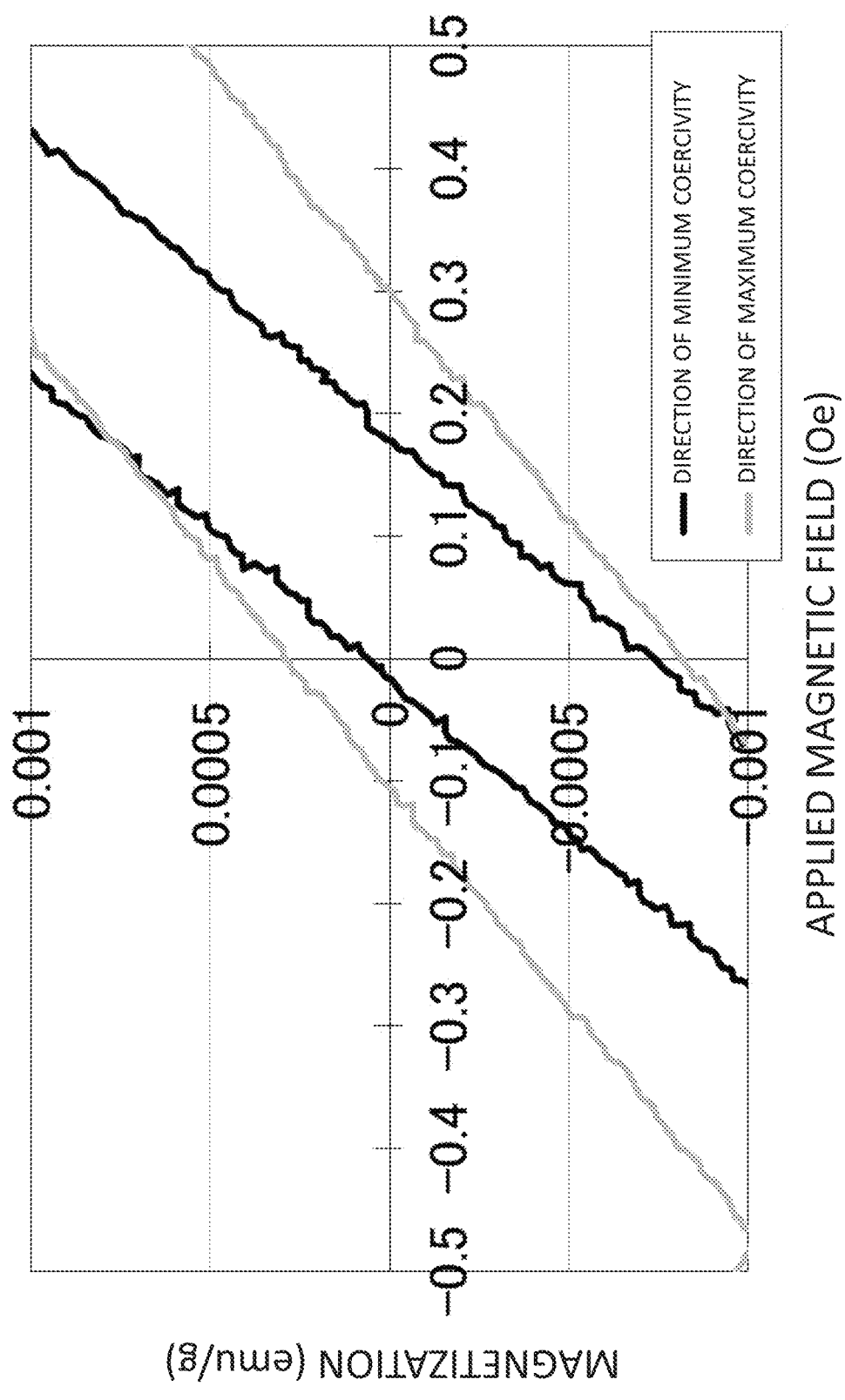
FIG. 20 is a diagram illustrating examples of a magnetization curve in a direction in which coercivity has the minimum value and a magnetization curve in a direction in which coercivity has the maximum value, within a flat surface of the pressed powder material according to the sixth embodiment of the invention.

FIG. 20 illustrates examples of a magnetization curve in a direction in which coercivity has the minimum value and a magnetization curve in a direction in which coercivity has the maximum value, within a plane of the pressed powder material. The magnetization curve is shifted from the zero point; however, this is merely an error in measurement. When coercivity is calculated, a value obtained by dividing the difference between the magnetic fields at two points that intersect with abscissa (magnetic fields H1 and H2 where magnetization is zero) by 2 can be employed (that is, can be calculated by the formula: coercivity=|H2−H1|/2). This sample has a composition of Fe—Co—B—Si (Fe:Co:B:Si=52:23:19:6 (at %), Fe:Co=70:30 (at %), the total amount of the additive elements B+Si is 25 at % with respect to the total amount of Fe+Co+B+Si), and it is understood from FIG. 20 that the minimum coercivity is about 0.1 Oe, while the maximum coercivity is about 0.2 Oe. That is, the proportion of the difference in coercivity is (0.2−0.1)/0.1×100=100(%).

Figure 21:
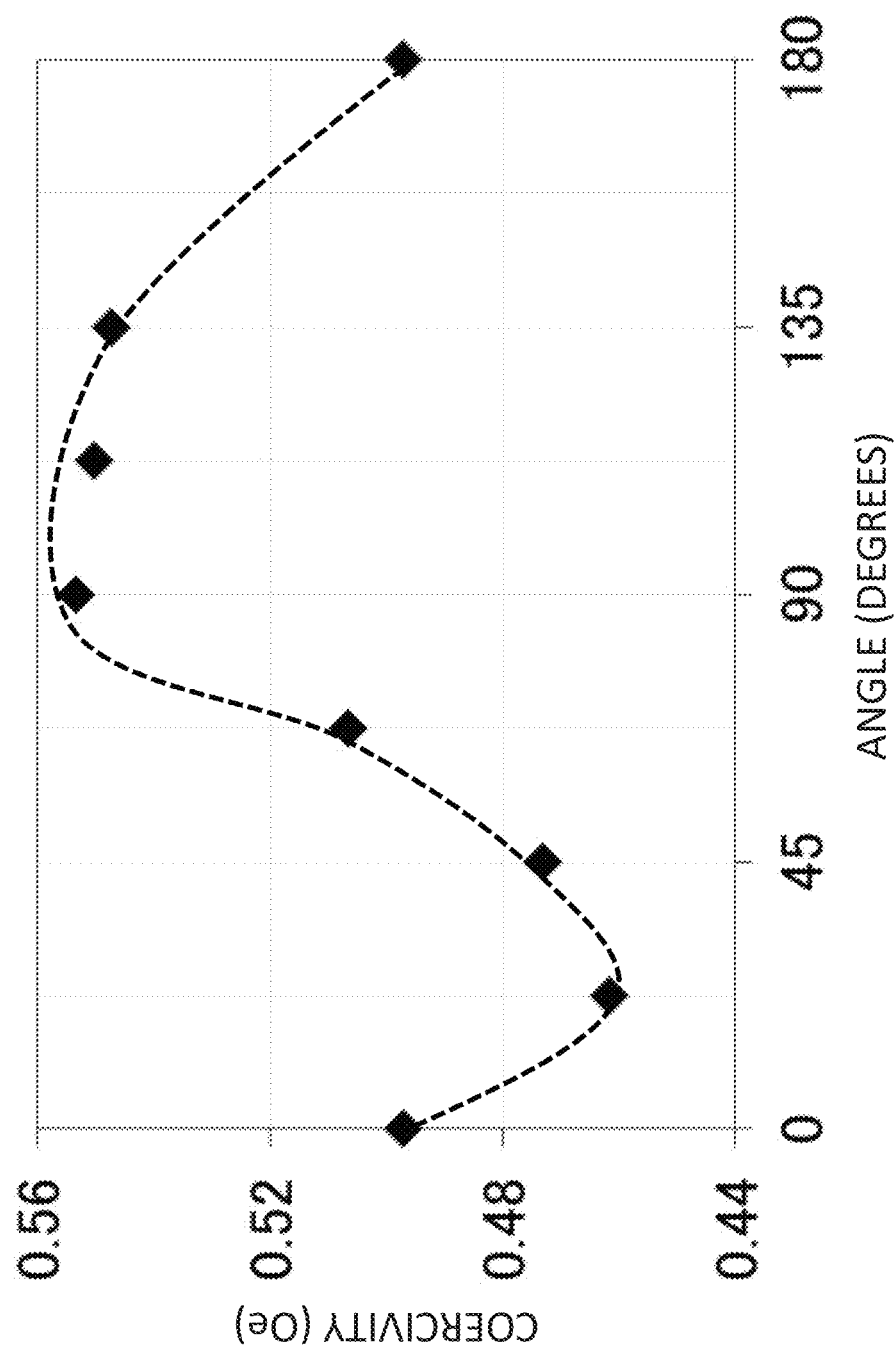
FIG. 21 is a diagram illustrating an example of a difference in coercivity on the basis of direction within a flat surface of the pressed powder material according to the sixth embodiment of the invention.

FIG. 21 illustrates an example of a difference in coercivity on the basis of direction in the pressed powder material of the present embodiment, in a case in which the flat surfaces of flaky magnetic metal particles are oriented parallel to a plane of the pressed powder material, and there is a difference in coercivity on the basis of direction within the plane of the pressed powder material. In the direction of 22.5°, the coercivity is 0.46 Oe (minimum value), and in the direction of 90°, the coercivity is 0.55 Oe (maximum value). Therefore, the proportion of the difference in coercivity is (0.55−0.46)/0.46×100=19.6%. As such, the proportion of the difference in coercivity is preferably 1% or greater, and more preferably, the proportion of the difference in coercivity is 10% or greater; the proportion of the difference in coercivity is even more preferably 50% or greater; and the proportion of the difference in coercivity is still more preferably 100% or greater.

The pressed powder material may have a laminated structure composed of a magnetic layer containing the flaky magnetic metal particles; and an intermediate layer containing any of O, C and N. In the magnetic layer, it is preferable that the flaky magnetic metal particles are oriented (oriented such that the flat surfaces are parallel to one another). Furthermore, it is preferable that the magnetic permeability of the intermediate layer is made smaller than the magnetic permeability of the magnetic layer. Through these countermeasures, a pseudo thin film laminated structure can be realized, and the magnetic permeability in the layer direction can be made high, which is preferable. In regard to such a structure, since the ferromagnetic resonance frequency can be made high, the ferromagnetic resonance loss can be made small, which is preferable. Furthermore, such a laminated structure is preferable because the magnetic domain structure is stabilized, and low magnetic loss can be realized. In order to further enhance these effects, it is more preferable to make the magnetic permeability of the intermediate layer to be smaller than the magnetic permeability of the interposed phase (interposed phase within the magnetic layer). As a result, the magnetic permeability in the layer direction can be made higher in a pseudo thin film laminated structure, and therefore, it is preferable. Also, since the ferromagnetic resonance frequency can be made even higher, the ferromagnetic resonance loss can be made small, which is preferable.

In regard to the flaky magnetic metal particles that are included in the pressed powder material, it is desirable that the requirements described in the first, second, fourth, and fifth embodiments are satisfied. Here, any overlapping matters will not be described repeatedly. Furthermore, in regard to the pressed powder material, it is desirable that the requirements described in the third embodiment are satisfied. Here, any overlapping matters will not be described repeatedly.

According to the present embodiment, a pressed powder material having low losses can be provided.

Seventh Embodiment

The system and the device apparatus of the present embodiment have the pressed powder material of the third or fifth embodiment. Therefore, any matters overlapping with the contents of the first to fifth embodiments will not be described repeatedly. Examples of the component parts of the pressed powder material included in these system and device apparatus include cores for rotating electric machines such as various motors and generators (for example, motors and generators), potential transformers, inductors, transformers, choke coils and filters; and magnetic wedges for a rotating electric machine. FIG. 22 shows a conceptual diagram of a motor system as an example of the rotating electric machine system. A motor system is one system including a control system for controlling the rotational frequency or the electric power (output power) of a motor. Regarding the mode for controlling the rotational frequency of a motor, there are available control methods that are based on control by a bridge servo circuit, proportional current control, voltage comparison control, frequency synchronization control, and phase locked loop (PLL) control. As an example, a control method based on PLL is illustrated in FIG. 22. A motor system that controls the rotational frequency of a motor based on PLL comprises a motor; a rotary encoder that converts the amount of mechanical displacement of the rotation of the motor into electrical signals, and detects the rotational frequency of the motor; a phase comparator that compares the rotational frequency of the motor given by a certain command, with the rotational frequency of the motor detected by the rotary encoder, and outputs the difference of those rotational frequencies; and a controller that controls the motor so as to make the difference of the rotational frequencies small. On the other hand, examples of the method for controlling the electric power of the motor include control methods that are based on pulse width modulation (PWM) control, pulse amplitude modulation (PAM) control, vector control, pulse control, bipolar drive, pedestal control, and resistance control. Other examples of the control method include control methods based on microstep drive control, multiphase drive control, inverter control, and switching control. As an example, a control method using an inverter is illustrated in FIG. 22. A motor system that controls the electric power of the motor using an inverter comprises an alternating current power supply; a rectifier that converts the output of the alternating current power supply to a direct current; an inverter circuit that converts the direct current to an alternating current based on an arbitrary frequency; and a motor that is controlled by this alternating current.

Figure 23:
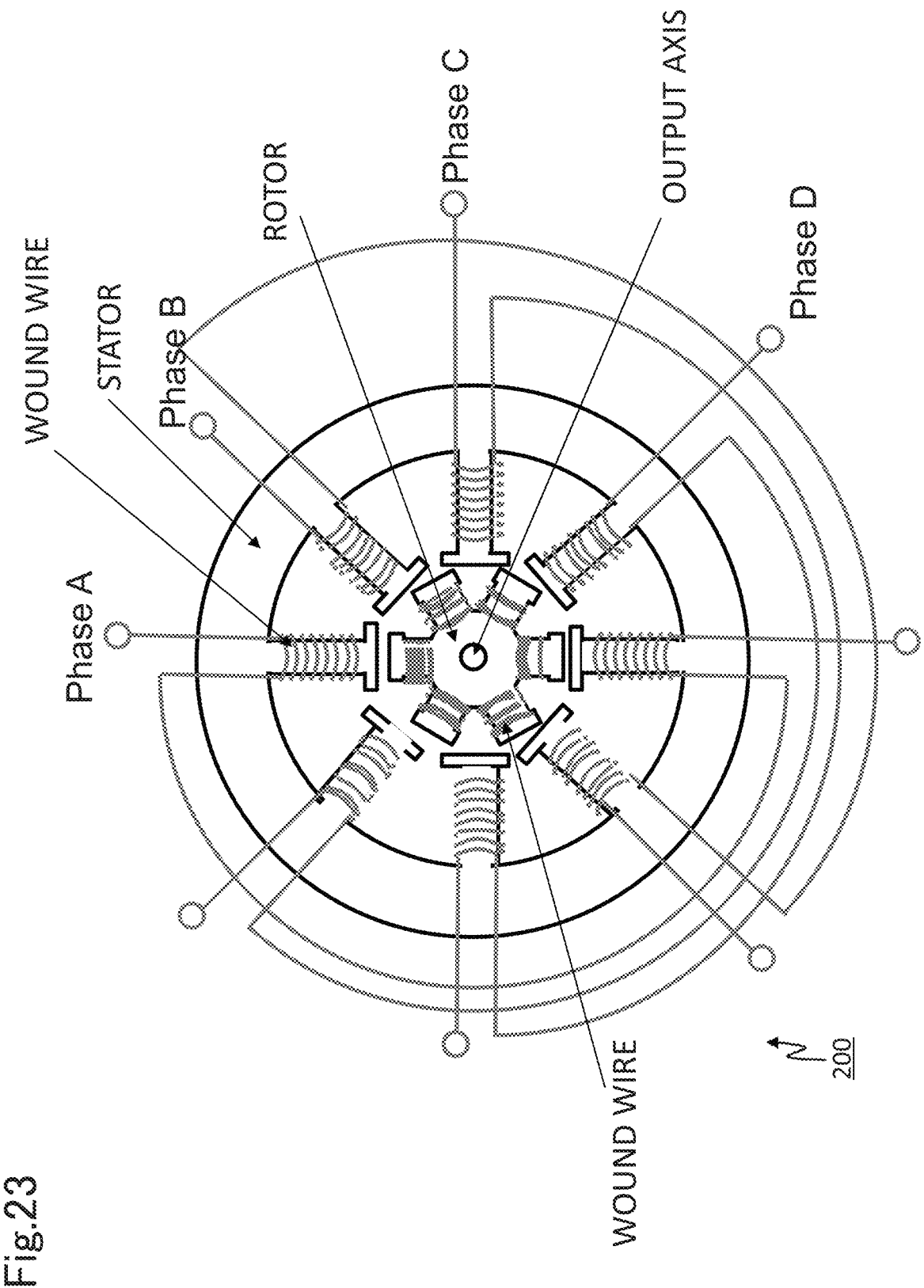
FIG. 23 is a schematic diagram illustrating the motor of the seventh embodiment of the invention.

FIG. 23 shows a conceptual diagram of a motor 200 as an example of the rotating electric machine. In the motor, a first stator (magneto stator) and a second rotor (rotator) are disposed. The diagram illustrates an inner rotor type motor in which a rotor is disposed on the inner side of a stator;

however, the motor may also be of an outer rotor type in which the rotor is disposed on the outer side of the stator.

Figure 24:
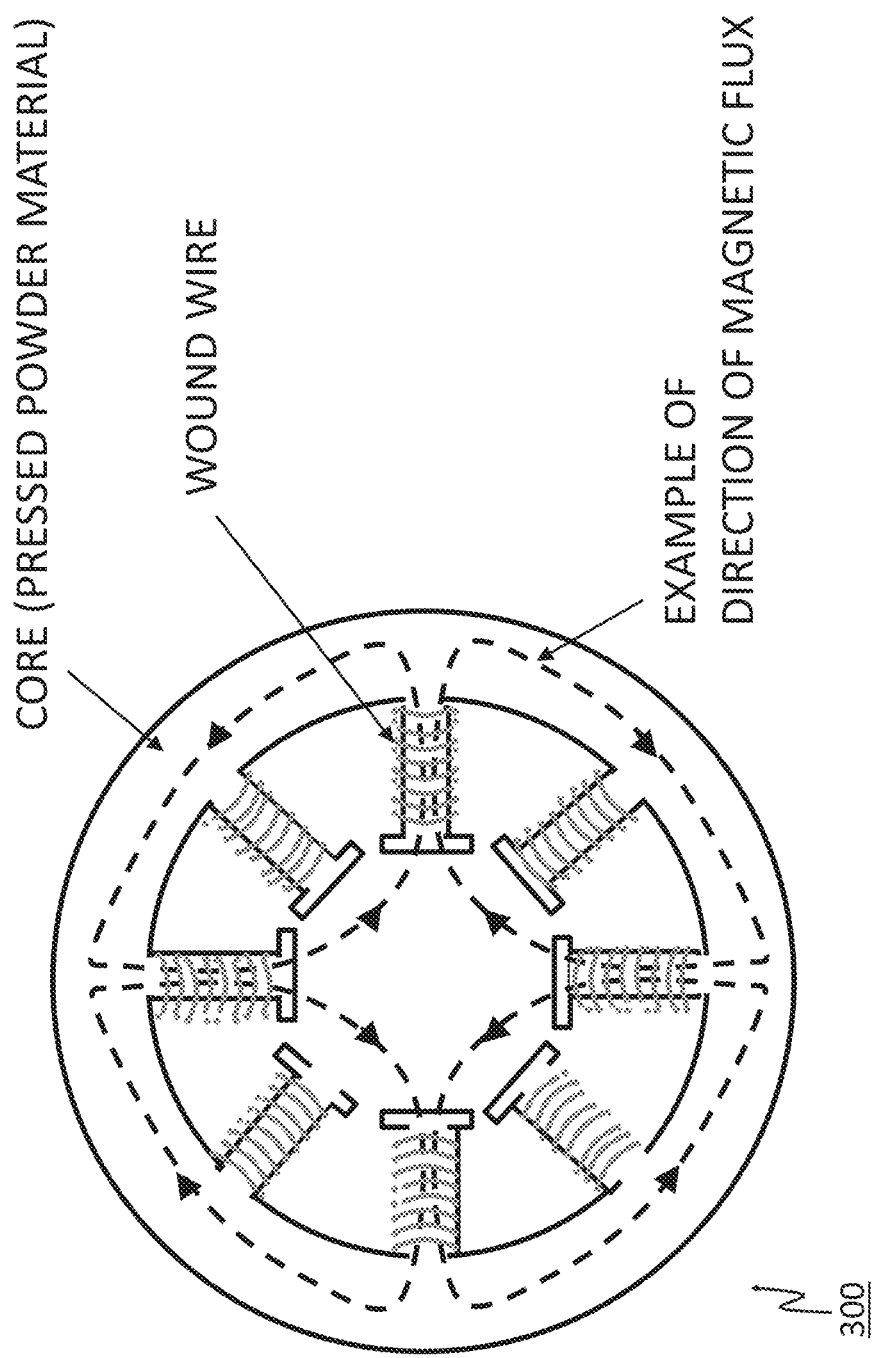
FIG. 24 is a schematic diagram illustrating a motor core according to the seventh embodiment of the invention.
Figure 25:
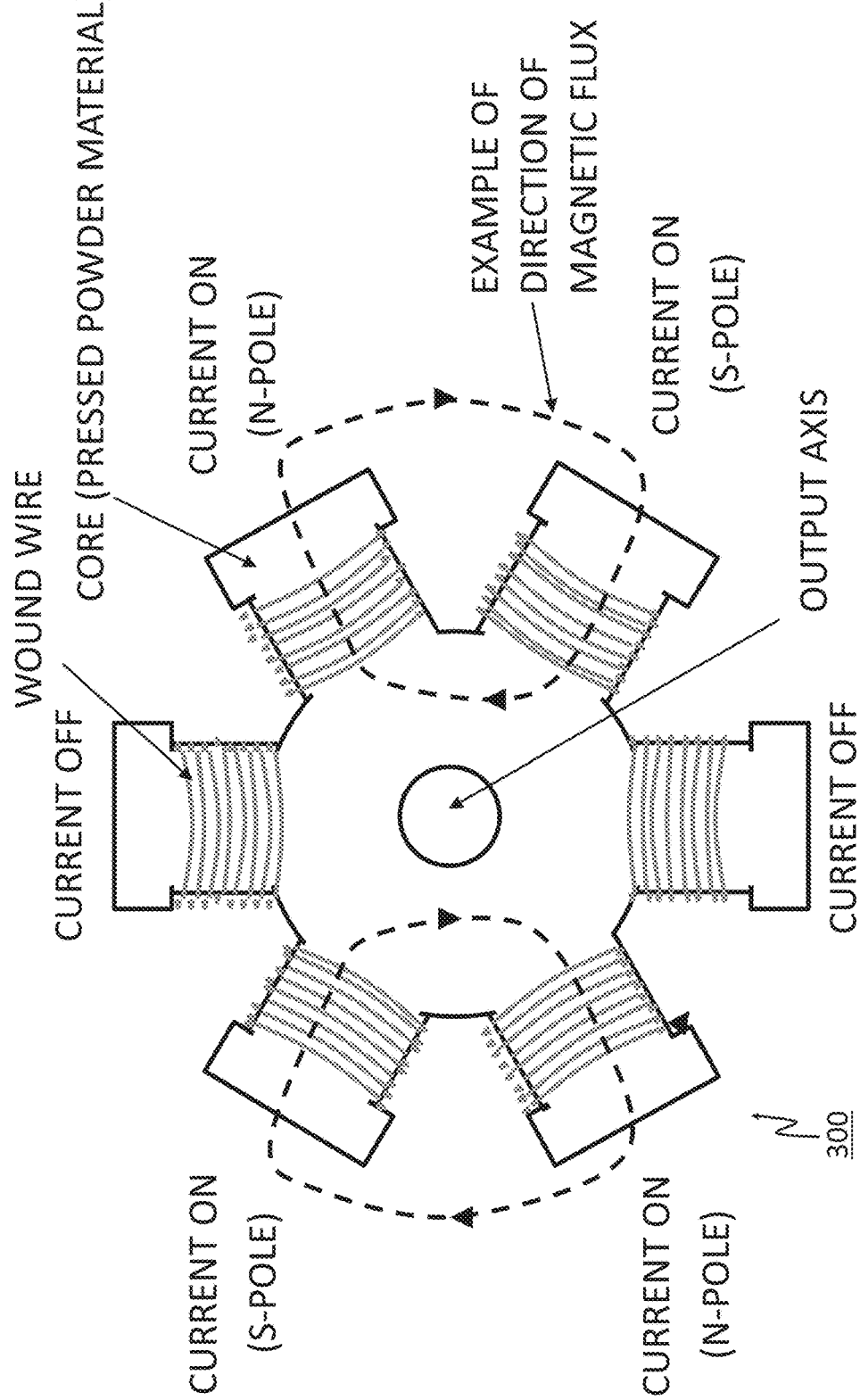
FIG. 25 is a schematic diagram illustrating the motor core according to the seventh embodiment of the invention.

FIG. 24 and FIG. 25 show conceptual diagrams of a motor core (core of a motor) 300. The cores of a stator and a rotor correspond to the motor core. This will be explained below. FIG. 24 is an exemplary conceptual cross-sectional diagram of a first stator. The first stator has a core and coils. The coils are wound around some of the protrusions of the core, which are provided on the inner side of the core. In this core, the pressed powder material of the first, second or third embodiment can be disposed. FIG. 25 is an exemplary conceptual cross-sectional diagram of the first rotor. The first rotor has a core and coils. The coils are wound around some of the protrusions of the core, which are provided on the outer side of the core. In this core, the pressed powder material of the first, second or third embodiment can be disposed.

FIG. 24 and FIG. 25 are only for illustrative purposes to describe examples of motors, and the applications of the pressed powder material are not limited to these. The pressed powder material can be applied to all kinds of motors as cores for making it easy to lead the magnetic flux.

Figure 26:
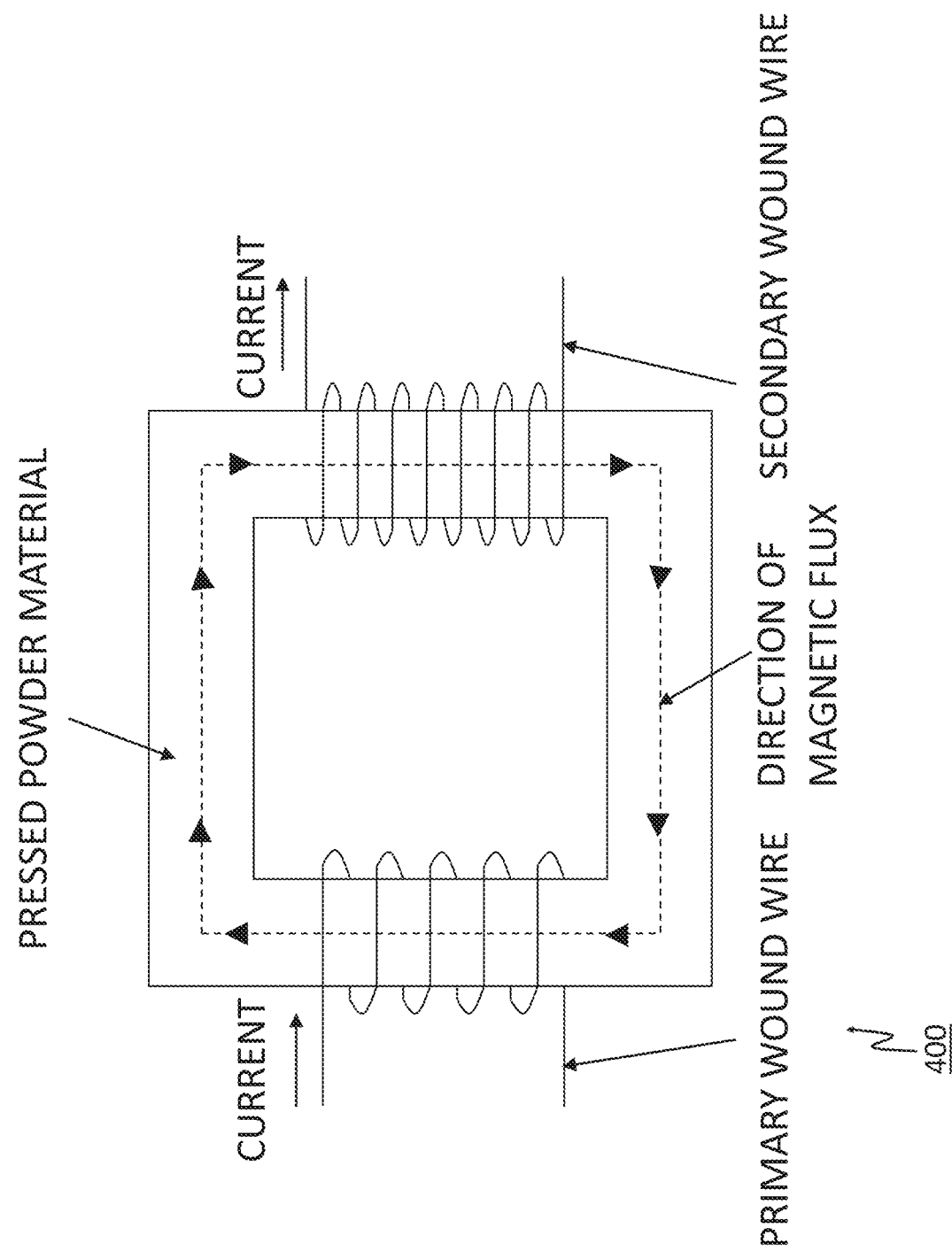
FIG. 26 is a schematic diagram illustrating a potential transformer and a transformer according to the seventh embodiment of the invention.
Figure 27:
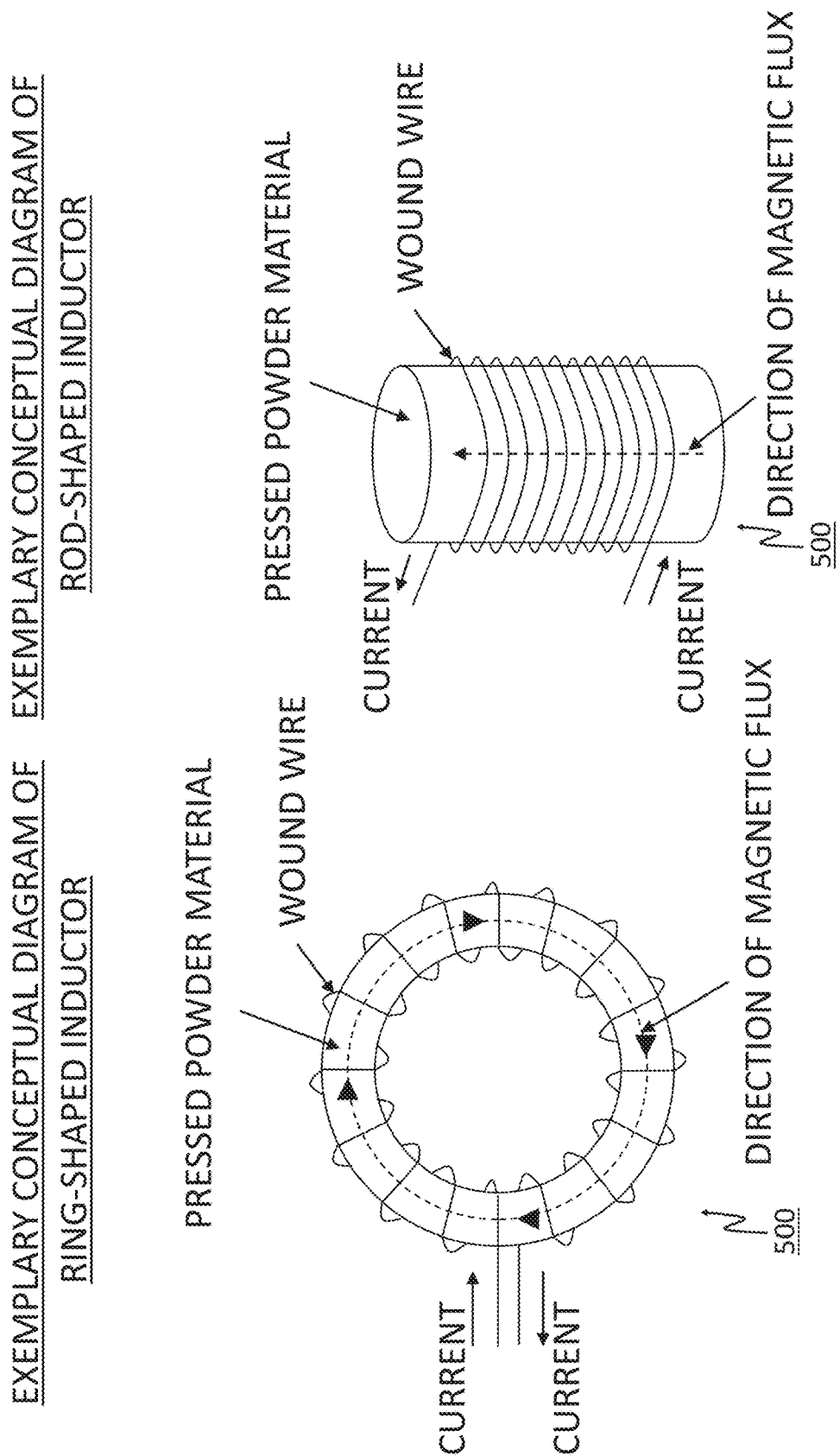
FIG. 27 is a schematic diagram illustrating an inductor according to the seventh embodiment of the invention.
Figure 28:
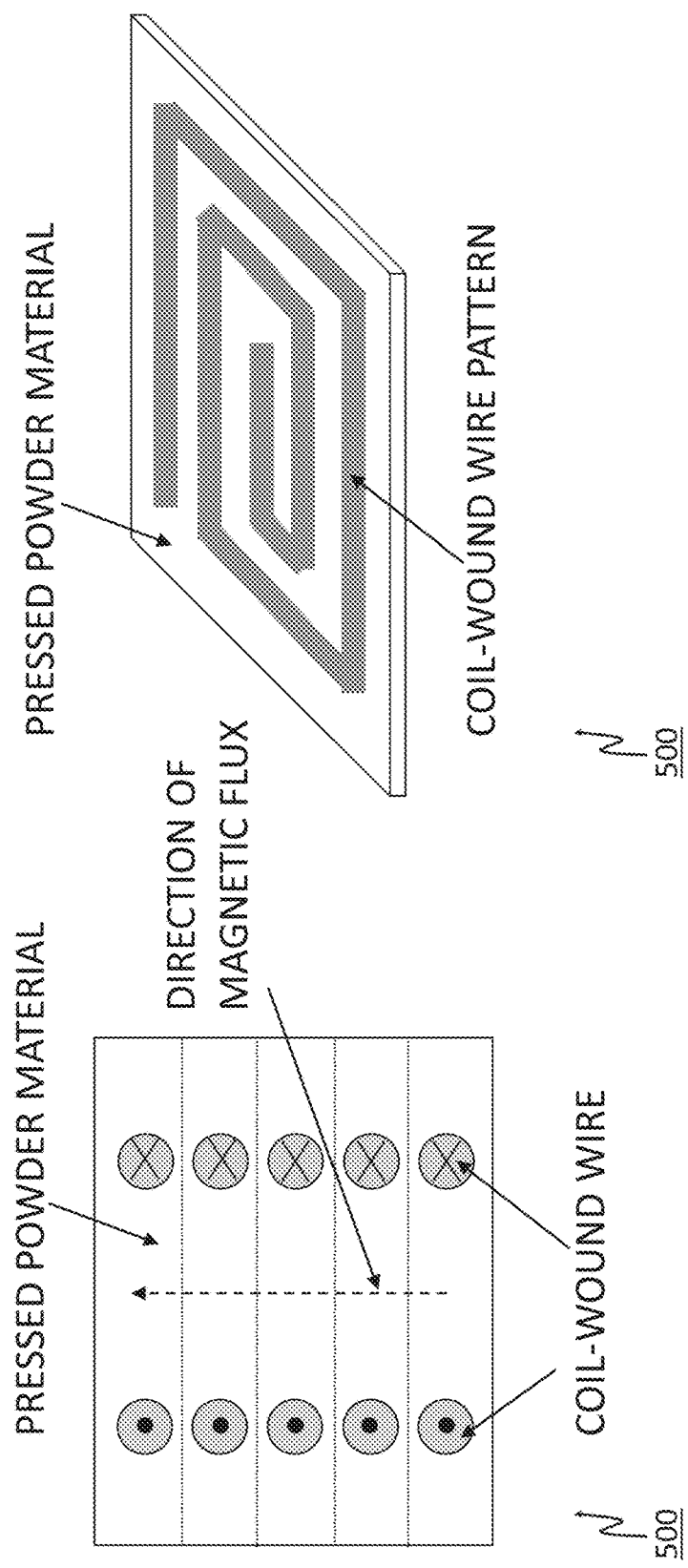
FIG. 28 is a schematic diagram illustrating an inductor according to the seventh embodiment of the invention.

Furthermore, a conceptual diagram of a potential transformer/transformer 400 is described in FIG. 26, and conceptual diagrams of an inductor are described in FIG. 27 and FIG. 28. These diagrams are only for illustrative purposes. Also for the potential transformer/transformer and the inductor, similarly to the motor core, pressed powder materials can be applied to all kinds of potential transformers/transformers and inductors in order to make it easy to lead the magnetic flux, or to utilize high magnetic permeability.

Figure 29:
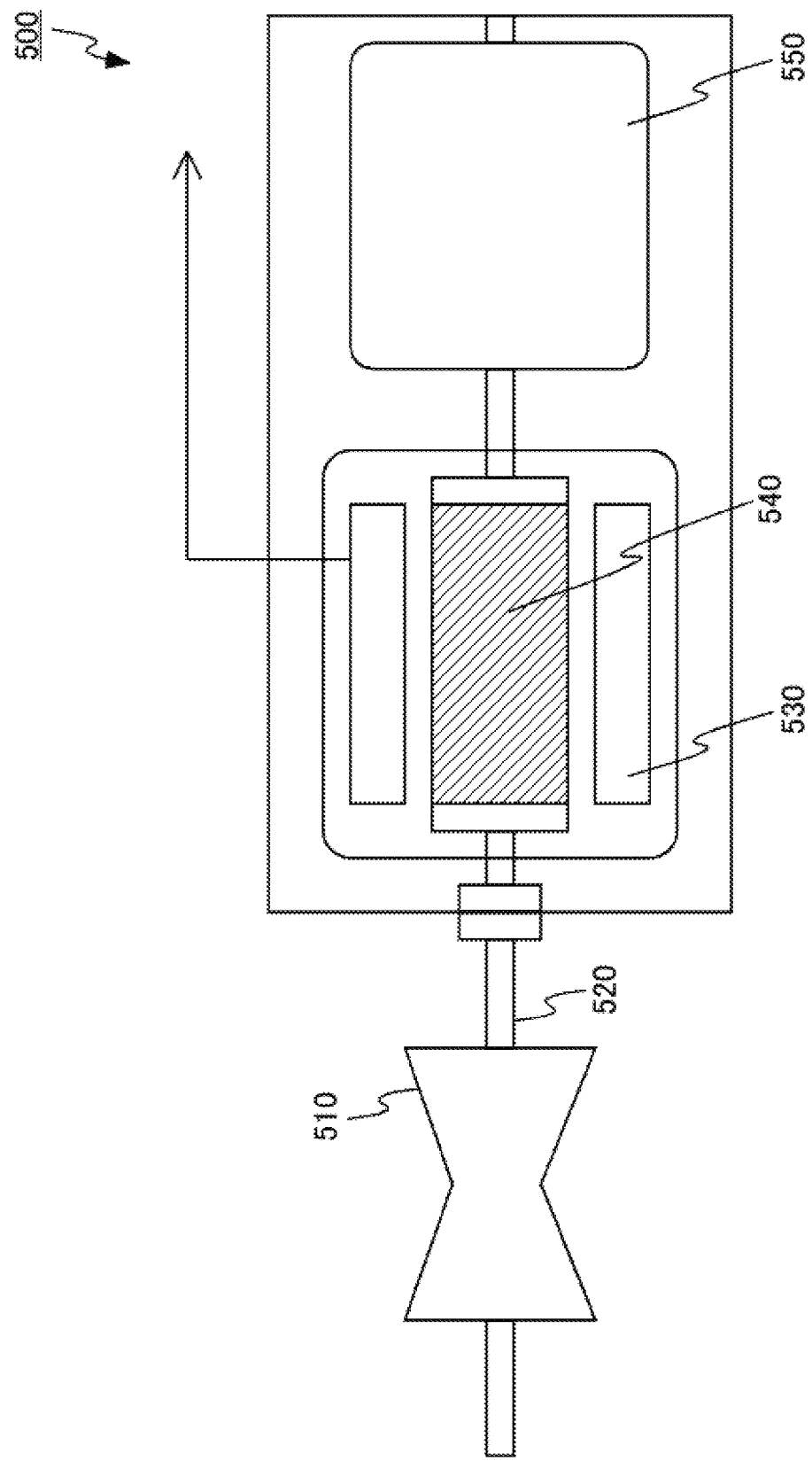
FIG. 29 is a schematic diagram illustrating a generator according to the seventh embodiment of the invention.

FIG. 29 shows an exemplary conceptual diagram of a generator 500 as an example of the rotating electric machine. The generator 500 comprises any one of, or both of, a second stator (magneto stator) 530 that uses the pressed powder material of the first, second or third embodiment as a core; and a second rotor (rotator) 540 that uses the pressed powder material of the first, second or third embodiment as a core. In the diagram, the second rotor (rotator) 540 is disposed on the inner side of the second stator 530; however, the second rotor may also be disposed on the outer side of the second stator. The second rotor 540 is connected to a turbine 510 provided at an end of the generator 500 through a shaft 520. The turbine 510 is rotated by, for example, a fluid supplied from the outside, which is not shown in the diagram. Meanwhile, instead of the turbine that is rotated by a fluid, the shaft can also be rotated by transferring dynamic rotation of the regenerative energy of an automobile or the like. Various known configurations can be employed for the second stator 530 and the second rotor 540.

The shaft is in contact with a commutator (not shown in the diagram) that is disposed on the opposite side of the turbine with respect to the second rotor. The electromotive force generated by rotation of the second rotor is transmitted, as the electric power of the generator, after undergoing a voltage increase to the system voltage by means of an isolated phase bus that is not shown in the diagram, and a main transformer that is not shown in the diagram. Meanwhile, in the second rotor, an electrostatic charge is generated due to an axial current resulting from the static electricity from the turbine or power generation. Therefore, the generator comprises a brush intended for discharging the electrostatic charge of the second rotor.

The rotating electric machine of the present embodiment can be preferably used in railway vehicles. For example, the rotating electric machine can be preferably used in a motor 200 that drives a railway vehicle, or a generator 500 that generates electricity for driving a railway vehicle.

Furthermore, FIG. 30 describes a preferred example of the relation between the direction of the magnetic flux and the direction of disposition of a pressed powder material. First, for both of the domain wall displacement type and the rotation magnetization type, it is preferable that the flat surfaces of the flaky magnetic metal particles included in a pressed powder material are disposed in a direction in which the flat surfaces are parallel to one another as far as possible are aligned in a layered form, with respect to the direction of the magnetic flux. This is because the eddy current loss can be reduced by making the cross-sectional area of the flaky magnetic metal particles that penetrate through the magnetic flux, as small as possible. Furthermore, in regard to the domain wall displacement type, it is preferable that the easy magnetization axis (direction of the arrow) in the flat surface of a flaky magnetic metal particle is disposed parallel to the direction of the magnetic flux. As a result, the system can be used in a direction in which coercivity is further decreased, and therefore, the hysteresis loss can be reduced, which is preferable. Furthermore, the magnetic permeability is also made high, and it is preferable. In contrast, in regard to the rotation magnetization type, it is preferable that the easy magnetization axis (direction of the arrow) in the flat surface of a flaky magnetic metal particle is disposed perpendicularly to the direction of the magnetic flux. As a result, the system can be used in a direction in which coercivity is further decreased, and therefore, the hysteresis loss can be reduced, which is preferable. That is, it is preferable to understand the magnetization characteristics of a pressed powder material, determine whether the pressed powder material is of the domain wall displacement type or the rotation magnetization type (method for determination is as described above), and then dispose the pressed powder material as shown in FIG. 30. In a case in which the direction of the magnetic flux is complicated, it may be difficult to dispose the pressed powder material perfectly as shown in FIG. 30; however, it is preferable to dispose the pressed powder material as shown in FIG. 30 as far as possible. It is desirable that the method for disposition described above is applied to all of the systems and device apparatuses of the present embodiment (for example, cores for rotating electric machines such as various motors and generators (for example, motors and generators), potential transformers, inductors, transformers, choke coils, and filters; and magnetic wedges for a rotating electric machine).

In order for a pressed powder material to be applied to these systems and device apparatuses, the pressed powder material is allowed to be subjected to various kinds of processing. For example, in the case of a sintered body, the pressed powder material is subjected to mechanical processing such as polishing or cutting; and in the case of a powder, the pressed powder material is mixed with a resin such as an epoxy resin or polybutadiene. If necessary, the pressed powder material is further subjected to a surface treatment. Also, if necessary, a coil treatment is carried out.

When the system and device apparatus of the present embodiment are used, a motor system, a motor, a potential transformer, a transformer, an inductor and a generator, all having excellent characteristics (high efficiency and low losses), can be realized.

EXAMPLES

Hereinafter, Examples 1 to 11 of the present invention will be described in more detail, by making comparisons with Comparative Examples 1 to 5. In regard to the flaky magnetic metal particles obtainable by Examples and Comparative Examples described below, the thickness and aspect ratio of the flaky magnetic metal particles, the width, length, aspect ratio and number of units of concavities or convexities, and the presence or absence of extraneous metal particles are summarized in Table 1. Meanwhile, each of the above-mentioned items is calculated as an average value of a large number of particles obtained based on TEM observation or SEM observation.

Example 1

First, a ribbon of Fe—Co—Si—B (Fe:Co=70:30 at %) is produced using a single roll quenching apparatus. The roll surface is rubbed with a polishing paper in the direction of rotation of the roll, and thus the surface roughness is adjusted. Next, the ribbon thus obtained is subjected to a heat treatment at 300° C. in a $H_2$ atmosphere. Next, this ribbon is cut into an appropriate size using a mixing apparatus, subsequently the ribbon pieces thus cut are collected, and the ribbon pieces are subjected to pulverization and rolling at about 1,000 rpm in an Ar atmosphere using a bead mill that uses $ZrO_2$ balls and a $ZrO_2$ vessel. Thus, the ribbon pieces are converted to a flaky powder. Subsequently, the flaky powder is subjected to a heat treatment at 400° C. in a $H_2$ atmosphere, and thus flaky magnetic metal particles are obtained. The flaky magnetic metal particles are treated so as to obtain a predetermined size and a predetermined structure, by repeating the operations of pulverization/rolling and heat treatment described above. Meanwhile, the flaky magnetic metal particles include both concavities and convexities. Also, the crystal structure of the magnetic phase of the flaky magnetic metal particles is a body-centered cubic structure. The flaky magnetic metal particles thus obtained are mixed with an inorganic oxide interposed phase and are subjected to molding in a magnetic field (flaky particles are oriented). The flaky magnetic metal particles are subjected to a heat treatment, and thereby a pressed powder material is obtained.

Example 2

A pressed powder material is obtained in almost the same manner as in Example 1, except that the flaky magnetic metal particles have a thickness of 1 µm and an aspect ratio of 100, and the state of concavities or convexities is accordingly different.

Example 3

A pressed powder material is obtained in almost the same manner as in Example 1, except that the flaky magnetic metal particles have a thickness of 10 pin and an aspect ratio of 20, and the state of concavities or convexities is accordingly different.

Example 4

A pressed powder material is obtained in almost the same manner as in Example 1, except that the flaky magnetic metal particles have a thickness of 100 µm and an aspect ratio of 5, and the state of concavities or convexities is accordingly different.

Example 5

A pressed powder material is obtained in almost the same manner as in Example 1, except that the flaky magnetic metal particles have a thickness of 10 nm and an aspect ratio of 1,000, and the state of concavities or convexities is accordingly different.

Example 6

A pressed powder material is obtained in almost the same manner as in Example 1, except that the flaky magnetic metal particles have a thickness of 10 nm and an aspect ratio of 10,000, and the state of concavities or convexities is accordingly different.

Example 7

A pressed powder material is obtained in almost the same manner as in Example 3, except that the flaky magnetic metal particles have no extraneous metal particles along the concavities or convexities.

Example 8

A pressed powder material is obtained in almost the same manner as in Example 3, except that the surface of the flaky magnetic metal particles is coated with a non-magnetic $SiO_2$ layer having a thickness of about 10 nm by a sol-gel method.

Example 9

A pressed powder material is obtained in almost the same manner as in Example 3, except that the proportion of arrangement of the approximate first direction is adjusted to 30% or higher by molding the flaky magnetic metal particles while orienting the metal particles in a magnetic field.

Example 10

A pressed powder material is obtained in almost the same manner as in Example 3, except that the flaky magnetic metal particles include only concavities (not including convexities).

Example 11

A pressed powder material is obtained in almost the same manner as in Example 3, except that the flaky magnetic metal particles include only convexities (not including concavities).

Comparative Example 1

Flaky magnetic metal particles having no concavities or convexities are synthesized by rubbing the roll surface with polishing paper #4000. A pressed powder material is obtained in almost the same manner as in Example 3, except that the flaky magnetic metal particles have no concavities or convexities.

Comparative Example 2

A pressed powder material is obtained in almost the same manner as in Example 1, except that the flaky magnetic metal particles have a thickness of 8 nm and an aspect ratio of 1,000, and the state of concavities or convexities is accordingly different.

Comparative Example 3

A pressed powder material is obtained in almost the same manner as in Example 1, except that the flaky magnetic metal particles have a thickness of 120 μm and an aspect ratio of 5, and the state of concavities or convexities is accordingly different.

Comparative Example 4

A pressed powder material is obtained in almost the same manner as in Example 1, except that the flaky magnetic metal particles have a thickness of 100 μm and an aspect ratio of 4, and the state of concavities or convexities is accordingly different.

Comparative Example 5

A pressed powder material is obtained in almost the same manner as in Example 1, except that the flaky magnetic metal particles have a thickness of 10 nm and an aspect ratio of 12,000, and the state of concavities or convexities is accordingly different.

Next, in regard to the materials for evaluation of Examples 1 to 11 and Comparative Examples 1 to 5, the saturation magnetization, the real part of magnetic permeability ($\mu'$), the magnetic permeability loss (tan $\delta$), the change over time in the real part of magnetic permeability ($\mu'$) after 100 hours, the core loss, and the strength ratio are evaluated by the following methods. The evaluation results are presented in Table 2.

(1) Saturation magnetization: The saturation magnetization at room temperature is measured using a VSM.

(2) Real part of magnetic permeability, $\mu'$, and magnetic permeability loss (tan $\delta = \mu''/\mu' \times 100(\%)$): The magnetic permeability of a ring-shaped sample is measured using an impedance analyzer. The real part of magnetic permeability, $\mu'$, and the imaginary part of magnetic permeability, $\mu''$, at a frequency of 1 kHz are measured. Furthermore, the magnetic permeability loss or coefficient of loss, tan $\delta$, is calculated by the formula: $\mu''/\mu' \times 100(\%)$.

(3) Change over time in real part of magnetic permeability, $\mu'$, after 100 hours: A sample for evaluation is heated at a temperature of 60° C. in air for 100 hours, and then the real part of magnetic permeability, $\mu'$, is measured again. Thus, the change over time (real part of magnetic permeability, $\mu'$, after standing for 100 hours/real part of magnetic permeability, $\mu'$, before standing) is determined.

(4) Core loss: The core loss under the operating conditions of 1 kHz and 1 T is measured using a B—H analyzer. In a case in which the core loss cannot be directly measured under the conditions of 1 kHz and 1 T, the dependency on frequency and the dependency on the magnetic flux density of the core loss are measured, and the core loss at 1 kHz and 1 T is estimated from the data (then, this estimated value is employed).

(5) Strength ratio: The flexural strength of a sample for evaluation is measured, and this is expressed by the ratio of the measured flexural strength with respect to the flexural strength of the sample of Comparative Example 1 (=flexural strength of sample for evaluation/flexural strength of sample of Comparative Example 1).

TABLE 1

| | | | Concavities and convexities | | | | | |
|---|---|---|---|---|---|---|---|---|
| | Thickness | Aspect ratio | Width | Length | Aspect ratio | Direction of arrangement | Number | Presence or absence of extraneous metal particles | Remarks |
| Example 1 | 10 nm | 200 | 0.1 μm | 0.5 μm | 5 | Unidirectional | 5 | Present | — |
| Example 2 | 1 μm | 100 | 5 μm | 20 μm | 4 | Unidirectional | 10 | Present | — |
| Example 3 | 10 μm | 20 | 5 μm | 50 μm | 10 | Unidirectional | 14 | Present | — |
| Example 4 | 100 μm | 5 | 10 μm | 50 μm | 5 | Unidirectional | 20 | Present | — |
| Example 5 | 10 nm | 1000 | 1 μm | 2 μm | 2 | Unidirectional | 5 | Present | — |
| Example 6 | 10 nm | 10000 | 6 μm | 20 μm | 4 | Unidirectional | 10 | Present | — |
| Example 7 | 10 μm | 20 | 6 μm | 60 μm | 10 | Unidirectional | 12 | Absent | — |
| Example 8 | 10 μm | 20 | 5 μm | 50 μm | 10 | Unidirectional | 14 | Present | With coating layer |
| Example 9 | 10 μm | 20 | 5 μm | 50 μm | 10 | Unidirectional | 14 | Present | Proportion of arrangement in approximate first direction is 30% or greater |
| Example 10 | 10 μm | 20 | 5 μm | 50 μm | 10 | Unidirectional | 16 | Present | Concavities only |
| Example 11 | 10 μm | 20 | 5 μm | 50 μm | 10 | Unidirectional | 12 | Present | Convexities only |
| Comparative example 1 | 10 μm | 20 | — | — | — | — | — | — | No concavities or convexities |
| Comparative example 2 | 8 nm | 1000 | 0.5 μm | 2 μm | 4 | Unidirectional | 6 | Present | |
| Comparative example 3 | 120 μm | 5 | 10 μm | 50 μm | 5 | Unidirectional | 18 | Present | |
| Comparative example 4 | 100 μm | 4 | 10 μm | 50 μm | 5 | Unidirectional | 17 | Present | |
| Comparative example 5 | 10 nm | 12000 | 5 μm | 20 μm | 4 | Unidirectional | 9 | Present | |

TABLE 2

| | Saturation magnetization (T) | μ' (1 kHz) | tan δ (%) (1 kHz) | Core loss (kW/m³) | Proportion of change over time of μ' | Strength ratio |
|---|---|---|---|---|---|---|
| Example 1 | 1.7 | 130 | ≈0 | 500 | 93 | 1.3 |
| Example 2 | 1.7 | 130 | ≈0 | 520 | 92 | 1.3 |
| Example 3 | 1.7 | 140 | ≈0 | 510 | 92 | 1.3 |
| Example 4 | 1.7 | 130 | ≈0 | 550 | 92 | 1.3 |
| Example 5 | 1.7 | 140 | ≈0 | 480 | 92 | 1.3 |
| Example 6 | 1.7 | 150 | ≈0 | 480 | 92 | 1.3 |
| Example 7 | 1.7 | 120 | ≈0 | 540 | 91 | 1.2 |
| Example 8 | 1.6 | 150 | ≈0 | 490 | 93 | 1.4 |
| Example 9 | 1.7 | 160 | ≈0 | 480 | 93 | 1.4 |
| Example 10 | 1.7 | 140 | ≈0 | 520 | 92 | 1.3 |
| Example 11 | 1.7 | 140 | ≈0 | 530 | 92 | 1.3 |
| Comparative example 1 | 1.7 | 110 | ≈0 | 600 | 88 | — |
| Comparative example 2 | 1.7 | 150 | ≈0 | 560 | 91 | 1.1 |
| Comparative example 3 | 1.7 | 140 | ≈0 | 540 | 92 | 1.1 |
| Comparative example 4 | 1.7 | 130 | ≈0 | 550 | 91 | 1.1 |
| Comparative example 5 | 1.7 | 150 | ≈0 | 560 | 91 | 1.1 |

As is obvious from Table 1, the flaky magnetic metal particles according to Examples 1 to 11 have a thickness of between 10 nm and 100 μm inclusive and an aspect ratio of between 5 and 10,000 inclusive, and include five or more concavities or convexities on the flat surface, each concavity or convexity having a width of 0.1 μm or more, a length of 1 μm or more, and an aspect ratio of 2 or higher. Furthermore, the concavities or convexities are unidirectionally arranged on the flat surface. In the Examples other than Example 7, a plurality of extraneous metal particles having an average size of between 1 nm and 1 μm inclusive is arranged along the concavities or convexities. Example 8 has a coating layer formed on the surface of the flaky magnetic metal particles of Example 3. In Example 9, the proportion of arrangement in the approximate first direction is 30% or higher. In Example 10, the flaky magnetic metal particles include concavities only, and in Example 11, the flaky magnetic metal particles include convexities only.

As is obvious from Table 2, it is understood that the pressed powder materials that use the flaky magnetic metal particles of Examples 1 to 11 are excellent particularly in terms of the magnetic permeability, the core loss, the proportion of change over time in the magnetic permeability, and the strength ratio, compared to the pressed powder material of Comparative Example 1. That is, it is understood that the pressed powder materials have excellent magnetic characteristics, thermal stability, and mechanical characteristics. It is also understood that Examples 8 and 9 are slightly superior to Example 3 in terms of the magnetic permeability, the core loss, the proportion of change over time in the magnetic permeability, and the strength ratio. That is, it is understood that Examples 8 and 9 have slightly superior magnetic characteristics, thermal stability, and mechanical characteristics. Furthermore, it is understood that Example 3 is slightly superior to Example 7 in terms of the magnetic permeability, the core loss, the proportion of change over time in the magnetic permeability, and the strength ratio. That is, it is understood that Example 3 has slightly superior magnetic characteristics, thermal stability, and mechanical characteristics. It is understood that Comparative Examples 2 to 5 have concavities or convexities formed thereon; however, the thicknesses and the aspect ratios of the flaky magnetic metal particles are not in the defined ranges, and in this case, the flaky magnetic metal particles are slightly inferior particularly in terms of the mechanical characteristics such as strength. It is understood that the pressed powder materials of Examples 1 to 11 also have excellent magnetic characteristics such as high saturation magnetization, high magnetic permeability, and low losses. Meanwhile, since the materials are pressed powder materials, the materials can be applied to complex shapes.

EXAMPLES

In the following description, Examples 12 to 28 of the invention will be explained in more detail by making comparisons with Comparative Examples 6 to 10. In regard to the flaky magnetic metal particles obtainable by Examples and Comparative Examples described below, the thickness and aspect ratio of the flaky magnetic metal particles, the proportion (%) of the difference in coercivity in the flat surface of a flaky magnetic metal particle, and the proportion (%) of the difference in coercivity in a plane of a pressed powder material are summarized in Table 3. The thickness and the aspect ratio are respectively calculated as average values of a large number of particles obtained based on TEM observation or SEM observation.

Example 12

First, a ribbon of Fe—Co—B—Si (Fe:Co:B:Si=52:23:19:6 (at %), Fe:Co=70:30 (at %), the total amount of the additive elements B+Si is 25 at % with respect to the total amount of Fe+Co+B+Si) is produced using a single roll quenching apparatus. Next, the ribbon thus obtained is subjected to a heat treatment at 300° C. in a $H_2$ atmosphere. Next, this ribbon is pulverized using a mixing apparatus, and is subjected to a heat treatment in a magnetic field at 400° C. in a $H_2$ atmosphere. Thus, flaky magnetic metal particles are obtained. The flaky magnetic metal particles thus obtained have a thickness of 10 μm and an aspect ratio of 20, and the crystal grain size of the magnetic metal phase is about 2 nm. The flaky magnetic metal particles thus obtained are mixed with an inorganic oxide interposed phase ($B_2O_3$—$Bi_2O_3$—ZnO), the mixture is subjected to molding in a magnetic field (orienting the flaky particles), and the resulting product is subjected to a heat treatment in a magnetic field. Thus, a pressed powder material is obtained. During the heat treatment in a magnetic field, a magnetic field is applied in the direction of the easy magnetization axis, and then a heat treatment is carried out.

Example 13

In Example 12, the ribbon pieces are collected, and the ribbon pieces are subjected to pulverization and rolling at about 1,000 rpm in an Ar atmosphere using a bead mill that uses $ZrO_2$ balls and a $ZrO_2$ vessel. Thus, the ribbon pieces are converted to a flaky powder. The flaky powder is treated so as to acquire a predetermined size and a predetermined structure, by repeating the operations of pulverization/rolling and a heat treatment. Except for these, the procedure is almost the same as that of Example 12. The flaky magnetic metal particles thus obtained have a thickness of 10 nm and an aspect ratio of 200, and the crystal grain size of the magnetic metal phase is about 2 nm.

Example 14

A pressed powder material is produced in almost the same manner as in Example 13, except that the flaky magnetic metal particles have a thickness of 1 µm and an aspect ratio of 100.

Example 15

A pressed powder material is produced in almost the same manner as in Example 13, except that the flaky magnetic metal particles have a thickness of 100 µm and an aspect ratio of 5.

Example 16

A pressed powder material is produced in almost the same manner as in Example 13, except that the flaky magnetic metal particles have a thickness of 10 nm and an aspect ratio of 1,000.

Example 17

A pressed powder material is produced in almost the same manner as in Example 13, except that the flaky magnetic metal particles have a thickness of 10 nm and an aspect ratio of 10,000.

Example 18

A pressed powder material is produced in almost the same manner as in Example 12, except that the proportion of the difference in coercivity in the flat surface of a flaky magnetic metal particle is adjusted to 12%, and the proportion of the difference in coercivity in a plane of the pressed powder material is adjusted to 10%, by controlling the conditions for the heat treatment in a magnetic field.

Example 19

A pressed powder material is produced in almost the same manner as in Example 12, except that the proportion of the difference in coercivity in the flat surface of a flaky magnetic metal particle is adjusted to 52%, and the proportion of the difference in coercivity in a plane of the pressed powder material is adjusted to 50%, by controlling the conditions for the heat treatment in a magnetic field.

Example 20

At the time of synthesizing a ribbon, the roll surface is rubbed with a polishing paper in the direction of rotation of the roll, and thereby the surface roughness is adjusted. The flat surfaces of the flaky magnetic metal particles thus obtainable have both a plurality of concavities and a plurality of convexities arranged in a first direction, each concavity or convexity having a width of 0.1 µm or more, a length of 1 µm or more, and an aspect ratio of 2 or higher. Except for these, the procedure is almost the same as that of Example 12.

Example 21

A pressed powder material is produced in almost the same manner as in Example 12, except that at the time of synthesizing a ribbon, the flaky magnetic metal particles thus obtainable are given with a lattice strain of 0.5% by controlling the quenching conditions.

Example 22

A pressed powder material is produced in almost the same manner as in Example 12, except that at the time of synthesizing a ribbon, the flaky magnetic metal particles thus obtainable are oriented in the (110) direction by controlling the quenching conditions.

Example 23

A pressed powder material is produced in almost the same manner as in Example 12, except that by controlling the quenching conditions and the pulverization conditions at the time of synthesizing a ribbon, five or more on the average of small magnetic metal particles having an average particle size of between 10 nm and 1 µm inclusive are attached on the flat surface of each flaky magnetic metal particle thus obtainable.

Example 24

A pressed powder material is produced in almost the same manner as in Example 12, except that the composition is changed to Fe—Co—B—Zr (Fe:Co:B:Zr=63:27:4:6 (at %), Fe:Co=70:30 (at %), and the total amount of the additive elements B+Zr is 10 at % with respect to the total amount of Fe+Co+B+Zr).

Example 25

A pressed powder material is produced in almost the same manner as in Example 12, except that the composition is changed to Fe—Co—B—Y (Fe:Co:B:Y=63:27:4:6 (at %), Fe:Co=70:30 (at %), and the total amount of the additive elements B+Y is 10 at % with respect to the total amount of Fe+Co+B+Y).

Example 26

A pressed powder material is produced in almost the same manner as in Example 12, except that the composition is changed to Fe—Co—Si (Fe:Co:Si=66.5:28.5:5.0 (at %), Fe:Co=70:30 (at %), and the total amount of the additive element Si is 5.0 at % with respect to the total amount of Fe+Co+Si).

Example 27

A pressed powder material is produced in almost the same manner as in Example 12, except that the surface of the flaky magnetic metal particles is coated with a non-magnetic $SiO_2$ layer having a thickness of about 10 nm by a sol-gel method.

Example 28

A pressed powder material is produced in almost the same manner as in Example 12, except that a resin interposed phase (polyimide-based resin) is used instead of the inorganic oxide interposed phase ($B_2O_3$—$Bi_2O_3$—ZnO).

Comparative Example 6

Commercially available Fe—Si—Cr—Ni flaky particles are used. The flaky magnetic metal particles have a thickness of about 400 nm and an aspect ratio of about 100. A pressed powder material is obtained by mixing the flaky magnetic metal particles together with an interposed phase, and performing molding (molding in a magnetic field and a heat treatment in a magnetic field are not carried out).

Comparative Example 7

A pressed powder material is produced in almost the same manner as in Example 12, except that the flaky magnetic metal particles have a thickness of 8 nm and an aspect ratio of 1,000.

Comparative Example 8

A pressed powder material is produced in almost the same manner as in Example 12, except that the flaky magnetic metal particles have a thickness of 120 μm and an aspect ratio of 5.

Comparative Example 9

A pressed powder material is produced in almost the same manner as in Example 12, except that the flaky magnetic metal particles have a thickness of 100 μm and an aspect ratio of 4.

Comparative Example 10

A pressed powder material is produced in almost the same manner as in Example 12, except that the flaky magnetic metal particles have a thickness of 10 nm and an aspect ratio of 12,000.

Next, in regard to the materials for evaluation of Examples 12 to 28 and Comparative Examples 6 to 10, the saturation magnetization, the real part of magnetic permeability ($\mu'$), the magnetic permeability loss (tan δ), the change over time in the real part of magnetic permeability ($\mu'$) after 100 hours, the core loss, and the strength ratio are evaluated by the following methods. The evaluation results are presented in Table 4.

(1) Saturation magnetization: The saturation magnetization at room temperature is measured using a VSM.

(2) Real part of magnetic permeability, $\mu'$, and magnetic permeability loss (tan δ=$\mu''/\mu'\times100(\%)$): The magnetic permeability of a ring-shaped sample is measured using an impedance analyzer. The real part of magnetic permeability, $\mu'$, and the imaginary part of magnetic permeability, $\mu''$, at a frequency of 100 Hz are measured. Furthermore, the magnetic permeability loss or coefficient of loss, tan δ, is calculated by the formula: $\mu''/\mu'\times100(\%)$.

(3) Change over time in real part of magnetic permeability, $\mu'$, after 100 hours: A sample for evaluation is heated at a temperature of 60° C. in air for 100 hours, and then the real part of magnetic permeability, $\mu'$, is measured again. Thus, the change over time (real part of magnetic permeability, $\mu'$, after standing for 100 hours/real part of magnetic permeability, $\mu'$, before standing) is determined.

(4) Core loss: The core loss under the operating conditions of 100 Hz and 1 T is measured using a B—H analyzer. In a case in which the core loss cannot be directly measured under the conditions of 100 Hz and 1 T, the dependency on frequency and the dependency on the magnetic flux density of the core loss are measured, and the core loss at 100 Hz and 1 T is estimated from the data (then, this estimated value is employed).

(5) Strength ratio: The flexural strength of a sample for evaluation is measured, and this is expressed by the ratio of the measured flexural strength with respect to the flexural strength of the sample of Comparative Example 1 (=flexural strength of sample for evaluation/flexural strength of sample of Comparative Example 6).

TABLE 3

|  | Thickness | Aspect ratio | Proportion of difference in coercivity in flat surface of flaky magnetic metal particle (%) | Proportion of difference in coercivity in plane of pressed powder material (%) | Remarks |
|---|---|---|---|---|---|
| Example 12 | 10 μm | 20 | 105 | 100 | — |
| Example 13 | 10 nm | 200 | 80 | 70 | — |
| Example 14 | 1 μm | 100 | 90 | 80 | — |
| Example 15 | 100 μm | 5 | 100 | 90 | — |
| Example 16 | 10 nm | 1000 | 80 | 70 | — |
| Example 17 | 10 nm | 10000 | 80 | 70 | — |
| Example 18 | 10 μm | 20 | 12 | 10 | — |

TABLE 3-continued

|  | Thickness | Aspect ratio | Proportion of difference in coercivity in flat surface of flaky magnetic metal particle (%) | Proportion of difference in coercivity in plane of pressed powder material (%) | Remarks |
|---|---|---|---|---|---|
| Example 19 | 10 μm | 20 | 52 | 50 | — |
| Example 20 | 10 μm | 20 | 110 | 105 | A plurality of concavities and convexities |
| Example 21 | 10 μm | 20 | 115 | 107 | Lattice strain |
| Example 22 | 10 μm | 20 | 110 | 105 | Orientation in (110) direction |
| Example 23 | 10 μm | 20 | 102 | 100 | Attachment of small magnetic metal particles |
| Example 24 | 10 μm | 20 | 50 | 48 | Fe—Co—B—Zr |
| Example 25 | 10 μm | 20 | 55 | 52 | Fe—Co—B—Y |
| Example 26 | 10 μm | 20 | 17 | 15 | Fe—Co—Si |
| Example 27 | 10 μm | 20 | 105 | 102 | With coating layer |
| Example 28 | 10 μm | 20 | 105 | 23 | Polyimide-based resin |
| Comparative example 6 | 400 nm | 100 | ≈0 | ≈0 | — |
| Comparative example 7 | 8 nm | 1000 | 50 | 40 | — |
| Comparative example 8 | 120 μm | 5 | 80 | 70 | — |
| Comparative example 9 | 100 μm | 4 | 70 | 60 | — |
| Comparative example 10 | 10 nm | 12000 | 50 | 40 | — |

TABLE 4

|  | Saturation magnetization (T) | μ' (1 kHz) | tan δ (%) (1 kHz) | Core loss (kW/m$^3$) | Proportion of change over time of μ' | Strength ratio |
|---|---|---|---|---|---|---|
| Example 12 | 1.0 | 90 | ≈0 | 15 | 92 | 1.2 |
| Example 13 | 1.0 | 85 | ≈0 | 18 | 92 | 1.2 |
| Example 14 | 1.0 | 88 | ≈0 | 16 | 93 | 1.2 |
| Example 15 | 1.0 | 78 | ≈0 | 20 | 93 | 1.2 |
| Example 16 | 1.0 | 82 | ≈0 | 18 | 92 | 1.2 |
| Example 17 | 1.0 | 80 | ≈0 | 15 | 92 | 1.2 |
| Example 18 | 1.0 | 50 | ≈0 | 40 | 93 | 1.2 |
| Example 19 | 1.0 | 60 | ≈0 | 22 | 93 | 1.3 |
| Example 20 | 1.0 | 93 | ≈0 | 13 | 94 | 1.4 |
| Example 21 | 1.0 | 93 | ≈0 | 13 | 94 | 1.4 |
| Example 22 | 1.0 | 97 | ≈0 | 13 | 94 | 1.4 |
| Example 23 | 1.0 | 93 | ≈0 | 13 | 94 | 1.4 |
| Example 24 | 1.3 | 30 | ≈0 | 60 | 92 | 1.3 |
| Example 25 | 1.3 | 33 | ≈0 | 50 | 92 | 1.3 |
| Example 26 | 1.8 | 25 | ≈0 | 180 | 92 | 1.3 |
| Example 27 | 1.0 | 92 | ≈0 | 13 | 94 | 1.4 |
| Example 28 | 1.0 | 70 | ≈0 | 150 | 92 | 3.0 |
| Comparative example 6 | 1.0 | 20 | ≈0 | 500 | 88 | — |
| Comparative example 7 | 1.0 | 87 | ≈0 | 20 | 90 | 1.1 |
| Comparative example 8 | 1.0 | 88 | ≈0 | 21 | 90 | 1.1 |
| Comparative example 9 | 1.0 | 86 | ≈0 | 20 | 90 | 1.1 |
| Comparative example 10 | 1.0 | 88 | ≈0 | 21 | 90 | 1.1 |

As is obvious from Table 3, the flaky magnetic metal particles according to Examples 12 to 28 have a thickness of between 10 nm and 100 μm inclusive and an aspect ratio of between 5 and 10,000 inclusive. The flaky magnetic metal particles have differences in coercivity depending on the direction within the flat surface, and also have differences in coercivity depending on the direction within a plane of the pressed powder materials. Examples 18 and 19 have lower proportions of difference in coercivity compared to Example 12. Example 20 has both a plurality of concavities and a plurality of convexities on the flat surface, the concavities and the convexities being arranged in a first direction and each having a width of 0.1 μm or more, a length of 1 μm or more, and an aspect ratio of 2 or higher. Example 21 is given with a lattice strain of 0.5%. Example 22 has the flaky magnetic metal particles oriented in the (110) direction.

Example 23 has five or more on the average of small magnetic metal particles having an average particle size of between 10 nm and 1 μm inclusive, attached on the flat surfaces of the flaky magnetic metal particles. Example 24 has a Fe—Co—B—Zr composition, Example 25 has a Fe—Co—B—Y composition, and Example 26 has a Fe—Co—Si composition. Example 27 has a coating layer formed on the surface of the flaky magnetic metal particles of Example 12. Example 28 has a resin interposed phase as the interposed phase.

As is obvious from Table 4, it is understood that the pressed powder materials that use the flaky magnetic metal particles of Examples 12 to 28 are excellent in terms of the magnetic permeability, the core loss, the proportion of change over time in the magnetic permeability, and the strength ratio, compared to the pressed powder material of Comparative Example 6. That is, it is understood that the pressed powder materials have excellent magnetic characteristics, thermal stability, and mechanical characteristics. Furthermore, it is understood that Examples 20 to 23 and 27 are slightly superior to Example 12 in terms of the magnetic permeability, the core loss, the proportion of change over time in the magnetic permeability, and the strength ratio. That is, it is understood that the Examples have slightly superior magnetic characteristics, thermal stability, and mechanical characteristics. Furthermore, it is understood that Example 28 is inferior to Example 12 in terms of the magnetic permeability and the core loss; however, Example 28 is markedly superior in terms of the strength ratio. That is, it is understood that in the case of using a resin-based interposed phase, the pressed powder material is slightly inferior in terms of magnetic characteristics compared to the case of using an inorganic oxide interposed phase; however, the pressed powder material is markedly superior in terms of mechanical characteristics such as strength. It is understood that Examples 18 and 19 are slightly inferior to Example 12 particularly in terms of the magnetic permeability and the core loss, due to the lower proportions of difference in coercivity. In Examples 24 to 26, the saturation magnetization in particular can be changed by changing the composition. Depending on the use applications (for example, magnetic wedges of motors), even a material having relatively low saturation magnetization can be sufficiently used, and there are occasions in which such a material specializing in low losses and high magnetic permeability is rather preferable. Therefore, in that case, materials having a saturation magnetization in the 1 T class, such as Examples 12 to 23, 27, and 28, can be used. Meanwhile, in a case in which high saturation magnetization is required as in the case of a motor core, materials having high saturation magnetization, such as Examples 24 to 26, and particularly Example 26, can be used. It is important to select the composition and the amount of additive elements according to the use applications. Comparative Examples 7 to 10 have differences in coercivity depending on the direction in the flat surface of a flaky magnetic metal particle, and also have differences in coercivity depending on the direction in a plane of the pressed powder material. However, the thicknesses and the aspect ratios of the flaky magnetic metal particles are not in the defined ranges. In this case, it is understood that the pressed powder materials are slightly inferior particularly in terms of the proportion of change over time in the magnetic permeability and the strength ratio. In summary, it is understood that the pressed powder materials of Examples 12 to 28 have excellent magnetic characteristics and mechanical characteristics, such as high saturation magnetization, high magnetic permeability, a low core loss, a small "proportion of change over time in the magnetic permeability", and high strength. Meanwhile, since the materials are pressed powder materials, the materials can be applied to complex shapes.

While certain embodiments have been described, these embodiments have been presented by way of example only, and are not intended to limit the scope of the inventions. Indeed, a plurality of flaky magnetic metal particles, a pressed powder material, and a rotating electric machine described herein may be embodied in a variety of other forms; furthermore, various omissions, substitutions and changes in the form of the devices and methods described herein may be made without departing from the spirit of the inventions. The accompanying claims and their equivalents are intended to cover such forms or modifications as would fall within the scope and spirit of the inventions.

Clause 1. A plurality of flaky magnetic metal particles, each flaky magnetic metal particle comprising:

a flat surface having either or both of a plurality of concavities and a plurality of convexities arranged in a first direction, each concavity or convexity having a width of 0.1 μm or more, a length of 1 μm or more, and an aspect ratio of 2 or higher; and at least one first element selected from the group consisting of iron (Fe), cobalt (Co), and nickel (Ni), the flaky magnetic metal particles having an average thickness of between 10 nm and 100 μm inclusive and an average aspect ratio of between 5 and 10,000 inclusive.

Clause 2. The flaky magnetic metal particles according to clause 1, wherein each of the flaky magnetic metal particles has five or more on the average of either or both of concavities and convexities.

Clause 3. The flaky magnetic metal particles according to clause 1 or 2, wherein each of the flaky magnetic metal particles further comprises, on the flat surface, a plurality of extraneous metal particles containing at least one of the first elements and having an average size of between 1 nm and 1 μm inclusive, and some of the extraneous metal particles are arranged along the first direction.

Clause 4. The flaky magnetic metal particles according to any of clauses 1-3, wherein the flaky magnetic metal particles have magnetic anisotropy within the flat surface.

Clause 5. The flaky magnetic metal particles according to clause 4, wherein the largest number of the first directions are arranged in the direction of the easy magnetization axis.

Clause 6. The flaky magnetic metal particles according to any of clauses 1-5, wherein the magnetization behavior of the flaky magnetic metal particles proceeds by domain wall displacement.

Clause 7. The flaky magnetic metal particles according to any of clauses 1-5, wherein the magnetization behavior of the flaky magnetic metal particles proceeds by rotation magnetization.

Clause 8. The flaky magnetic metal particles according to any of clauses 1-7, wherein the lattice strain of the flaky magnetic metal particles is between 0.01% and 10% inclusive.

Clause 9. The flaky magnetic metal particles according to any of clauses 1-8, wherein the flaky magnetic metal particles have a body-centered cubic crystal structure.

Clause 10. The flaky magnetic metal particles according to any of clauses 1-9, wherein the flaky magnetic metal particles contain Fe and Co, and the amount of Co is between 10 at % and 60 at % inclusive with respect to the total amount of Fe and Co.

Clause 11. The flaky magnetic metal particles according to any of clauses 1-10, wherein the flat surface has the (110) plane orientation or the (111) plane orientation.

Clause 12. The flaky magnetic metal particles according to any of clauses 1-11, wherein the ratio of the maximum length with respect to the minimum length within the flat surface is between 1 and 5 inclusive on the average, and each of the flaky magnetic metal particles further comprises a plurality of small magnetic metal particles on the flat surface, the number of the small magnetic metal particles disposed on the flat surface being 5 or more on the average, and the small magnetic metal particles containing at least one of the first elements and having an average particle size of between 10 nm and 1 μm inclusive.

Clause 13. The flaky magnetic metal particles according to any of clauses 1-12, wherein at least a portion of the surface of the flaky magnetic metal particles is coated with a coating layer having a thickness of 0.1 nm and 1 μm inclusive and containing at least one second element selected from the group consisting of oxygen (O), carbon (C), nitrogen (N) and fluorine (F).

Clause 14. A pressed powder material comprising a plurality of the flaky magnetic metal particles according to any of clauses 1-13; and an interposed phase provided between the flaky magnetic metal particles and containing at least one of the second elements.

Clause 15. The pressed powder material according to clause 14, wherein the proportion of arrangement of an approximate first direction arranged in a second direction is 30% or higher.

Clause 16. The pressed powder material according to clause 14 or 15, wherein the largest number of the approximate first directions are arranged in the direction of the easy magnetization axis of the pressed powder material.

Clause 17. The pressed powder material according to any of clauses 14-16, wherein the interposed phase is attached along the first direction.

Clause 18. A rotating electric machine comprising the pressed powder material according to any of clauses 14-17.

Clause 19. The rotating electric machine according to clause 18, wherein the rotating electric machine is a motor, and the core of the motor comprises the pressed powder material.

Clause 20. The rotating electric machine according to clause 18, wherein the rotating electric machine is a generator, and the core of the generator comprises the pressed powder material.

Clause 21. A plurality of flaky magnetic metal particles, each flaky magnetic metal particle comprising a flat surface; and a magnetic metal phase containing at least one first element selected from the group consisting of Fe, Co, and Ni, the flaky magnetic metal particles having an average thickness of between 10 nm and 100 μm inclusive and an average aspect ratio of between 5 and 10,000 inclusive, and having a difference in coercivity on the basis of direction within the flat surface.

Clause 22. The flaky magnetic metal particles according to clause 21, wherein the proportion of the difference in coercivity on the basis of direction within the flat surface is 1% or higher.

Clause 23. The flaky magnetic metal particles according to clause 21 or 22, wherein the crystal grain size of the magnetic metal phase is 10 nm or less.

Clause 24. The flaky magnetic metal particles according to any of clauses 21-23, wherein the magnetic metal phase contains at least one additive element selected from the group consisting of boron (B), silicon (Si), aluminum (Al), carbon (C), titanium (Ti), zirconium (Zr), hafnium (Hf), niobium (Nb), tantalum (Ta), molybdenum (Mo), chromium (Cr), copper (Cu), tungsten (W), phosphorus (P), nitrogen (N), gallium (Ga), and yttrium (Y).

Clause 25. The flaky magnetic metal particles according to any of clauses 21-24, wherein the flat surface has either or both of a plurality of concavities and a plurality of convexities arranged in a first direction, each concavity or convexity having a width of 0.1 μm or more, a length of 1 μm or more, and an aspect ratio of 2 or higher.

Clause 26. The flaky magnetic metal particles according to any of clauses 21-25, wherein the lattice strain of the flaky magnetic metal particles is between 0.01% and 10% inclusive.

Clause 27. The flaky magnetic metal particles according to any of clauses 21-26, wherein the flaky magnetic metal particles having a body-centered cubic crystal structure.

Clause 28. The flaky magnetic metal particles according to any of clauses 21-27, wherein the flat surface has the (110) plane orientation or the (111) plane orientation.

Clause 29. The flaky magnetic metal particles according to any of clauses 21-28, wherein the ratio of the maximum length with respect to the minimum length within the flat surface is between 1 and 5 inclusive on the average, and each of the flaky magnetic metal particles further comprises a plurality of small magnetic metal particles on the flat surface, the number of the small magnetic metal particles disposed on the flat surface being 5 or more on the average, and the small magnetic metal particles containing at least one of the first elements and having an average particle size of between 10 nm and 1 μm inclusive.

Clause 30. The flaky magnetic metal particles according to any of clauses 21-29, wherein at least a portion of the surface of the flaky magnetic metal particles is coated with a coating layer having a thickness of between 0.1 nm and 1 μm inclusive and containing at least one second element selected from the group consisting of oxygen (O), carbon (C), nitrogen (N), and fluorine (F).

Clause 31. A pressed powder material comprising:

a plurality of flaky magnetic metal particles, each flaky magnetic metal particle having a flat surface and a magnetic metal phase containing at least one first element selected from the group consisting of Fe, Co, and Ni, the flaky magnetic metal particles having an average thickness of between 10 nm and 100 μm inclusive and an average aspect ratio of between 5 and 10,000 inclusive; and an interposed phase existing between the flaky magnetic metal particles and containing at least one second element selected from the group consisting of oxygen (O), carbon (C), nitrogen (N), and fluorine (F), the flat surfaces of the flaky magnetic metal particles in the pressed powder material being oriented parallel to a plane of the pressed powder material, and the pressed powder material having a difference in coercivity on the basis of direction within the plane.

Clause 32. The pressed powder material according to clause 31, wherein the proportion of the difference in coercivity on the basis of direction within the plane of the pressed powder material is 1% or higher.

Clause 33. The pressed powder material according to clause 31 or 32, wherein the crystal grain size of the magnetic metal phase is 10 nm or less.

Clause 34. The pressed powder material according to any of clauses 31-33, wherein the magnetic metal phase contains at least one additive element selected from the group consisting of B, Si, Al, C, Ti, Zr, Hf, Nb, Ta, Mo, Cr, Cu, W, P, N, Ga, and Y.

Clause 35. The pressed powder material according to any of clauses 31-34, wherein the flat surfaces of the flaky magnetic metal particles have either or both of a plurality of concavities and a plurality of convexities arranged in a first direction, each concavity or convexity having a width of 0.1 μm or more, a length of 1 μm or more, and an aspect ratio of 2 or higher.

Clause 36. The pressed powder material (100) according to any of clauses 31-35, wherein the lattice strain of the flaky magnetic metal particles is between 0.01% and 10% inclusive.

Clause 37. The pressed powder material according to any of clauses 31-36, wherein the flaky magnetic metal particles have a body-centered cubic crystal structure.

Clause 38. The pressed powder material according to any of clauses 31-37, wherein the flat surfaces of the flaky magnetic metal particles have the (110) plane orientation or the (111) plane orientation.

Clause 39. The pressed powder material according to any of clauses 31-38, wherein the ratio of the maximum length with respect to the minimum length within the flat surface of a flaky magnetic metal particle is between 1 and 5 inclusive on the average, and each of the flaky magnetic metal particles further include a plurality of small magnetic metal particles on the flat surface, the number of the small magnetic metal particles disposed on the flat surface being 5 or more on the average, and the small magnetic metal particles containing at least one of the first elements and having an average particle size of between 10 nm and 1 μm inclusive.

Clause 40. A rotating electric machine comprising the pressed powder material according to any of clauses 31-39.

What is claimed is:

1. A plurality of flaky magnetic metal particles, each flaky magnetic metal particle comprising a flat surface; and a magnetic metal phase containing at least one first element selected from the group consisting of Fe, Co, and Ni,
the flaky magnetic metal particles having an average thickness of between 10 nm and 100 μm inclusive and an average aspect ratio of between 5 and 10,000 inclusive, and having a difference in coercivity on the basis of direction within the flat surface, wherein the proportion of the difference in coercivity on the basis of direction within the flat surface is 1% or higher.

2. The flaky magnetic metal particles according to claim 1, wherein the crystal grain size of the magnetic metal phase is 10 nm or less.

3. The flaky magnetic metal particles according to claim 1, wherein the magnetic metal phase contains at least one additive element selected from the group consisting of boron (B), silicon (Si), aluminum (Al), carbon (C), titanium (Ti), zirconium (Zr), hafnium (Hf), niobium (Nb), tantalum (Ta), molybdenum (Mo), chromium (Cr), copper (Cu), tungsten (W), phosphorus (P), nitrogen (N), gallium (Ga), and yttrium (Y).

4. The flaky magnetic metal particles according to claim 1, wherein the flat surface has either or both of a plurality of concavities and a plurality of convexities arranged in a first direction, each concavity or convexity having a width of 0.1 μm or more, a length of 1 μm or more, and an aspect ratio of 2 or higher, and wherein the plurality of concavities and the plurality of convexities are confined by a perimeter of the flat surface.

5. The flaky magnetic metal particles according to claim 1, wherein the lattice strain of the flaky magnetic metal particles is between 0.01% and 10% inclusive.

6. The flaky magnetic metal particles according to claim 1, wherein the flaky magnetic metal particles having a body-centered cubic crystal structure.

7. The flaky magnetic metal particles according to claim 1, wherein the flat surface has the (110) plane orientation or the (111) plane orientation.

8. The flaky magnetic metal particles according to claim 1, wherein the ratio of the maximum length with respect to the minimum length within the flat surface is between 1 and 5 inclusive on the average, and each of the flaky magnetic metal particles further comprises a plurality of small magnetic metal particles on the flat surface, the number of the small magnetic metal particles disposed on the flat surface being 5 or more on the average, and the small magnetic metal particles containing at least one of the first elements and having an average particle size of between 10 nm and 1 μm inclusive.

9. The flaky magnetic metal particles according to claim 1, wherein at least a portion of the surface of the flaky magnetic metal particles is coated with a coating layer having a thickness of between 0.1 nm and 1 μm inclusive and containing at least one second element selected from the group consisting of oxygen (O), carbon (C), nitrogen (N), and fluorine (F).

10. A pressed powder material comprising:
a plurality of flaky magnetic metal particles, each flaky magnetic metal particle having a flat surface and a magnetic metal phase containing at least one first element selected from the group consisting of Fe, Co, and Ni, the flay magnetic metal particles having an average thickness of between 10 nm and 100 μm inclusive and an average aspect ratio of between 5 and 10,000 inclusive; and
an interposed phase existing between the flaky magnetic metal particles and containing at least one second element selected from the group consisting of oxygen (O), carbon (C), nitrogen (N), and fluorine (F),
the flat surfaces of the flaky magnetic metal particles in the pressed powder material being oriented parallel to a plane of the pressed powder material, and the pressed powder material having a difference in coercivity on the basis of direction within the plane wherein the proportion of the difference in coercivity on the basis of direction within the plane of the pressed powder material is 1% or higher.

11. The pressed powder material according to claim 10, wherein the crystal grain size of the magnetic metal phase is 10 nm or less.

12. The pressed powder material according to claim 10, wherein the magnetic metal phase contains at least one additive element selected from the group consisting of B, Si, Al, C, Ti, Zr, Hf, Nb, Ta, Mo, Cr, Cu, W, P, N, Ga, and Y.

13. The pressed powder material according to claim 10, wherein the flat surfaces of the flaky magnetic metal particles have either or both of a plurality of concavities and a plurality of convexities arranged in a first direction, each concavity or convexity having a width of 0.1 μm or more, a length of 1 μm or more, and an aspect ratio of 2 or higher.

14. The pressed powder material according to claim 10, wherein the lattice strain of the flaky magnetic metal particles is between 0.01% and 10% inclusive.

15. The pressed powder material according to claim 10, wherein the flaky magnetic metal particles have a body-centered cubic crystal structure.

16. The pressed powder material according to claim 10, wherein the flat surfaces of the flaky magnetic metal particles have the (110) plane orientation or the (111) plane orientation.

17. The pressed powder material according to claim 10, wherein the ratio of the maximum length with respect to the minimum length within the flat surface of a flaky magnetic metal particle is between 1 and 5 inclusive on the average, and each of the flaky magnetic metal particles further include a plurality of small magnetic metal particles on the flat surface, the number of the small magnetic metal particles disposed on the flat surface being 5 or more on the average, and the small magnetic metal particles containing at least one of the first elements and having an average particle size of between 10 nm and 1 µm inclusive.

18. A rotating electric machine comprising the pressed powder material according to claim 10.

* * * * *